US012763006B2

(12) United States Patent
Lee et al.

(10) Patent No.: US 12,763,006 B2
(45) Date of Patent: Oct. 13, 2026

(54) DISPLAY DEVICE HAVING PIXEL WITH FIRST AND SECOND CAPACITORS AND ELECTRONIC DEVICE INCLUDING THE SAME

(71) Applicant: Samsung Display Co., Ltd., Yongin-si (KR)

(72) Inventors: Jiyoung Lee, Yongin-si (KR); Hyunyoung Choi, Yongin-si (KR); Sang-Gu Lee, Yongin-si (KR); Yongwoo Lee, Yongin-si (KR); Hyung Uk Cho, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/212,620

(22) Filed: May 19, 2025

(65) Prior Publication Data

US 2025/0384825 A1 Dec. 18, 2025

(30) Foreign Application Priority Data

Jun. 18, 2024 (KR) ........................ 10-2024-0078931

(51) Int. Cl.
*G09G 3/32* (2016.01)

(52) U.S. Cl.
CPC ......... *G09G 3/32* (2013.01); *G09G 2300/043* (2013.01); *G09G 2300/0819* (2013.01);
(Continued)

(58) Field of Classification Search
CPC ............ C08G 65/2609; C08G 65/2624; C08G 73/024; C11D 17/0008; C11D 2111/12; C11D 3/3707; C11D 3/3723; C11D 3/3788; C11D 3/38627; D21J 3/08; G09G 2300/043; G09G 2300/0819; G09G 2300/0852; G09G 2300/0861; G09G 2300/0876; G09G 2310/0251; G09G 2310/0267; G09G 2320/045; G09G 2330/021; G09G 3/32; G09G 3/3233
See application file for complete search history.

(56) References Cited

U.S. PATENT DOCUMENTS

2019/0347988 A1* 11/2019 Zhang .................. G09G 3/3233
2023/0044555 A1* 2/2023 Bong ................... G09G 3/3266
(Continued)

*Primary Examiner* — Chun-Nan Lin
(74) *Attorney, Agent, or Firm* — Womble Bond Dickinson (US) LLP

(57) ABSTRACT

A display device includes: a display panel including a pixel including: a light emitting element including an anode connected to a first power line and a cathode; a first transistor connected between the cathode and a second power line and operating according to a potential of a first node; a second transistor between the first node and a data line and receiving a first scan signal; a third transistor between the first node and a reference voltage line and receiving a second scan signal; and a first emission control transistor connected between the first transistor and the second power line, connected to a third node, and receiving a first emission control signal; a first capacitor between the first node and a second node, to which the first transistor and the first emission control transistor are connected; and a second capacitor connected between the second node and the third node.

20 Claims, 40 Drawing Sheets

(52) U.S. Cl.
CPC ............... *G09G 2310/0267* (2013.01); *G09G 2330/021* (2013.01)

(56) References Cited

U.S. PATENT DOCUMENTS

| | | | | |
|---|---|---|---|---|
| 2023/0063644 | A1* | 3/2023 | Chung | G09G 3/3233 |
| 2023/0124542 | A1* | 4/2023 | Hwang | G09G 3/32<br>345/204 |
| 2023/0215354 | A1* | 7/2023 | Bae | G09G 3/3233<br>345/690 |
| 2024/0005862 | A1* | 1/2024 | Bae | G09G 3/3233 |
| 2024/0212584 | A1* | 6/2024 | Kim | G09G 3/32 |
| 2024/0395190 | A1* | 11/2024 | No | G09G 3/32 |
| 2025/0006111 | A1* | 1/2025 | Yu | G09G 3/32 |

* cited by examiner

DISPLAY DEVICE HAVING PIXEL WITH FIRST AND SECOND CAPACITORS AND ELECTRONIC DEVICE INCLUDING THE SAME

CROSS-REFERENCE TO RELATED APPLICATION

The present application claims priority to and the benefit of Korean Patent Application No. 10-2024-0078931, filed on Jun. 18, 2024, in the Korean Intellectual Property Office, the entire disclosure of which is incorporated herein by reference.

BACKGROUND

Aspects of some embodiments of the present disclosure described herein relate to a display device and an electronic device including the same.

A light emitting display device among display devices displays images by using a light emitting element that generates a light through the recombination of electrons and holes. The light emitting display device has a fast response speed and operates with low power consumption.

The light emitting display device includes pixels connected to data lines and scan lines. In general, each of the pixels includes a light emitting element and a pixel circuit for controlling the amount of current flowing to the light emitting element. The pixel circuit controls the amount of current flowing through the light emitting element in response to a data signal. In this case, light of luminance (e.g., a set or predetermined luminance) is generated to correspond to the amount of current flowing through the light emitting diode.

The above information disclosed in this Background section is only for enhancement of understanding of the background and therefore the information discussed in this Background section does not necessarily constitute prior art.

SUMMARY

Aspects of some embodiments of the present disclosure described herein relate to a display device and an electronic device including the same, and for example, to a display device with relatively improved display quality and an electronic device including the same.

Aspects of some embodiments of the present disclosure include a display device having a relatively simplified circuit configuration of a display panel and an electronic device including the same.

According to some embodiments, a display device includes a display panel including a pixel. According to some embodiments, the pixel includes a light emitting element including an anode connected to a first power line and a cathode, a first transistor connected between the cathode and a second power line and operating depending on a potential of a first node, a second transistor connected between the first node and a data line and receiving a first scan signal, a third transistor connected between the first node and a reference voltage line and receiving a second scan signal, a first emission control transistor connected between the first transistor and the second power line, connected to a third node, and receiving a first emission control signal, a first capacitor connected between the first node and a second node, to which the first transistor and the first emission control transistor are connected, and a second capacitor connected between the second node and the third node.

According to some embodiments, a display device includes a display panel including a pixel, a first scan line, a second scan line, a first emission control line, a first power line, a second power line, a reference voltage line, and a data line, a first gate driving circuit connected to the first scan line and the second scan line, and a second gate driving circuit connected to the first emission control line.

According to some embodiments, the pixel includes a light emitting element including an anode connected to the first power line and a cathode, a first transistor connected between the cathode and the second power line and operating depending on a potential of a first node, a second transistor connected between the first node and the data line, and receiving a first scan signal through the first scan line, a third transistor connected between the first node and the reference voltage line and receiving a second scan signal through the second scan line, a first emission control transistor connected between the first transistor and the second power line and receiving a first emission control signal through the first emission control line, a first capacitor connected between the first node and a second node, to which the first transistor and the first emission control transistor are connected, and a second capacitor connected between the second node and the first emission control line.

According to some embodiments, an electronic device includes a display panel including a pixel, a panel driver driving the display panel, a driving controller controlling a driving of the panel driver, and a main processor providing an image signal to the driving controller.

According to some embodiments, the pixel includes a light emitting element including an anode connected to a first power line and a cathode, a first transistor connected between the cathode and a second power line and operating depending on a potential of a first node, a second transistor connected between the first node and a data line and receiving a first scan signal, a third transistor connected between the first node and a reference voltage line and receiving a second scan signal, a first emission control transistor connected between the first transistor and the second power line, connected to a third node, and receiving a first emission control signal, a first capacitor connected between the first node and a second node, to which the first transistor and the first emission control transistor are connected, and a second capacitor connected between the second node and the third node.

BRIEF DESCRIPTION OF THE DRAWINGS

The above and other aspects and features of embodiments according to the present disclosure will become more apparent by describing in more detail aspects of some embodiments thereof with reference to the accompanying drawings.

DETAILED DESCRIPTION

Figure 1:
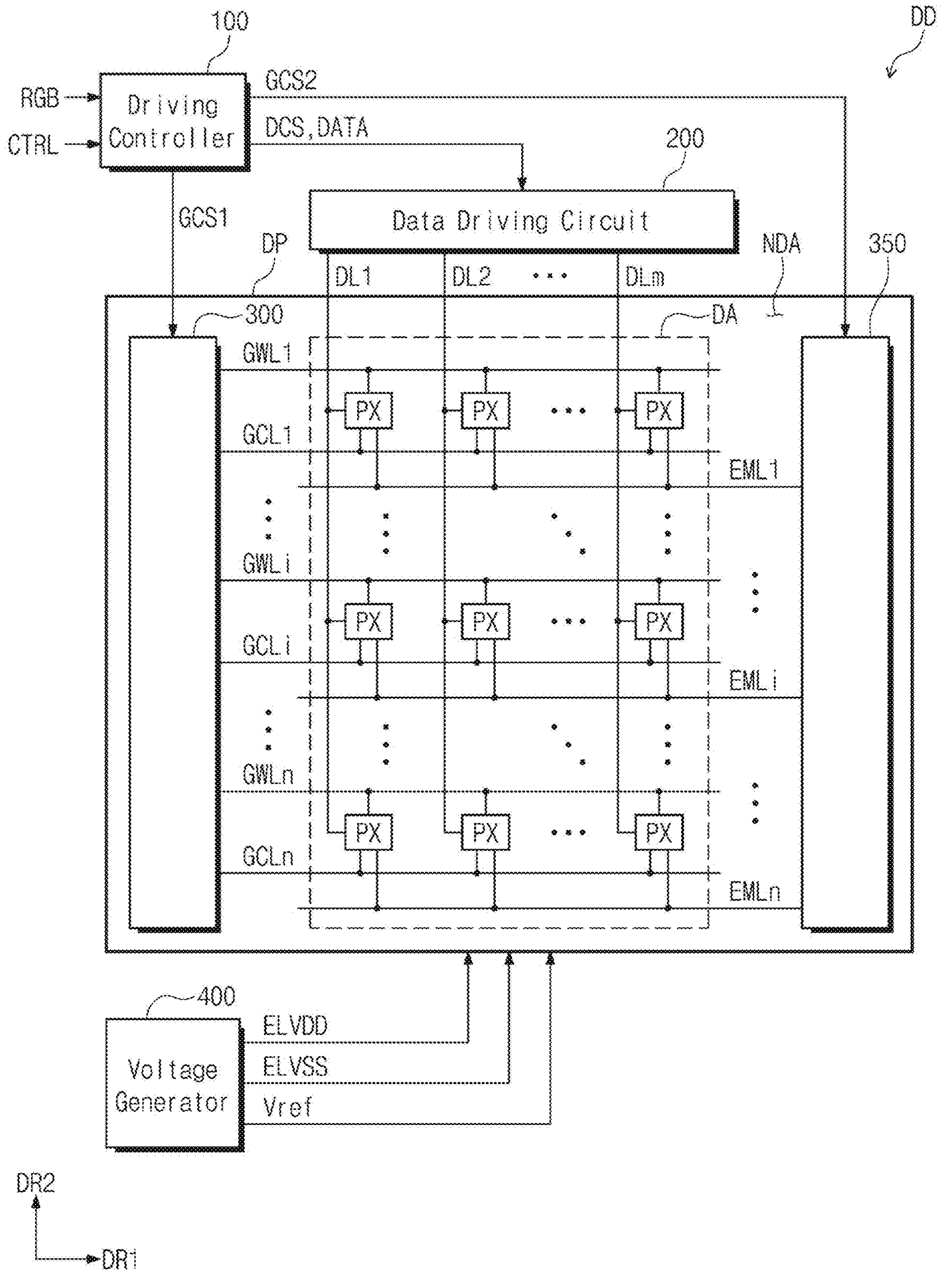
FIG. 1 is a block diagram of a display device, according to some embodiments of the present disclosure.

In the specification, the expression that a first component (or region, layer, part, portion, etc.) is "on", "connected with", or "coupled with" a second component means that the first component is directly on, connected with, or coupled with the second component or means that a third component is interposed therebetween.

The same reference numerals refer to the same components. Also, in drawings, the thickness, ratio, and dimension of components are exaggerated for effectiveness of description of technical contents. The term "and/or" includes one or more combinations in each of which associated elements are defined.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "below", "on", "above", etc. are used to describe the correlation of components illustrated in drawings. The terms that are relative in concept are described based on a direction shown in drawings.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

Figure 2:
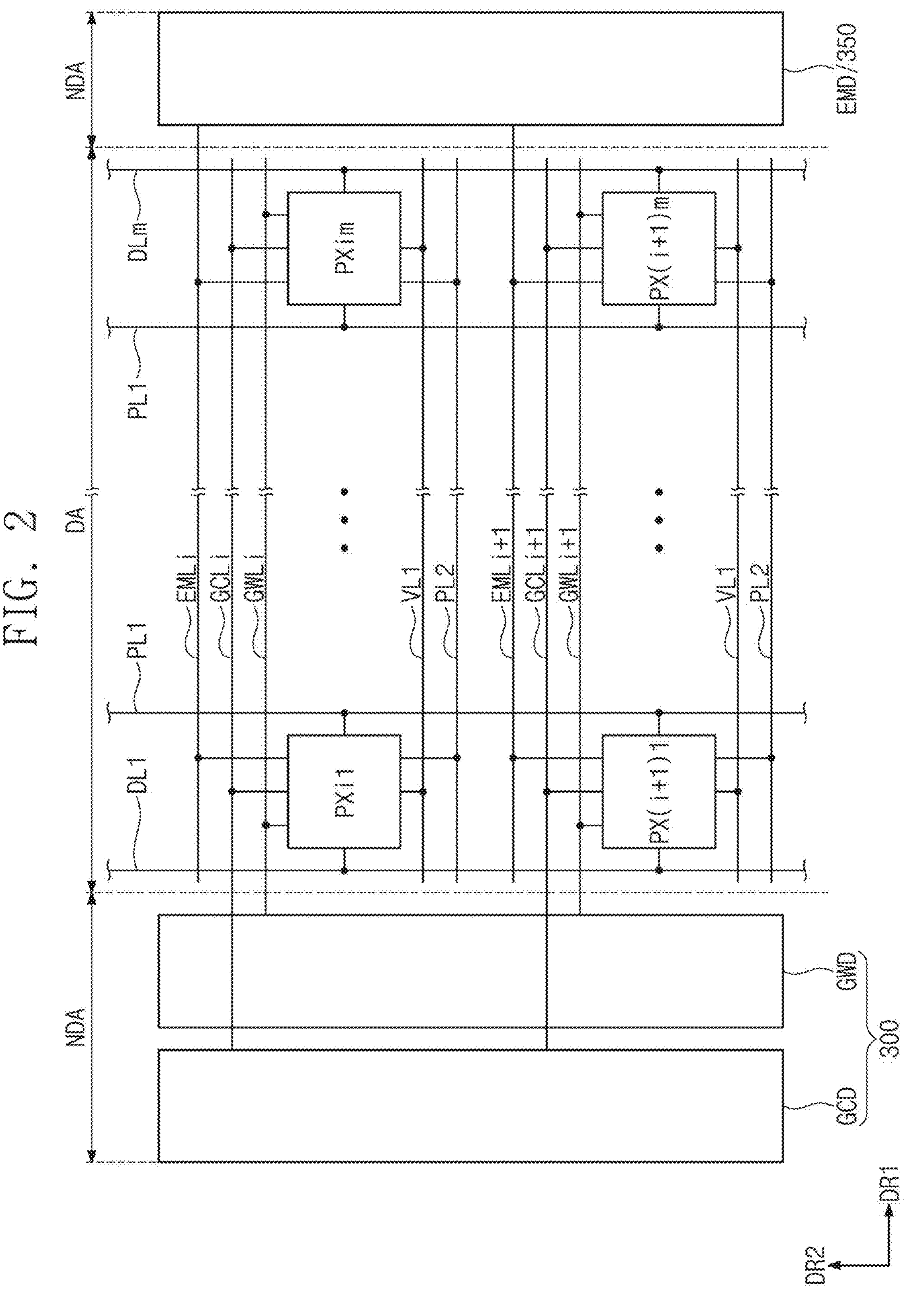
FIG. 2 is a block diagram of first and second gate driving circuits shown in FIG. 1.

FIG. 1 is a block diagram of a display device DD, according to some embodiments of the present disclosure. FIG. 2 is a block diagram of first and second gate driving circuits 300 and 350 shown in FIG. 1.

Referring to FIG. 1, the display device DD may include a display panel DP, a driving controller 100, and a panel driver. According to some embodiments of the present disclosure, the panel driver may include a data driving circuit 200 (or a data driver), the first gate driving circuit 300, the second gate driving circuit 350, and a voltage generator 400.

The display panel DP may include a display area DA and a non-display area NDA surrounding at least part of the display area DA. The display panel DP may include a plurality of pixels PX placed in the display area DA. The display panel DP may include write scan lines GWL1 to GWLn, compensation scan lines GCL1 to GCLn, and emission control lines EML1 to EMLn. The write scan lines GWL1 to GWLn may be referred to as "first scan lines", and the compensation scan lines GCL1 to GCLn may be referred to as "second scan lines". The emission control lines EML1 to EMLn may be referred to as first emission control lines.

The driving controller 100 receives an image signal RGB and a control signal CTRL. The driving controller 100 generates an image data signal DATA by converting a data format of the image signal RGB so as to be suitable for the interface specification of the data driving circuit 200. The driving controller 100 outputs a first gate control signal GCS1, a data control signal DCS, and a second gate control signal GCS2.

The data driving circuit 200 (or a data driver) receives the data control signal DCS and the image data signal DATA from the driving controller 100. The data driving circuit 200 converts the image data signal DATA into data signals and then outputs the data signals to data lines DL1 to DLm. The data signals refer to analog voltages corresponding to gray-scale values of the image data signal DATA. The data lines DL1 to DLm may be arranged in a first direction DR1, and each of the data lines DL1 to DLm may extend in a second direction DR2.

The first and second gate driving circuits 300 and 350 may be placed in the non-display area NDA of the display panel DP. According to some embodiments of the present disclosure, the first gate driving circuit 300 may be positioned adjacent to a first side (e.g., left side) of the display area DA, and the second gate driving circuit 350 may be positioned adjacent to a second side (e.g., right side) of the display area DA, which is different from the first side. According to some embodiments of the present disclosure, the second side may be opposite to the first side. In the example shown in FIG. 1, the first and second gate driving circuits 300 and 350 are respectively positioned on opposite sides of the display area DA, but the present disclosure is not limited thereto. For example, the first and second gate driving circuits 300 and 350 may be positioned adjacent to one of the first side and the second side of the display panel DP. According to some embodiments, the first and second gate driving circuits 300 and 350 may be integrated into one circuit.

Figure 3:
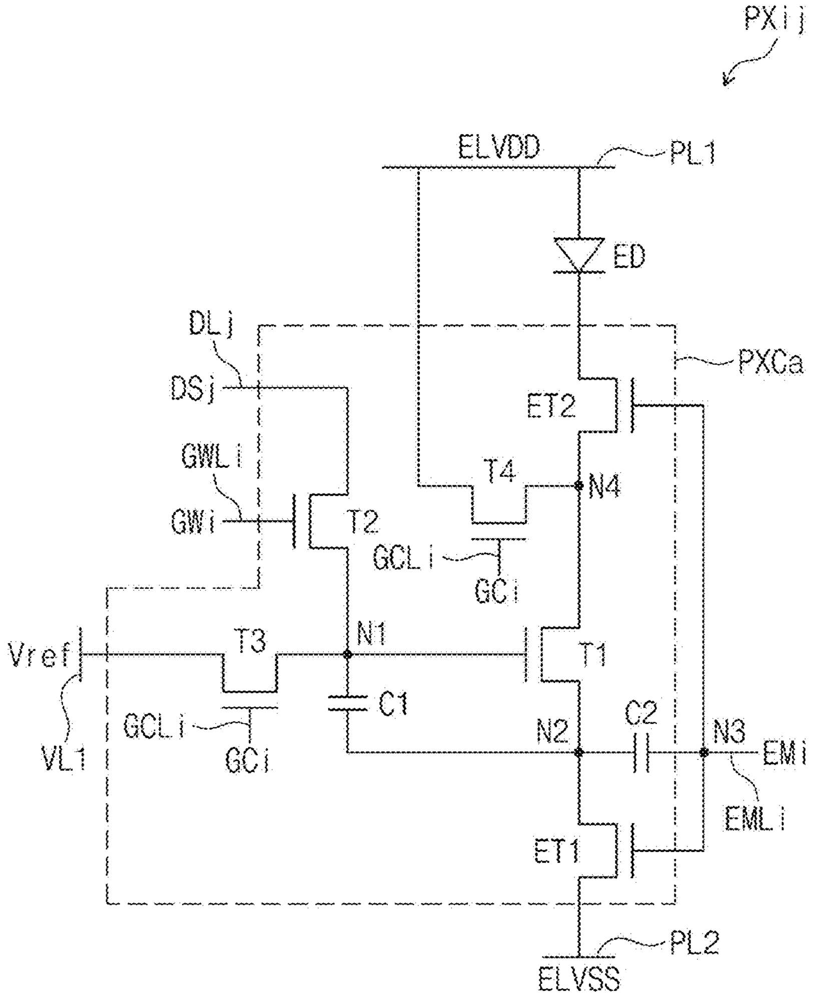
FIG. 3 is a circuit diagram of a pixel, according to some embodiments of the present disclosure.

Each of a plurality of pixels PX according to some embodiments of the present disclosure includes a light emitting element ED (see FIG. 3) and a pixel circuit PXCa (see FIG. 3) that controls light emission of the light emitting element ED (see FIG. 3).

The pixel circuit PXCa may include one or more transistors and one or more capacitors. The first and second gate driving circuits 300 and 350 may include transistors formed through the same process as the pixel circuit PXCa. The pixel circuit PXCa may be referred to as a "pixel driver".

According to some embodiments of the present disclosure, the first gate driving circuit 300 may be connected to the write scan lines GWL1 to GWLn and the compensation scan lines GCL1 to GCLn. The first gate driving circuit 300 receives the first gate control signal GCS1 from the driving controller 100. The first gate driving circuit 300 may respectively output write scan signals and compensation scan signals to the write scan lines GWL1 to GWLn and the compensation scan lines GCL1 to GCLn in response to the first gate control signal GCS1. The write scan signals may be referred to as "first scan signals", and the compensation scan signals may be referred to as "second scan signals".

According to some embodiments of the present disclosure, the second gate driving circuit 350 may be connected to the emission control lines EML1 to EMLn. The second gate driving circuit 350 may output emission control signals to the emission control lines EML1 to EMLn in response to the second gate control signal GCS2 from the driving controller 100.

The write scan lines GWL1 to GWLn, the compensation scan lines GCL1 to GCLn, and the emission control lines EML1 to EMLn may be extended in the first direction DR1. The write scan lines GWL1 to GWLn, the compensation scan lines GCL1 to GCLn, and the emission control lines EML1 to EMLn may be spaced from one another in the second direction DR2.

Referring to FIG. 2, the first gate driving circuit 300 may include a first scan driving circuit GWD, and a second scan driving circuit GCD. The second gate driving circuit 350 may include an emission control circuit EMD. The placement order of the first and second scan driving circuits GWD and GCD in the first direction DR1, which is illustrated in FIG. 2, is only an example and is not particularly limited thereto.

In FIG. 2, the first scan driving circuit GWD is connected to an i-th write scan line GWLi and an (i+1)-th write scan line GWLi+1, and the second scan driving circuit GCD is connected to an i-th compensation scan line GCLi and an (i+1)-th compensation scan line GCLi+1. The emission control circuit EMD is connected to an i-th emission control line EMLi and an (i+1)-th emission control line EMLi+1. Moreover, pixels PXi1, PX(i+1)1, PXim, and PX(i+1)m connected to a first data line DL1 and a m-th data line DLm are illustrated in FIG. 2.

Each of the pixels PXi1, PX(i+1)1, PXim, and PX(i+1)m may be electrically connected to two scan lines, one emission control line, and one data line. For example, an i-th row of pixels may be connected to the i-th write and compensation scan lines GWLi and GCLi and the i-th emission control line EMLi. A first column of pixels may be connected to the first data line DL1. However, embodiments according to the present disclosure are not limited thereto. Each of the pixels PXi1, PX(i+1)1, PXim, and PX(i+1)m may be connected to scan lines of which the number is greater than two.

Referring to FIGS. 1 and 2, the voltage generator 400 (or a power supply unit) generates voltages necessary to operate the display panel DP. According to some embodiments, the voltage generator 400 may generate a first driving voltage ELVDD, a second driving voltage ELVSS, and a reference voltage Vref. Alternatively, the voltage generator 400 may further generate an initialization voltage Vint (see FIG. 10).

Each of the pixels PXi1, PX(i+1)1, PXim, and PX(i+1)m may be connected to a first power line PL1, a second power line PL2, and a reference voltage line VL1. The first power line PL1 receives the first driving voltage ELVDD from the voltage generator 400. The second power line PL2 receives the second driving voltage ELVSS from the voltage generator 400. The reference voltage line VL1 receives the reference voltage Vref from the voltage generator 400. Alternatively, each of the pixels PXi1, PX(i+1)1, PXim, and PX(i+1)m may be further connected to an initialization voltage line VL2 (see FIG. 10). In this case, the initialization voltage line VL2 may receive the initialization voltage Vint from the voltage generator 400.

FIG. 3 is a circuit diagram of a pixel PXij, according to some embodiments of the present disclosure. Although FIG. 3 illustrates various components in a pixel according to some embodiments, embodiments according to the present disclosure are not limited thereto, and according to various embodiments, the pixel may include additional components or fewer components without departing from the spirit and scope of embodiments according to the present disclosure.

Figure 4:
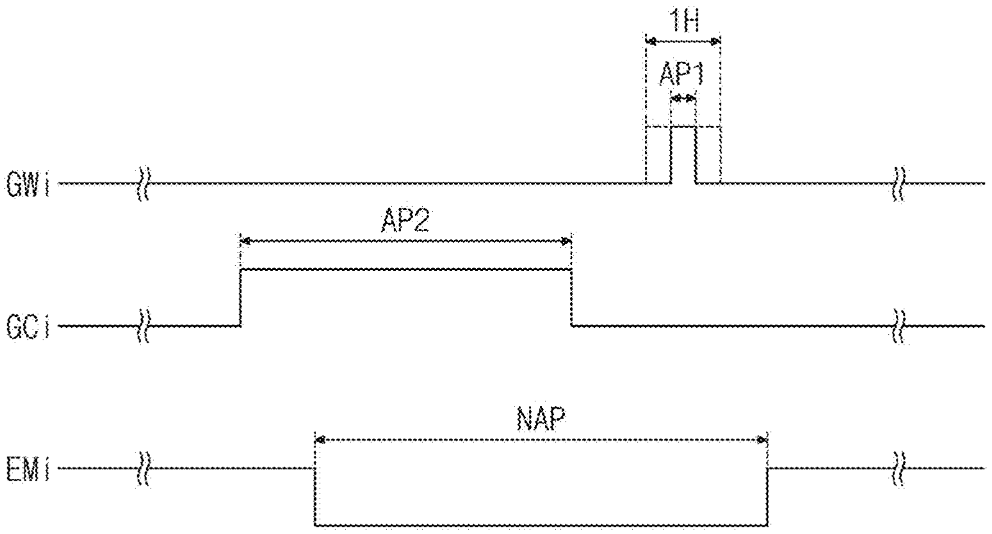
FIG. 4 is a waveform diagram illustrating signals applied to a pixel shown in FIG. 3.

FIG. 4 is a waveform diagram of signals applied to the pixel PXij shown in FIG. 3.

FIG. 3 representatively shows the pixel PXij connected to the i-th write scan line GWLi among the write scan lines GWL1 to GWLn (see FIG. 1) and a j-th data line DLj among the plurality of data lines DL1 to DLm (see FIG. 1). The pixel PXij is connected to the i-th compensation scan line GCLi among the compensation scan lines GCL1 to GCLn (see FIG. 1), and is connected to the i-th emission control line EMLi (see FIG. 1) among the emission control lines EML1 to EMLn.

The pixel PXij may include the pixel circuit PXCa (or a pixel driving circuit) and the light emitting element ED electrically connected to the pixel circuit PXCa. According to some embodiments, the pixel circuit PXCa may include six transistors (referred to as "first to fourth transistors T1 to T4 and first and second emission control transistors ET1 and ET2"), and two capacitors (referred to as "a first capacitor C1 and a second capacitor C2"). According to some embodiments of the present disclosure, one of the six transistors of the pixel circuit PXCa may be omitted, or an additional transistor may be further included in the pixel circuit PXCa.

The i-th write scan line GWLi may provide an i-th write scan signal GWi to the pixel PXij. The i-th compensation scan line GCLi may provide an i-th compensation scan signal GCi to the pixel PXij. The i-th emission control line EMLi may provide an i-th emission control signal EMi to the pixel PXij. The j-th data line DLj may provide a j-th data signal DSj to the pixel PXij. The j-th data signal DSj may have a voltage level corresponding to a grayscale value of the image data signal DATA (see FIG. 1) output from the driving controller 100 (see FIG. 1).

Furthermore, the pixel PXij may be connected to the first power line PL1 receiving the first driving voltage ELVDD, the second power line PL2 receiving the second driving voltage ELVSS, and the reference voltage line VL1 receiving the reference voltage Vref. The first driving voltage ELVDD may have a higher voltage level than the second driving voltage ELVSS. The reference voltage Vref may have a lower voltage level than the second driving voltage ELVSS. According to some embodiments of the present disclosure, the first driving voltage ELVDD may be 8.4 V, the second driving voltage ELVSS may be 0 V, and the reference voltage Vref may be −1.0 V. Alternatively, the reference voltage Vref may have a voltage level lower than the first driving voltage ELVDD and higher than the second driving voltage ELVSS.

According to some embodiments, each of the first to fourth transistors T1 to T4 and the first and second emission control transistors ET1 and ET2 may be an N-type transistor. Each of the first to fourth transistors T1 to T4 and the first and second emission control transistors ET1 and ET2 may include an oxide semiconductor as a semiconductor layer.

The light emitting element ED may include an anode and a cathode. When the light emitting element ED is an organic light emitting element, the light emitting element ED may further include an organic layer located between an anode and a cathode. The anode of the light emitting element ED may be connected to the first power line PL1. According to some embodiments, the anode of the light emitting element ED may be directly connected to the first power line PL1. The cathode of the light emitting element ED may be connected to the pixel circuit PXCa. The light emitting element ED may emit light so as to correspond to the amount of current flowing in the first transistor T1 of the pixel circuit PXCa.

The first transistor T1 is connected between the cathode of the light emitting element ED and the second power line PL2 receiving the second driving voltage ELVSS. The first transistor T1 may be referred to as a "driving transistor". The first transistor T1 may include a first electrode, a second electrode, and a gate electrode. The first electrode of the first transistor T1 may be connected to a fourth node N4, the second electrode of the first transistor T1 may be connected to a second node N2, and the gate electrode of the first transistor T1 may be connected to a first node N1. The first electrode may be referred to as a drain of the first transistor T1, and the second electrode may be referred to as a source of the first transistor T1. The first transistor T1 may operate depending on a potential of the first node N1. According to some embodiments, the first transistor T1 may further include a back gate electrode. The back gate electrode may be connected to the second electrode of the first transistor T1.

The second transistor T2 is connected between the j-th data line DLj and the first node N1 to receive the i-th write scan signal GWi. The second transistor T2 may be referred to as a "switching transistor". The second transistor T2 may include a first electrode connected to the j-th data line DLj, a second electrode connected to the first node N1, and a gate electrode connected to the i-th write scan line GWLi. The second transistor T2 may deliver the j-th data signal DSj received through the j-th data line DLj to the first node N1 in response to the i-th write scan signal GWi received through the i-th write scan line GWLi.

The third transistor T3 is connected between the reference voltage line VL1 and the first node N1 to receive the i-th compensation scan signal GCi. The third transistor T3 may be referred to as a "compensation transistor". The third transistor T3 may include a first electrode connected to the reference voltage line VL1, a second electrode connected to the first node N1, and a gate electrode connected to the i-th compensation scan line GCLi. The third transistor T3 may be turned on in response to the i-th compensation scan signal GCi received through the i-th compensation scan line GCLi to apply the reference voltage Vref to the first node N1. The first node N1 may be defined as a node to which the gate electrode of the first transistor T1, the second electrode of the second transistor T2, and the second electrode of the third transistor T3 are connected.

The first emission control transistor ET1 may be connected between the first transistor T1 and the second power line PL2 to receive the i-th emission control signal EMi. The first emission control transistor ET1 may include a first electrode connected to the second electrode of the first transistor T1, a second electrode connected to the second power line PL2, and a gate electrode connected to the i-th emission control line EMLi. The first emission control transistor ET1 may be turned on in response to the i-th emission control signal EMi received through the i-th emission control line EMLi so as to electrically connect the second power line PL2 to the second electrode of the first transistor T1. The gate electrode of the first emission control transistor ET1 may be connected to the i-th emission control line EMLi through a third node N3.

The first capacitor C1 may be connected between the first node N1 and the second node N2. The first capacitor C1 may include a first electrode connected to the first node N1 and a second electrode connected to the second node N2. The first capacitor C1 may store a difference voltage between the first node N1 and the second node N2.

The second capacitor C2 may be connected between the second node N2 and the third node N3. The second capacitor C2 may include a first electrode connected to the second node N2 and a second electrode connected to the third node N3. The i-th emission control signal EMi may be applied to the third node N3. The second capacitor C2 may store a voltage difference between the third node N3 and the second node N2. According to some embodiments of the present disclosure, the capacitance of the second capacitor C2 may be equal to the capacitance of the first capacitor C1. However, the present disclosure is not limited thereto. The relationship between the capacitance of the first capacitor C1 and the capacitance of the second capacitor C2 may be variously modified.

The second node N2 may be defined as a node to which the second electrode of the first transistor T1, the first electrode of the first emission control transistor ET1, the second electrode of the first capacitor C1, and the first electrode of the second capacitor C2 are connected. The third node N3 may be defined as the node to which the gate electrode of the first emission control transistor ET1, the second electrode of the second capacitor C2, and the i-th emission control line EMLi are connected.

The fourth transistor T4 is connected between the first power line PL1 and the fourth node N4 to receive the i-th compensation scan signal GCi. The fourth transistor T4 may include a first electrode connected to the first power line PL1, a second electrode connected to the first electrode of the first transistor T1 (i.e., the fourth node N4), and a gate electrode connected to the i-th compensation scan line GCLi. The fourth transistor T4 may be turned on in response to the i-th compensation scan signal GCi received through the i-th compensation scan line GCLi to deliver the first driving voltage ELVDD to the fourth node N4.

The second emission control transistor ET2 is connected between the first transistor T1 and the cathode of the light emitting element ED to receive the i-th emission control signal EMi. The second emission control transistor ET2 may include a first electrode connected to the cathode of the light emitting element ED, a second electrode connected to the first electrode of the first transistor T1, and a gate electrode connected to the i-th emission control line EMLi. The second emission control transistor ET2 may be turned on in response to the i-th emission control signal EMi received through the i-th emission control line EMLi to electrically connect the cathode of the light emitting element ED to the first electrode of the first transistor T1.

The fourth node N4 may be defined as a node to which the first electrode of the first transistor T1, the second electrode of the fourth transistor T4, and the second electrode of the second emission control transistor ET2 are connected.

According to some embodiments, the third and fourth transistors T3 and T4 may receive the same scan signal (i.e., the i-th compensation scan signal GCi). Accordingly, the number of the scan signals required to drive the pixel PXij may be reduced to 2, and thus the number of scan driving circuits required to drive the pixel PXij may be reduced to 2. When the number of the scan driving circuits is reduced, the width of the non-display area NDA (see FIG. 1) of the display panel DP (see FIG. 1) may be relatively reduced, and thus the dead space of the display panel DP may be prevented from increasing.

Referring to FIG. 4, each of the i-th write scan signal GWi, the i-th compensation scan signal GCi, and the i-th emission control signal EMi may have an active level (or a high level) during some periods (i.e., an active period), and may have an inactive level (or a low level) during the remaining periods (i.e., an inactive period). When the above-described six transistors T1 to T4, ET1, and ET2 are N-type transistors, the active level of each of the i-th write scan signal GWi, the i-th compensation scan signal GCi, and the i-th emission control signal EMi may be a high level. Alternatively, when the six transistors T1 to T4, ET1, and ET2 are P-type transistors, the active level of each of the i-th write scan signal GWi, the i-th compensation scan signal GCi, and the i-th emission control signal EMi may be a low level.

The inactive period NAP of the i-th emission control signal EMi may overlap the active period AP1 of the i-th write scan signal GWi and the active period AP2 of the i-th compensation scan signal GCi. According to some embodiments of the present disclosure, the active period AP1 of the i-th write scan signal GWi may have duration smaller than or equal to the duration of a horizontal scan period 1H, and the active period AP2 of the i-th compensation scan signal GCi may have duration greater than the duration of the horizontal scan period 1H. For example, the duration of the active period AP1 of the i-th write scan signal GWi may correspond to ⅓ of the duration of the horizontal scan period 1H, and the duration of the active period AP2 of the i-th compensation scan signal GCi may correspond to 3 times the duration of the horizontal scan period 1H.

Figure 5A:
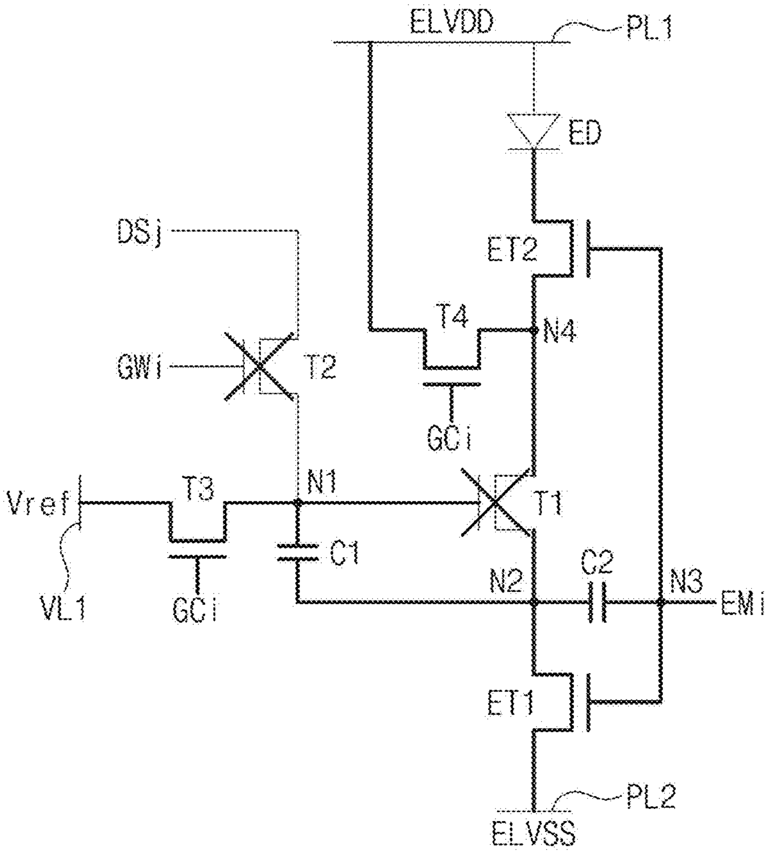
FIGS. 5A and 5B are drawings for describing an operation of a pixel during an initialization period, according to some embodiments of the present disclosure.
Figure 5B:
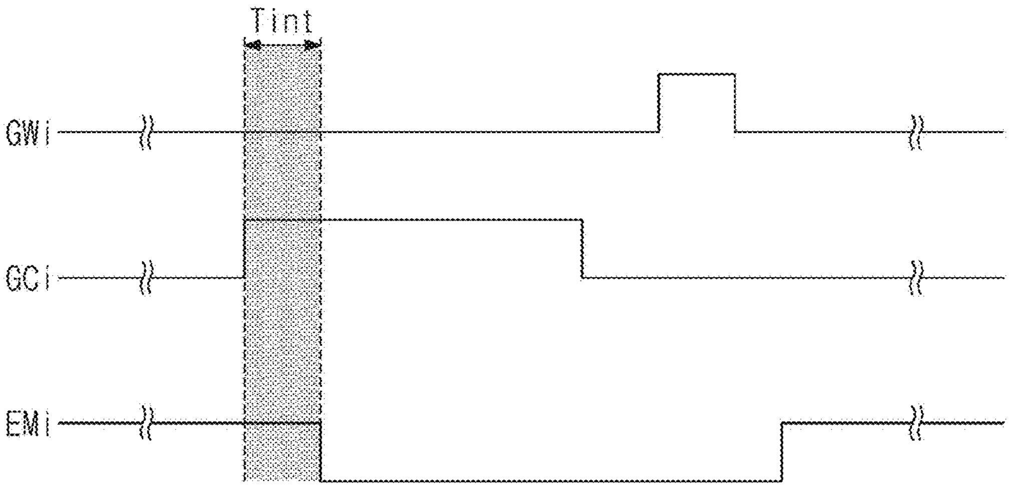

FIGS. 5A and 5B are drawings for describing an operation of the pixel PXij during an initialization period Tint, according to some embodiments of the present disclosure.

Referring to FIGS. 5A and 5B, during the initialization period Tint, each of the i-th compensation scan signal GCi and the i-th emission control signal EMi may have an active level (e.g., a high level), and the i-th write scan signal GWi may have an inactive level (e.g., a low level).

During the initialization period Tint, the third transistor T3 and the fourth transistor T4 are turned on in response to the i-th compensation scan signal GCi. Accordingly, during the initialization period Tint, the first node N1 is initialized to the reference voltage Vref, and the fourth node N4 is initialized to the first driving voltage ELVDD.

During the initialization period Tint, the first and second emission control transistors ET1 and ET2 are turned on in response to the i-th emission control signal EMi. Accordingly, during the initialization period Tint, the cathode of the light emitting element ED may be initialized to the first driving voltage ELVDD, and the second node N2 may be initialized to the second driving voltage ELVSS.

As the first node N1 and the second node N2 are initialized simultaneously (or concurrently) during the initialization period Tint, the first capacitor C1 may be initialized to a difference value between the reference voltage Vref and the second driving voltage ELVSS. The second capacitor C2 may be initialized to a difference value between the second driving voltage ELVSS and a high level voltage (e.g., about 14 V) of the i-th emission control signal EMi. The initialization period Tint may be defined as a period, during which the gate electrode and the second electrode (i.e., the source) of the first transistor T1 are initialized, and may be defined as a period during which the cathode of the light emitting element ED is initialized.

Because a potential difference (i.e., a gate-source voltage "Vgs" of the first transistor T1) between the first and second nodes N1 and N2 is smaller than a threshold voltage "Vth" of the first transistor T1 during the initialization period Tint, the first transistor T1 may be turned off.

The initialization period Tint may be terminated at a time point at which the i-th emission control signal EMi is inactive.

Figure 6A:
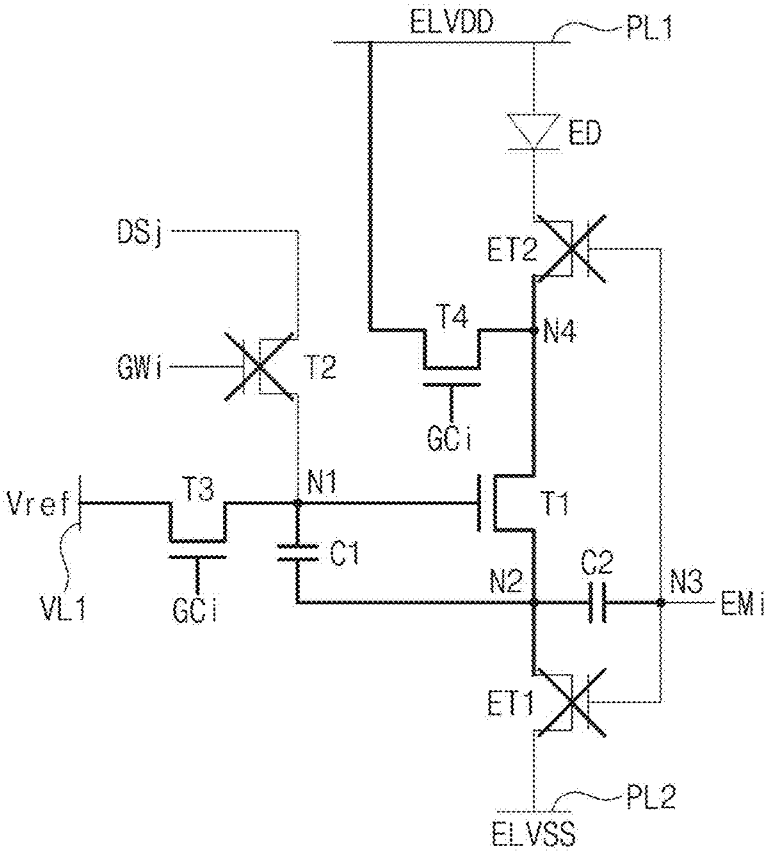
FIGS. 6A and 6B are drawings for describing an operation of a pixel during a compensation period, according to some embodiments of the present disclosure.
Figure 6B:
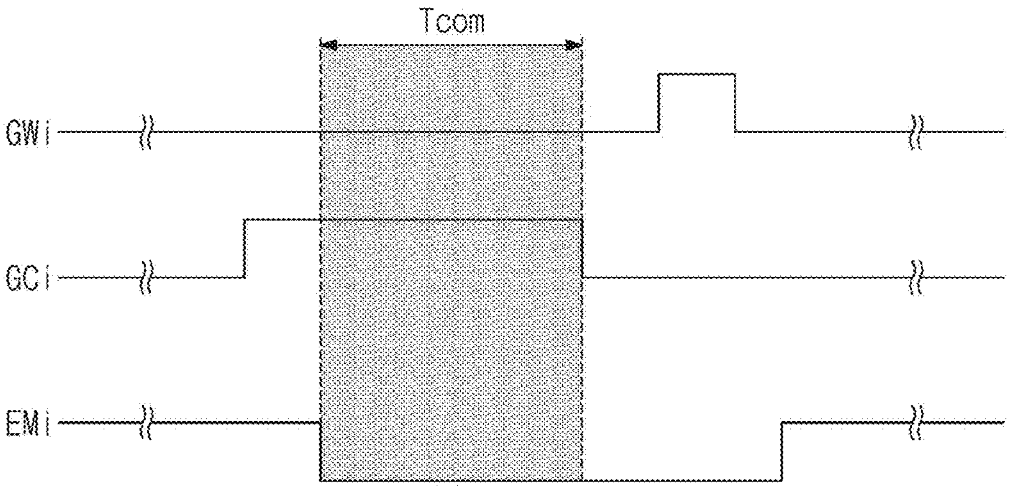

FIGS. 6A and 6B are drawings for describing an operation of the pixel PXij during a compensation period Tcom, according to some embodiments of the present disclosure.

Referring to FIGS. 6A and 6B, when the initialization period Tint (see FIG. 5B) is terminated, the compensation period Tcom occurs. In other words, the compensation period Tcom lags behind the initialization period Tint.

During the compensation period Tcom, the i-th compensation scan signal GCi may have an active level (e.g., a high level), and the i-th write scan signal GWi and the i-th emission control signal EMi may have inactive levels (e.g., low levels). The compensation period Tcom may start at a time point at which the i-th emission control signal EMi is inactive.

During the compensation period Tcom, the third transistor T3 and the fourth transistor T4 may be maintained to be turned on in response to the i-th compensation scan signal GCi. Accordingly, during the compensation period Tcom, the reference voltage Vref may be applied to the first node N1, and the first driving voltage ELVDD may be applied to the fourth node N4.

During the compensation period Tcom, the first and second emission control transistors ET1 and ET2 may be turned off in response to the i-th emission control signal EMi. Accordingly, at the start time point of the compensation period Tcom, potential "Vs" of the second node N2 may change from the second driving voltage ELVSS to "Vref−Vth". During the compensation period Tcom, a voltage level of the i-th emission control signal EMi is lowered to a low level (e.g., about −4 V). As the voltage level of the i-th emission control signal EMi is lowered to the low level, the potential "Vs" of the second node N2 may be lowered by the second capacitor C2 to be smaller than "Vref−Vth". When the potential "Vs" of the second node N2 decreases in a situation where potential "Vg" of the first node N1 is maintained at the reference voltage Vref, the gate-source voltage "Vgs" becomes greater than the threshold voltage "Vth".

When the gate-source voltage "Vgs" becomes greater than the threshold voltage "Vth", the first transistor T1 may be turned on, and the threshold voltage "Vth" of the first transistor T1 may be compensated by the coupling of the first capacitor C1.

The compensation period Tcom may be terminated at a time point at which the i-th compensation scan signal GCi is inactive.

Figure 7A:
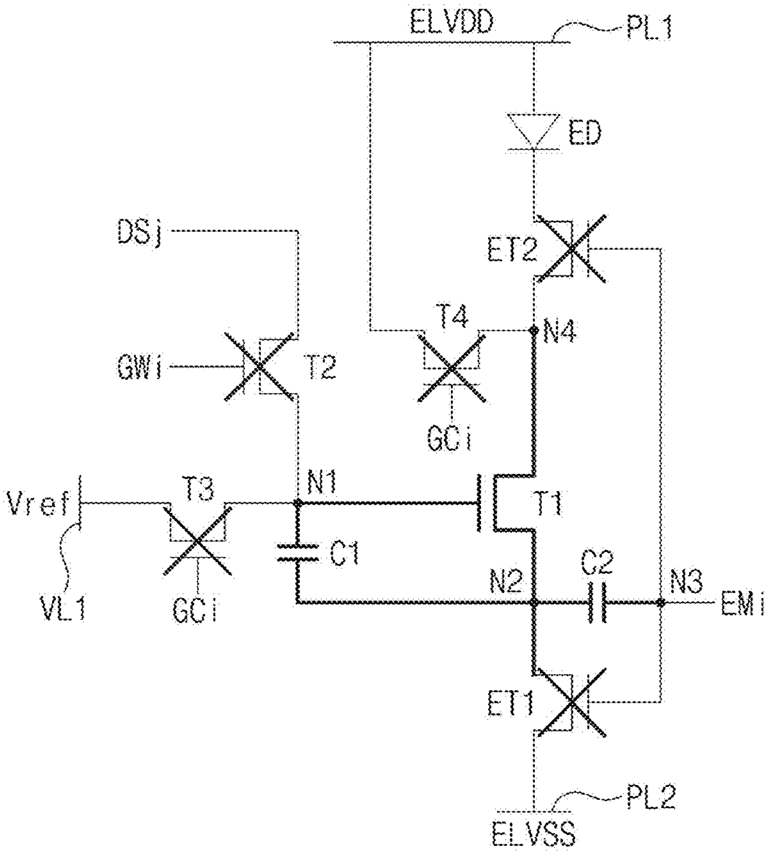
FIGS. 7A and 7B are drawings for describing an operation of a pixel during an interval period, according to some embodiments of the present disclosure.
Figure 7B:
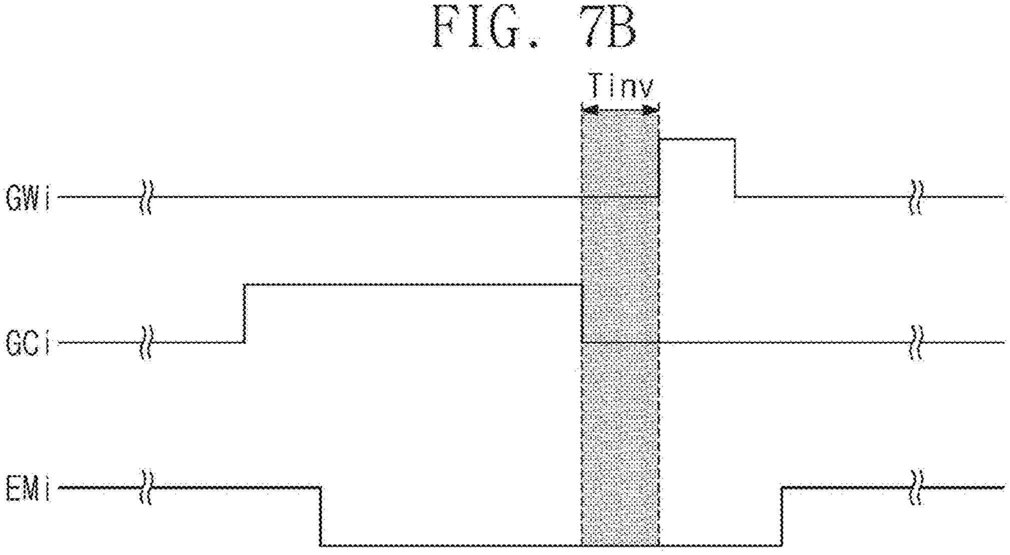

FIGS. 7A and 7B are diagrams for describing an operation of the pixel PXij during an interval period Tinv, according to some embodiments of the present disclosure.

Referring to FIGS. 7A and 7B, after the compensation period Tcom (see FIG. 6B), the interval period Tinv may be present.

During the interval period Tinv, the i-th compensation scan signal GCi, the i-th write scan signal GWi, and the i-th emission control signal EMi may have an inactive level (e.g., a low level). Accordingly, during the interval period Tinv, the second to fourth transistors T2 to T4 and the first and second emission control transistors ET1 and ET2 other than the first transistor T1 may be turned off.

The interval period Tinv may be terminated at a time point at which the i-th write scan signal GWi is active.

Figure 8A:
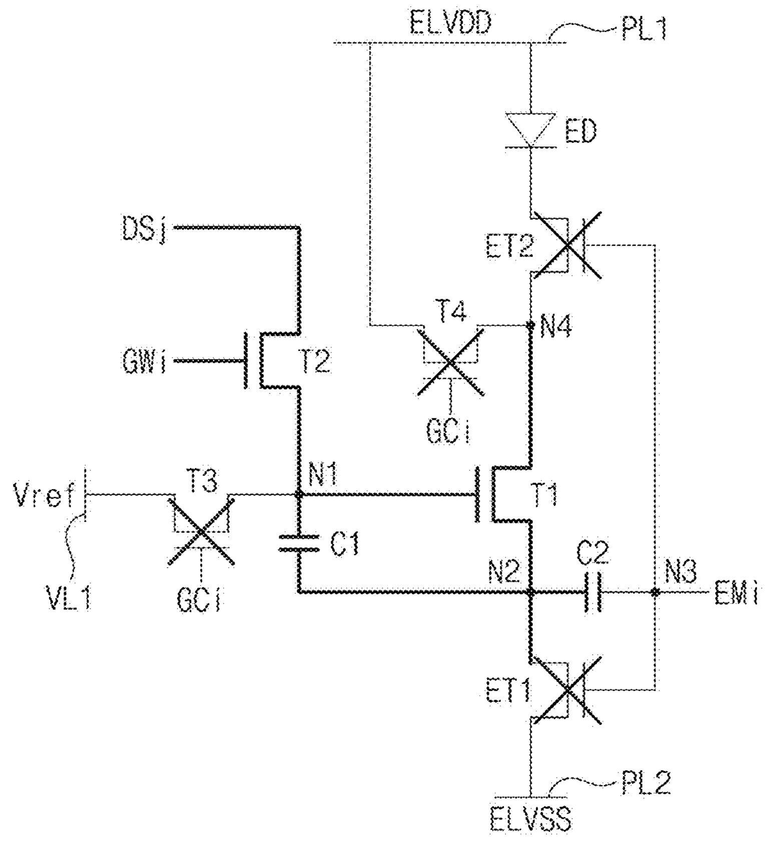
FIGS. 8A and 8B are drawings for describing an operation of a pixel during a data write period, according to some embodiments of the present disclosure.
Figure 8B:
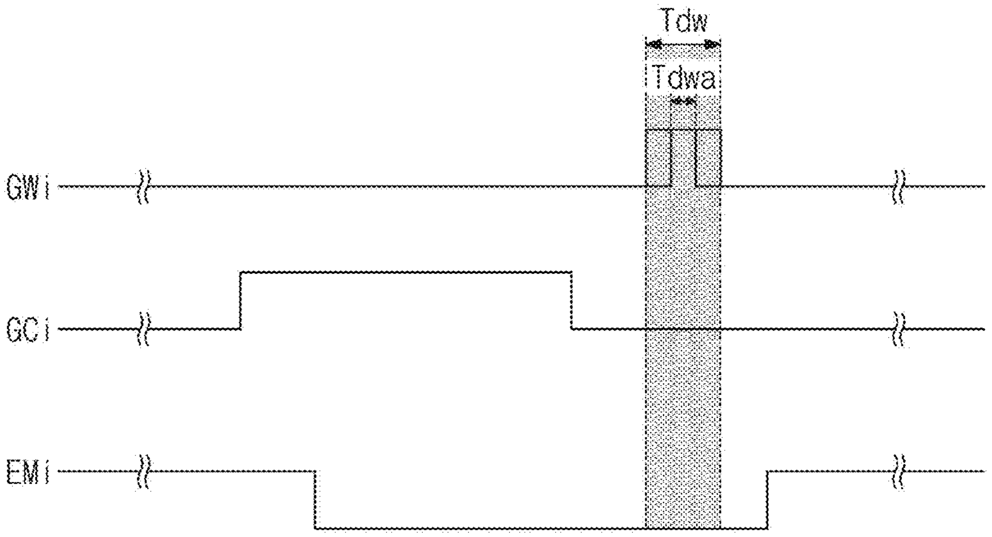

FIGS. 8A and 8B are drawings for describing an operation of a pixel during a data write period, according to some embodiments of the present disclosure.

Referring to FIGS. 8A and 8B, when the interval period Tinv (see FIG. 7B) is terminated, a data write period Tdw occurs. In other words, the data write period Tdw lags behind the compensation period Tcom and the interval period Tinv.

FIG. 7B illustrates that the interval period Tinv is present between the compensation period Tcom and the data write period Tdw, but the present disclosure is not limited thereto. For example, the interval period Tinv may be omitted between the compensation period Tcom and the data write period Tdw, and the data write period Tdw may occur immediately after the compensation period Tcom.

During the data write period Tdw, the i-th write scan signal GWi may have an active level (e.g., a high level), and the i-th compensation scan signal GCi and the i-th emission control signal EMi may have inactive levels (e.g., low levels). The data write period Tdw may start at a time point at which the i-th write scan signal GWi is active.

During the data write period Tdw, the second transistor T2 may be turned on in response to the i-th write scan signal GWi. Accordingly, during the data write period Tdw, the j-th data signal DSj may be applied to the first node N1. Accordingly, the potential "Vg" of the first node N1 is converted from the reference voltage Vref to a data voltage Vdata corresponding to the j-th data signal DSj.

When the potential "Vg" of the first node N1 is converted from the reference voltage Vref to the data voltage Vdata, the potential "Vs" of the second node N2 is changed by the coupling of the first capacitor C1. In detail, the potential "Vs" of the second node N2 satisfies Equation 1 below.

$$Vs = Vref - Vth + \frac{C1}{C1 + C2}(Vdata - Vref) \quad \text{Equation 1}$$

A component for the threshold voltage "Vth" of the first transistor T1 as well as the data voltage Vdata may be included in the potential "Vs" of the second node N2 by the coupling of the first capacitor C1 and the second capacitor C2.

During the data write period Tdw, the i-th compensation scan signal GCi has an inactive level, and thus the fourth transistor T4 may be turned off. In other words, during the data write period Tdw, the first electrode of the first transistor T1 may be in a floating state, and thus the potential "Vs" of the second node N2 may change due to the current (i.e., leakage current) flowing through the first electrode of the first transistor T1. When the potential "Vs" of the second node N2 changes, the gate-source voltage "Vgs" of the first transistor T1 may also change. As a result, as the data write period Tdw becomes longer, the time for the data voltage Vdata written to the first node N1 to be affected by a leakage current may increase. Accordingly, the data write period Tdw may be set to be smaller than or equal to the horizontal scan period 1H, thereby minimizing the influence of the leakage current on the gate-source voltage "Vgs" and, as a result, accurately writing the data voltage Vdata to the first node N1. According to some embodiments of the present disclosure, the duration of a data write period Tdwa may correspond to ½ or ⅓ of the duration of the horizontal scan period 1H. The data write period Tdw may be terminated at a time point at which the i-th write scan signal GWi is inactive.

Figure 9A:
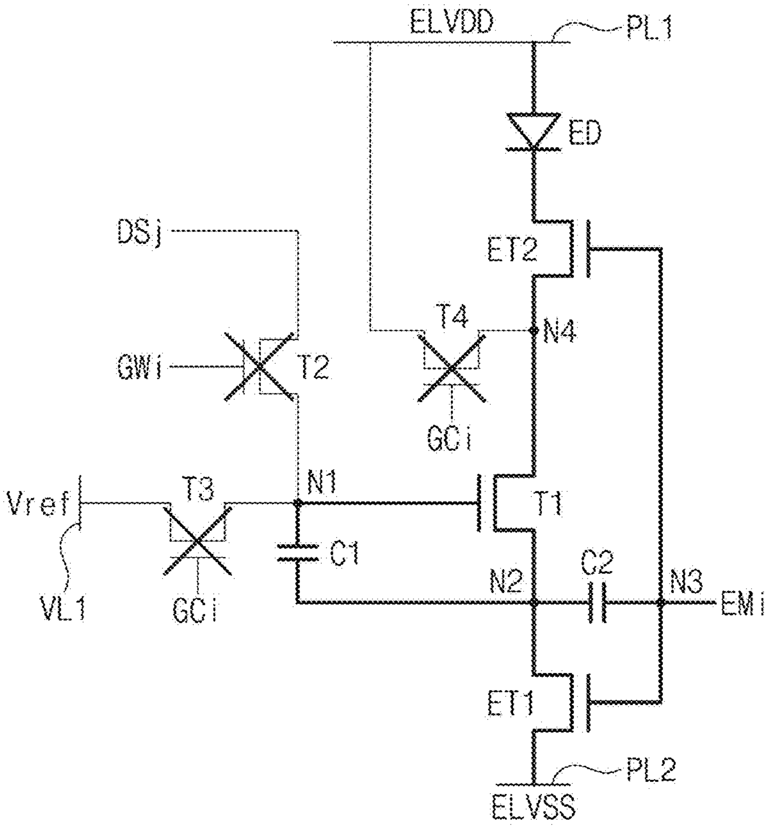
FIGS. 9A and 9B are drawings for describing an operation of a pixel during an emission period, according to some embodiments of the present disclosure.
Figure 9B:
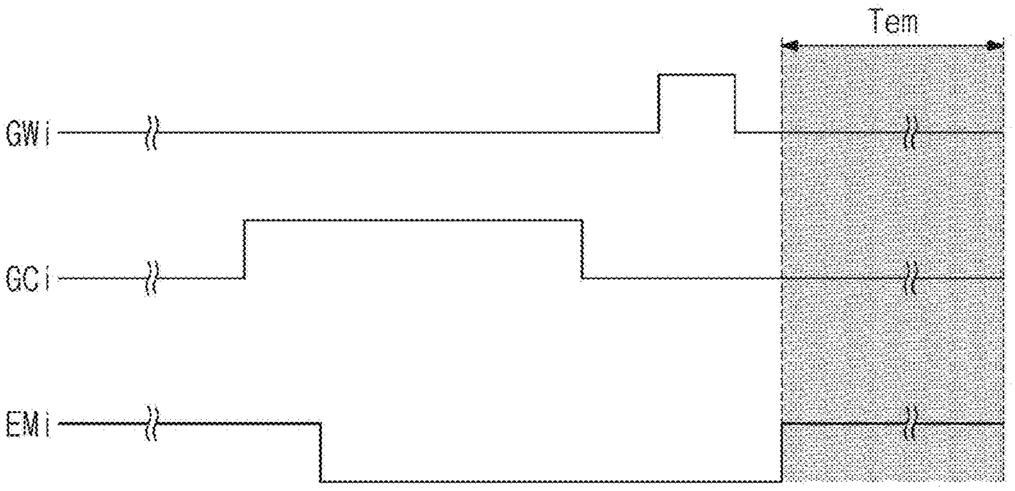

FIGS. 9A and 9B are drawings for describing an operation of a pixel during an emission period, according to some embodiments of the present disclosure.

Referring to FIGS. 9A and 9B, when the data write period Tdw (see FIG. 8B) is terminated, an emission period Tem occurs. In other words, the emission period Tem lags behind the data write period Tdw.

During the emission period Tem, the i-th compensation scan signal GCi and the i-th write scan signal GWi may have inactive levels (e.g., low levels), and the i-th emission control signal EMi may have an active level (e.g., a high level). The emission period Tem may start at a time point at which the i-th emission control signal EMi is active.

During the emission period Tem, the first transistor T1 may maintain the turn-on state by the gate-source voltage "Vgs" of the first transistor T1 corresponding to a difference voltage stored in the first capacitor C1. During the emission period Tem, the first and second emission control transistors ET1 and ET2 may be turned on in response to the i-th emission control signal EMi. When a voltage level of the i-th emission control signal EMi is converted into the active level during the emission period Tem, the potential "Vs" of the second node N2 may increase due to the coupling of the second capacitor C2. Because the potential "Vg" of the first node N1 also increases due to the coupling of the first capacitor C1 even when the potential "Vs" of the second node N2 increases, the gate-source voltage "Vgs" of the first transistor T1 may be maintained as it is during the emission period Tem. Here, the gate-source voltage "Vgs" of the first transistor T1 may satisfy Equation 2 below.

$$Vgs = Vth + \frac{C2}{C1 + C2}(Vdata) - \frac{C2}{C1 + C2}(Vref) \quad \text{Equation 2}$$

In the meantime, during the emission period Tem, the cathode of the light emitting element ED and the first transistor T1 may be electrically connected to each other through the second emission control transistor ET2 turned on. Moreover, during the emission period Tem, the first transistor T1 may be electrically connected to the second power line PL2 through the first emission control transistor ET1 turned on. Accordingly, a driving current may flow between the first power line PL1 and the second power line PL2.

According to some embodiments of the present disclosure, the threshold voltage "Vth" of the first transistor T1 may not affect the current flowing through the light emitting element ED. The threshold voltage "Vth" of the first transistor T1 included in each of the pixels PX (see FIG. 1) may be different depending on characteristics of the first transistor T1. However, regardless of the characteristics of the first transistor T1 included in each of the pixels PX (see FIG. 1), the current flowing through the light emitting element ED during the subsequent emission period Tem may be constant. Accordingly, the overall display quality of the display device DD (see FIG. 1) may be relatively improved.

Figure 10:
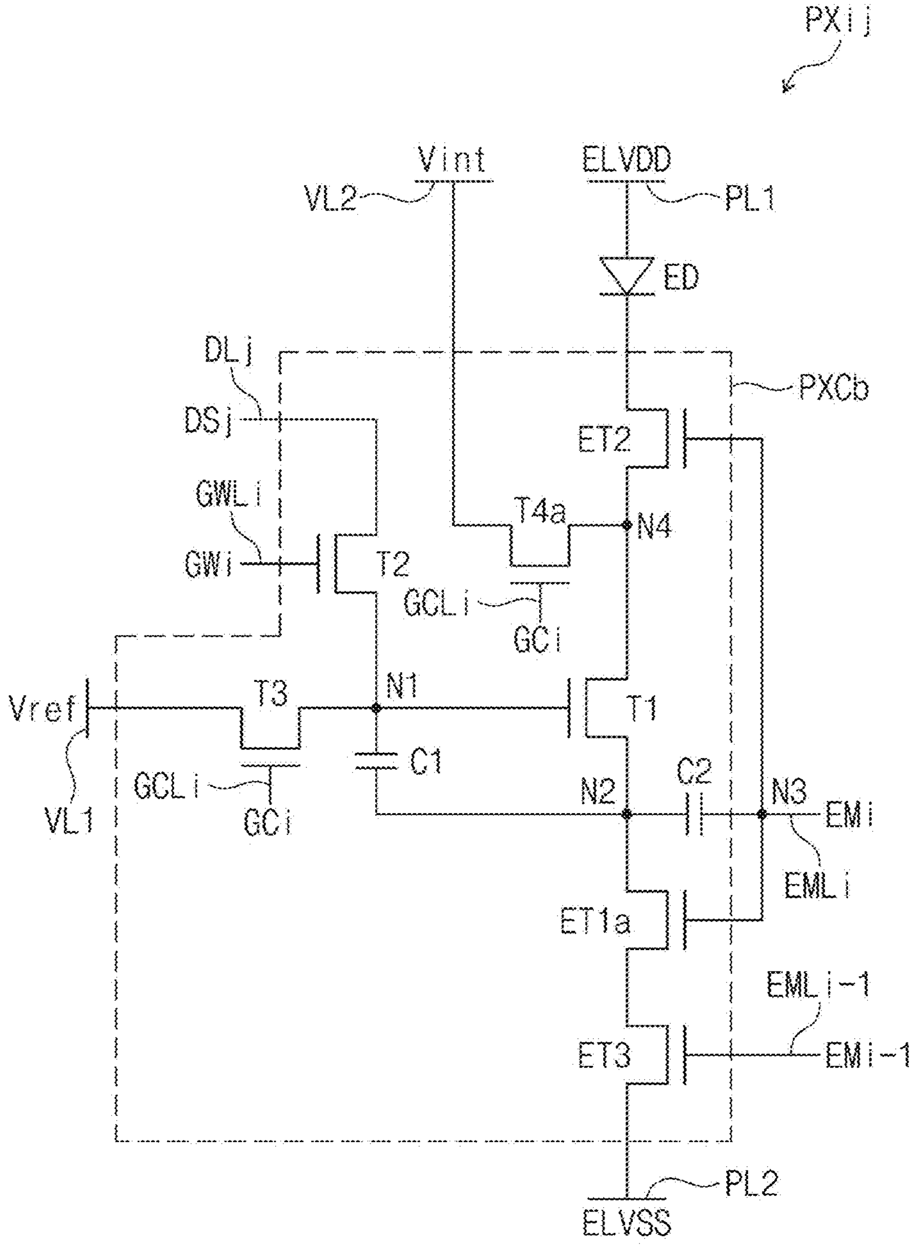
FIG. 10 is a circuit diagram of a pixel, according to some embodiments of the present disclosure.

FIG. 10 is a circuit diagram of a pixel PXij, according to some embodiments of the present disclosure. Although FIG. 10 illustrates various components in a pixel according to some embodiments, embodiments according to the present disclosure are not limited thereto, and according to various embodiments, the pixel may include additional components or fewer components without departing from the spirit and scope of embodiments according to the present disclosure.

Figure 11:
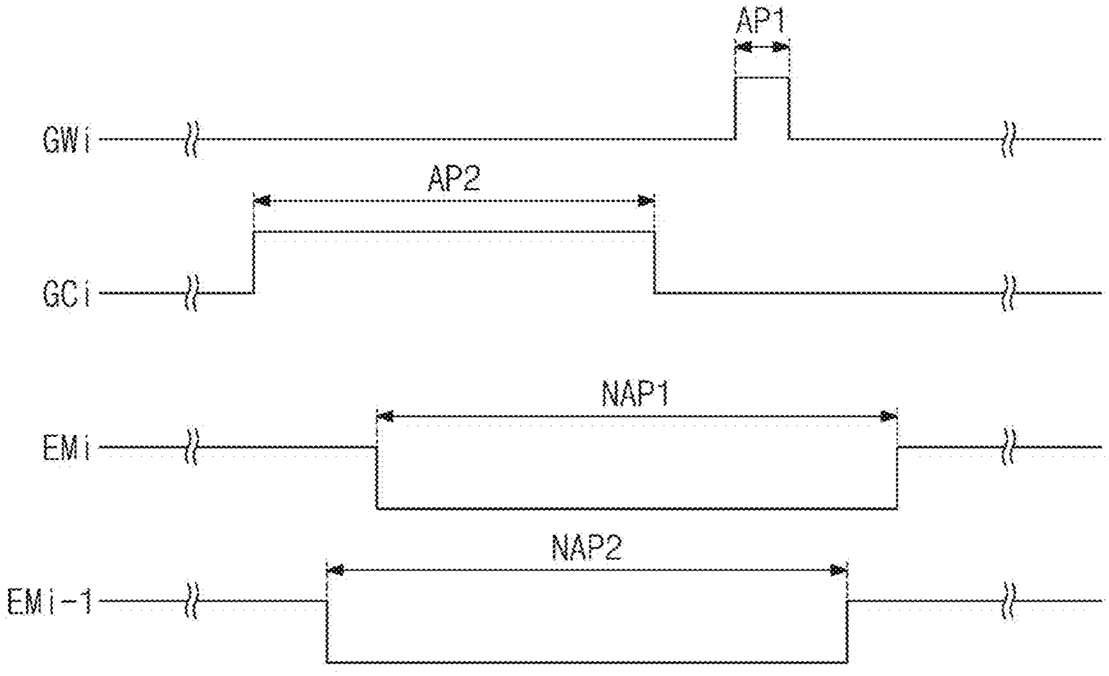
FIG. 11 is a waveform diagram illustrating signals applied to a pixel shown in FIG. 10.

FIG. 11 is a waveform diagram illustrating signals applied to the pixel PXij shown in FIG. 10. However, the same reference numerals are given to the same components as those shown in FIG. 3 among the components shown in FIG. 10, and thus some repetitive detailed description thereof may be omitted.

Referring to FIG. 10, the pixel PXij may include a pixel circuit PXCb (or a pixel driving circuit) and the light emitting element ED electrically connected to the pixel circuit PXCb. According to some embodiments, the pixel circuit PXCb may include seven transistors (referred to as "first to fourth transistors T1 to T4*a* and first to third emission control transistors ET1*a*, ET2, and ET3"), and two capacitors (referred to as "the first capacitor C1 and the second capacitor C2"). According to some embodiments of the present disclosure, one of the seven transistors of the pixel circuit PXCb may be omitted, or an additional transistor may be further included in the pixel circuit PXCb.

According to some embodiments, the first to fourth transistors T1 to T4*a*, the first to third emission control transistors ET1*a*, ET2, and ET3 may each be an N-type transistor having an oxide semiconductor as a semiconductor layer.

The fourth transistor T4*a* is connected between the initialization voltage line VL2 and the fourth node N4 to receive the i-th compensation scan signal GCi. The fourth transistor T4*a* may include a first electrode connected to the initialization voltage line VL2, a second electrode connected to the first electrode of the first transistor T1 (i.e., the fourth node N4), and a gate electrode connected to the i-th compensation scan line GCLi. The fourth transistor T4*a* may be turned on in response to the i-th compensation scan signal GCi received through the i-th compensation scan line GCLi to deliver the initialization voltage Vint applied to the initialization voltage line VL2 to the fourth node N4.

The first emission control transistor ET1*a* may be connected between the first transistor T1 and the third emission control transistor ET3 to receive the i-th emission control signal EMi. The first emission control transistor ET1*a* may include a first electrode connected to the second electrode of the first transistor T1, a second electrode connected to the third emission control transistor ET3, and a gate electrode connected to the i-th emission control line EMLi. The first emission control transistor ET1*a* may be turned on in response to the i-th emission control signal EMi received through the i-th emission control line EMLi so as to electrically connect the third emission control transistor ET3 to the second electrode of the first transistor T1. The gate electrode of the first emission control transistor ET1*a* may be connected to the i-th emission control line EMLi through the third node N3.

The third emission control transistor ET3 may be connected between the first emission control transistor ET1*a* and the second power line PL2 to receive a (i−1)-th emission control signal EMi−1 (or referred to as a "third emission control signal"). The third emission control transistor ET3 may include a first electrode connected to the second electrode of the first emission control transistor ET1*a*, a second electrode connected to the second power line PL2, and a gate electrode connected to an (i−1)-th emission control line EMLi−1. The third emission control transistor ET3 may be turned on in response to the (i−1)-th emission control signal EMi−1 received through the (i−1)-th emission control line EMLi−1 so as to electrically connect the second power line PL2 to the second electrode of the first emission control transistor ET1*a*.

Referring to FIG. 11, each of the i-th write scan signal GWi, the i-th compensation scan signal GCi, the i-th emission control signal EMi, and the (i−1)-th emission control signal EMi−1 may have an active level (or a high level) during some periods (i.e., active periods) and may have an inactive level (or a low level) during the remaining periods (i.e., inactive periods). When the above-described seven transistors T1 to T4*a*, ET1*a*, ET2, and ET3 are N-type transistors, the active level of each of the i-th write scan signal GWi, the i-th compensation scan signal GCi, the i-th emission control signal EMi, and the (i−1)-th emission control signal EMi−1 may be a high level. Alternatively, when the seven transistors T1 to T4*a*, ET1*a*, ET2, and ET3 are P-type transistors, the active level of each of the i-th write scan signal GWi, the i-th compensation scan signal GCi, the i-th emission control signal EMi, and the (i−1)-th emission control signal EMi−1 may be a low level.

The (i−1)-th emission control signal EMi−1 may be a signal deactivated before the i-th emission control signal EMi. Accordingly, the start time point of an inactive period NAP2 of the (i−1)-th emission control signal EMi−1 precedes the start time point of an inactive period NAP1 of the i-th emission control signal EMi. The inactive period NAP1 of the i-th emission control signal EMi and the inactive period NAP2 of the (i−1)-th emission control signal EMi−1 may overlap the active period AP1 of the i-th write scan signal GWi and the active period AP2 of the i-th compensation scan signal GCi. According to some embodiments of the present disclosure, the active period AP1 of the i-th write scan signal GWi may have duration smaller than or equal to the duration of the horizontal scan period 1H, and the active period AP2 of the i-th compensation scan signal GCi may have duration greater than the duration of the horizontal scan period 1H.

Figure 12A:
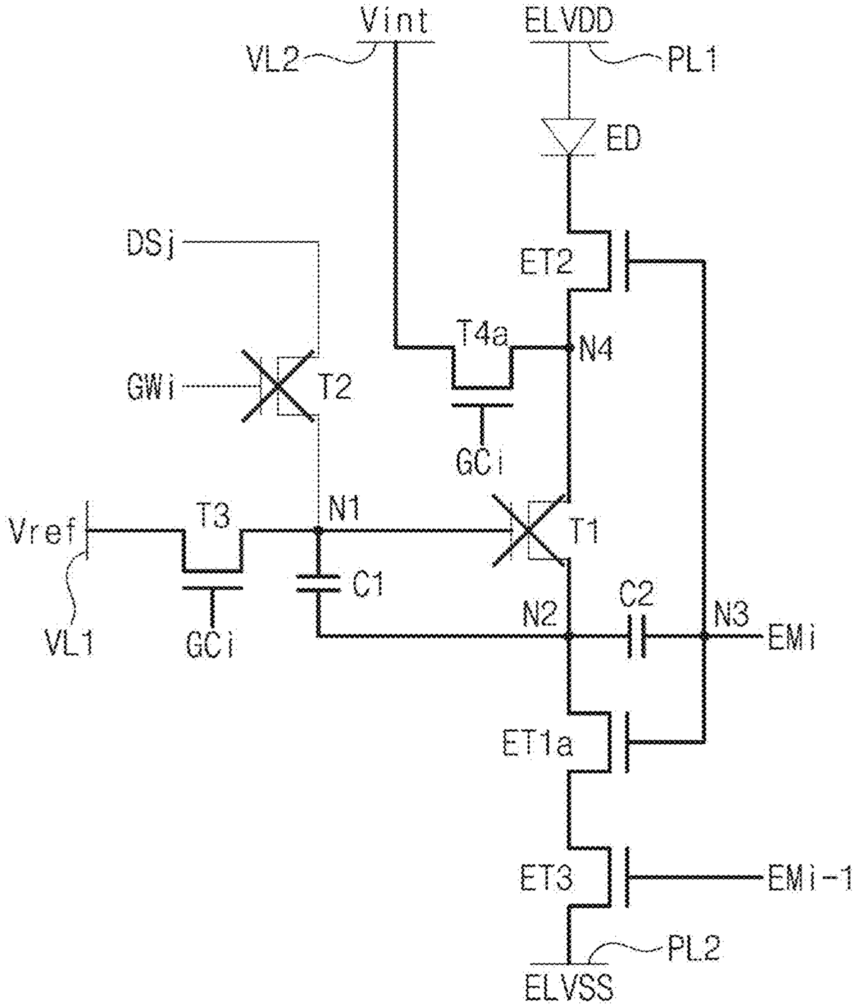
FIGS. 12A and 12B are drawings for describing an operation of a pixel during an initialization period, according to some embodiments of the present disclosure.
Figure 12B:
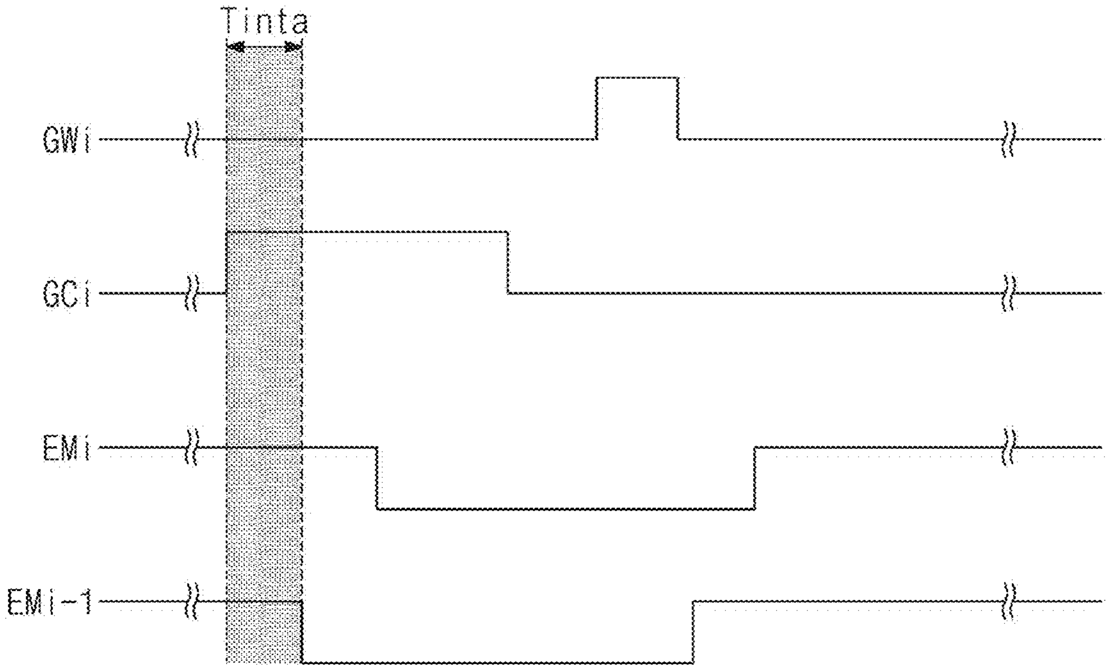

FIGS. 12A and 12B are drawings for describing an operation of the pixel PXij during an initialization period Tinta, according to some embodiments of the present disclosure.

Referring to FIGS. 12A and 12B, during the initialization period Tinta, each of the i-th compensation scan signal GCi, the (i−1)-th emission control signal EMi−1, and the i-th emission control signal EMi may have an active level (e.g., a high level), and the i-th write scan signal GWi may have an inactive level (e.g., a low level).

During the initialization period Tinta, the third transistor T3 and the fourth transistor T4*a* are turned on in response to the i-th compensation scan signal GCi. Accordingly, during the initialization period Tinta, the first node N1 is initialized to the reference voltage Vref, and the fourth node N4 is initialized to the initialization voltage Vint.

During the initialization period Tinta, the first and second emission control transistors ET1*a* and ET2 are turned on in response to the i-th emission control signal EMi. Accordingly, during the initialization period Tinta, the cathode of the light emitting element ED may be initialized to the first driving voltage ELVDD. During the initialization period Tinta, the third emission control transistor ET3 is turned on in response to the (i−1)-th emission control signal EMi−1. Accordingly, the second node N2 may be initialized to the second driving voltage ELVSS through the first and third emission control transistors ET1*a* and ET3 turned on.

As the first node N1 and the second node N2 are initialized simultaneously (or concurrently) during the initialization period Tinta, the first capacitor C1 may be initialized to a difference value between the reference voltage Vref and the second driving voltage ELVSS. The second capacitor C2 may be initialized to a difference value between the second driving voltage ELVSS and a high level voltage (e.g., about 14 V) of the i-th emission control signal EMi. The initialization period Tinta may be defined as a period, during which the gate electrode and the second electrode (i.e., the source) of the first transistor T1 are initialized, and may be defined as a period during which the cathode of the light emitting element ED is initialized.

During the initialization period Tinta, a potential difference (i.e., the gate-source voltage "Vgs" of the first transistor T1) between the first and second nodes N1 and N2 is smaller than the threshold voltage "Vth" of the first transistor T1, and thus the first transistor T1 may be turned off.

The initialization period Tinta may be terminated at a time point at which the (i−1)-th emission control signal EMi−1 is inactive.

Figure 13A:
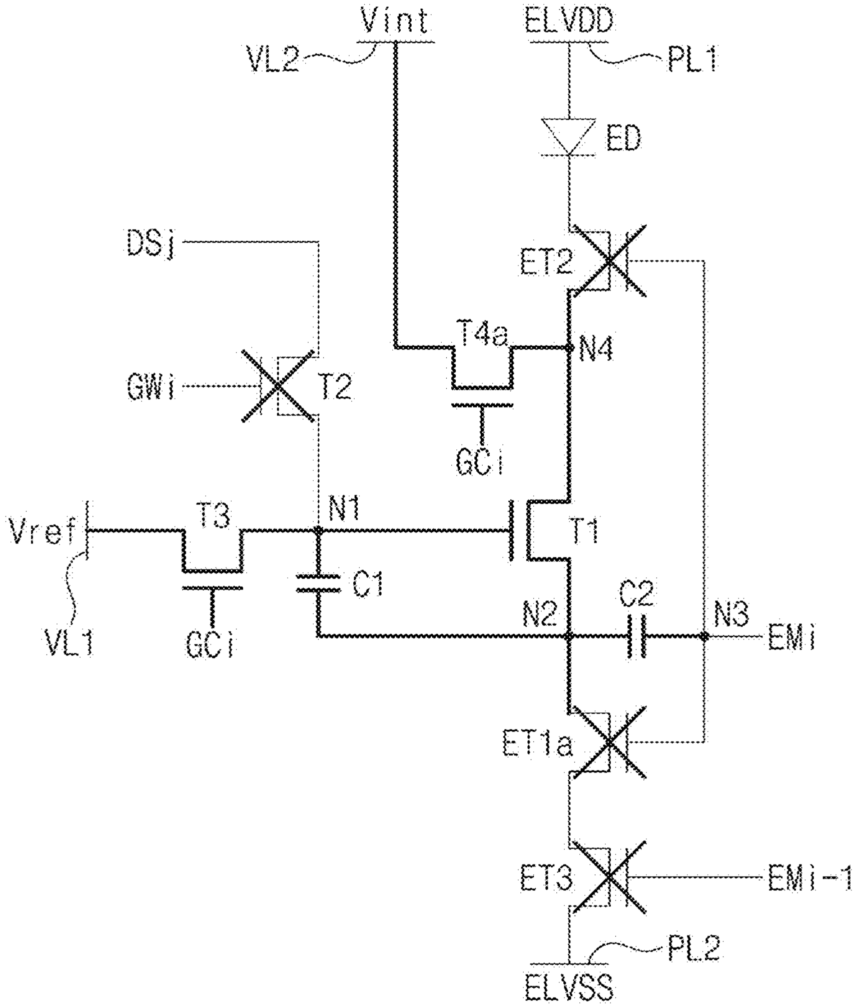
FIGS. 13A and 13B are drawings for describing an operation of a pixel during a compensation period, according to some embodiments of the present disclosure.
Figure 13B:
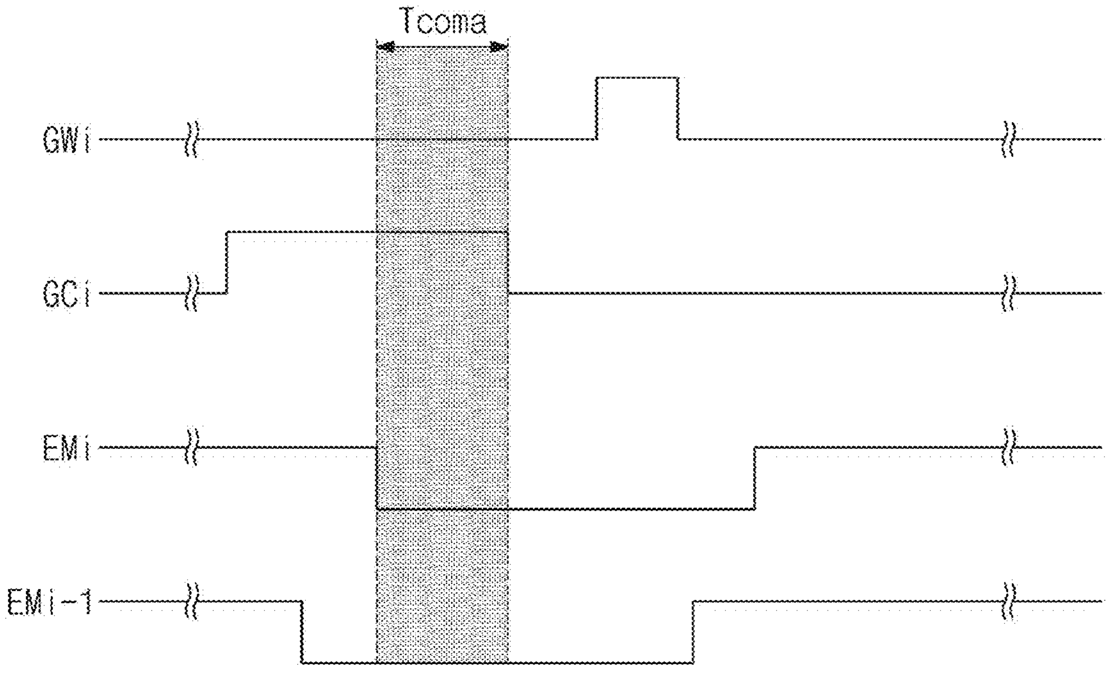

FIGS. 13A and 13B are drawings for describing an operation of a pixel during a compensation period, according to some embodiments of the present disclosure.

Referring to FIGS. 13A and 13B, when the initialization period Tinta (see FIG. 12B) is terminated, a compensation period Tcoma occurs. In other words, the compensation period Tcoma lags behind the initialization period Tinta.

During the compensation period Tcoma, the i-th compensation scan signal GCi may have an active level (e.g., a high level), and the i-th write scan signal GWi, the (i−1)-th emission control signal EMi−1, and the i-th emission control signal EMi may have inactive levels (e.g., low levels). The compensation period Tcoma may start at a time point at which the i-th emission control signal EMi is inactive.

During the compensation period Tcoma, the third transistor T3 and the fourth transistor T4*a* may be maintained to be turned on in response to the i-th compensation scan signal GCi. Accordingly, during the compensation period Tcoma, the reference voltage Vref may be applied to the first node N1, and the initialization voltage Vint may be applied to the fourth node N4.

During the compensation period Tcoma, the first and second emission control transistors ET1*a* and ET2 may be turned off in response to the i-th emission control signal EMi. Furthermore, during the compensation period Tcoma, the third emission control transistor ET3 may be turned off in response to the (i−1)-th emission control signal EMi−1. Accordingly, at the start time point of the compensation period Tcoma, potential "Vs" of the second node N2 may change from the second driving voltage ELVSS to "Vref−Vth". During the compensation period Tcoma, a voltage level of the i-th emission control signal EMi is lowered to a low level (e.g., about −4 V). As the i-th emission control signal EMi has a low level, the potential "Vs" of the second node N2 may be lowered by the second capacitor C2 to be smaller than "Vref−Vth". When the potential "Vs" of the second node N2 decreases in a situation where potential "Vg" of the first node N1 is maintained at the reference voltage Vref, the gate-source voltage "Vgs" becomes greater than the threshold voltage "Vth".

When the gate-source voltage "Vgs" becomes greater than the threshold voltage "Vth", the first transistor T1 may be turned on, and the threshold voltage "Vth" of the first transistor T1 may be compensated by the coupling of the first capacitor C1.

The compensation period Tcoma may be terminated at a time point at which the i-th compensation scan signal GCi is inactive.

Figure 14:
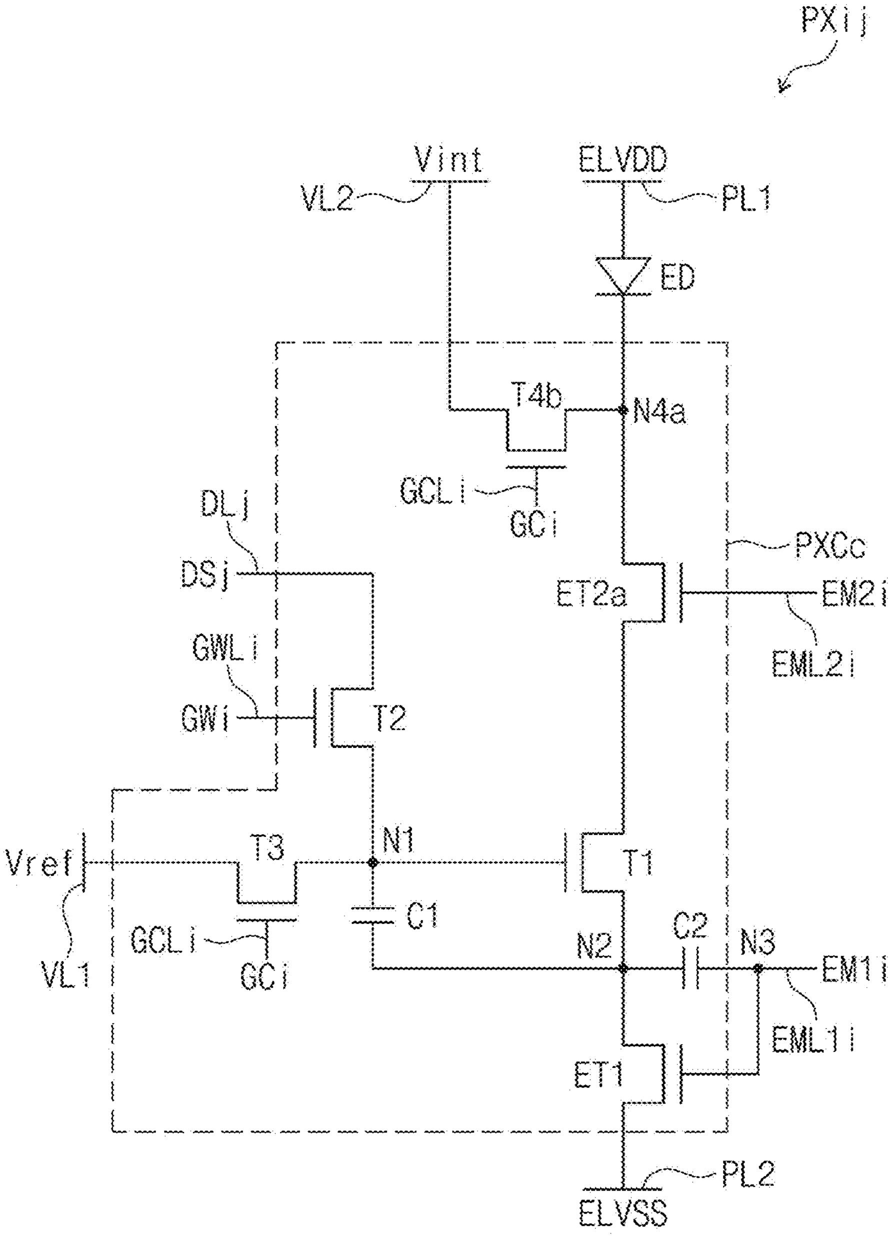
FIG. 14 is a circuit diagram of a pixel, according to some embodiments of the present disclosure.

FIG. 14 is a circuit diagram of a pixel PXij, according to some embodiments of the present disclosure. Although FIG. 14 illustrates various components in a pixel according to some embodiments, embodiments according to the present disclosure are not limited thereto, and according to various embodiments, the pixel may include additional components or fewer components without departing from the spirit and scope of embodiments according to the present disclosure.

Figure 15:
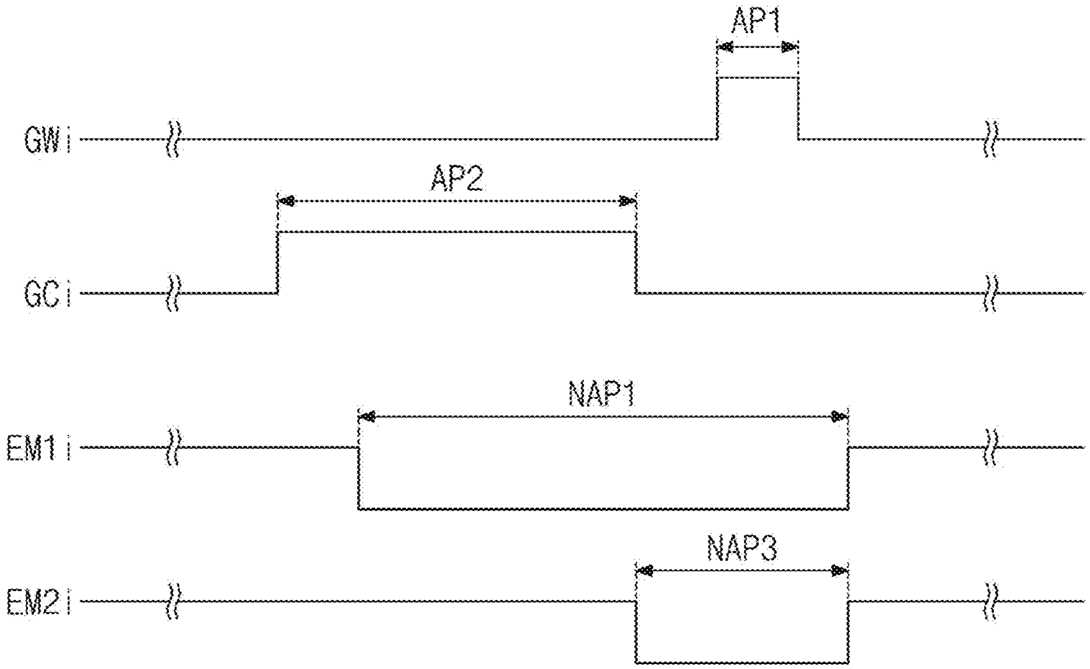
FIG. 15 is a waveform diagram illustrating signals applied to a pixel shown in FIG. 14.

FIG. 15 is a waveform diagram illustrating signals applied to the pixel PXij shown in FIG. 14. However, the same reference numerals are given to the same components as those shown in FIG. 10 among the components shown in FIG. 14, and thus some repetitive detailed description thereof may be omitted.

Referring to FIG. 14, the pixel PXij may include a pixel circuit PXCc (or a pixel driving circuit) and the light emitting element ED electrically connected to the pixel circuit PXCc. According to some embodiments, the pixel circuit PXCc may include six transistors (referred to as "first to fourth transistors T1 to T4*b* and first and second emission control transistors ET1 and ET2*a*"), and two capacitors (referred to as "the first capacitor C1 and the second capacitor C2"). According to some embodiments of the present disclosure, one of the six transistors of the pixel circuit PXCc may be omitted, or an additional transistor may be further included in the pixel circuit PXCc.

According to some embodiments, the first to fourth transistors T1 to T4*b*, the first and second emission control transistors ET1 and ET2*a* may each be an N-type transistor having an oxide semiconductor as a semiconductor layer.

The fourth transistor T4*b* is connected between the initialization voltage line VL2 and a fourth node N4*a* to receive the i-th compensation scan signal GCi. The fourth transistor T4*b* may include a first electrode connected to the initialization voltage line VL2, a second electrode connected to a cathode (i.e., the fourth node N4*a*) of the light emitting element ED, and a gate electrode connected to the i-th compensation scan line GCLi. The fourth transistor T4*b* may be turned on in response to the i-th compensation scan signal GCi received through the i-th compensation scan line GCLi to deliver the initialization voltage Vint applied to the initialization voltage line VL2 to the fourth node N4*a*. The cathode of the light emitting element ED is directly connected to the fourth transistor T4*b* without going through the second emission control transistor ET2, and thus the entire active period AP2 of the i-th compensation scan signal GCi may be used as a period for initializing the cathode. Accordingly, the cathode of the light emitting element ED may be stably initialized.

The first emission control transistor ET1 may be connected between the first transistor T1 and the second power line PL2 to receive an i-th first emission control signal EM1*i* (or referred to as a "first emission control signal"). The first emission control transistor ET1 may include a first electrode connected to the second electrode of the first transistor T1, a second electrode connected to the second power line PL2, and a gate electrode connected to an i-th first emission control line EML1*i*. The first emission control transistor ET1 may be turned on by the i-th first emission control signal EM1*i* received through the i-th first emission control line EML1*i* so as to electrically connect the second power line PL2 to the second electrode of the first transistor T1. The gate electrode of the first emission control transistor ET1 may be connected to the i-th first emission control line EML1*i* through the third node N3.

The second emission control transistor ET2*a* may be connected between the first transistor T1 and the cathode (i.e., the fourth node N4*a*) of the light emitting element ED to receive an i-th second emission control signal EM2*i* (or referred to as a "second emission control signal"). The second emission control transistor ET2*a* may include a first electrode connected to the fourth node N4*a*, a second electrode connected to the first electrode of the first transistor T1, and a gate electrode connected to an i-th second emission control line EML2*i*. The second emission control transistor ET2*a* may be turned on in response to the i-th second emission control signal EM2*i* received through the i-th second emission control line EML2*i* to electrically connect the cathode of the light emitting element ED to the first electrode of the first transistor T1.

Referring to FIG. 15, each of the i-th write scan signal GWi, the i-th compensation scan signal GCi, the i-th first emission control signal EM1*i*, the i-th second emission control signal EM2*i* may have an active level (or a high level) during some periods (i.e., an active period), and may have an inactive level (or a low level) during the remaining periods (i.e., an inactive period). When the above-described six transistors T1 to T4*b*, ET1, and ET2*a* are N-type transistors, the active level of each of the i-th write scan signal GWi, the i-th compensation scan signal GCi, the i-th first emission control signal EM1*i*, the i-th second emission control signal EM2*i* may be a high level. Alternatively, when the six transistors T1 to T4*b*, ET1, and ET2*a* are P-type transistors, the active level of each of the i-th write scan signal GWi, the i-th compensation scan signal GCi, the i-th first emission control signal EM1*i*, the i-th second emission control signal EM2*i* may be a low level.

The i-th first emission control signal EM1*i* may be a signal deactivated before the i-th second emission control signal EM2*i*. Accordingly, the start time point of the inactive period NAP1 of the i-th first emission control signal EM1*i* precedes the start time point of an inactive period NAP3 of the i-th second emission control signal EM2*i*. The inactive period NAP1 of the i-th first emission control signal EM1*i* may overlap the active period AP1 of the i-th write scan signal GWi and the active period AP2 of the i-th compensation scan signal GCi. The inactive period NAP3 of the i-th second emission control signal EM2*i* may overlap the active period AP1 of the i-th write scan signal GWi and may not overlap the active period AP2 of the i-th compensation scan signal GCi.

During the active period AP2 of the i-th compensation scan signal GCi, the second emission control transistor ET2*a* may be turned on in response to the i-th second emission control signal EM2*i*. As a result, the initialization voltage Vint applied to the fourth node N4*a* through the fourth transistor T4*b* turned on during the initialization period Tint and the compensation period Tcom may be applied to the first electrode of the first transistor T1 through the second emission control transistor ET2*a* turned on. In other words, during the initialization period Tint and the compensation period Tcom, the cathode of the light emitting element ED and the first electrode of the first transistor T1 may stably maintain an initialization state.

According to some embodiments, the pixel circuit PXCc may further include the third emission control transistor ET3 (see FIG. 10) connected between the first emission control transistor ET1 and the second power line PL2.

Figure 16:
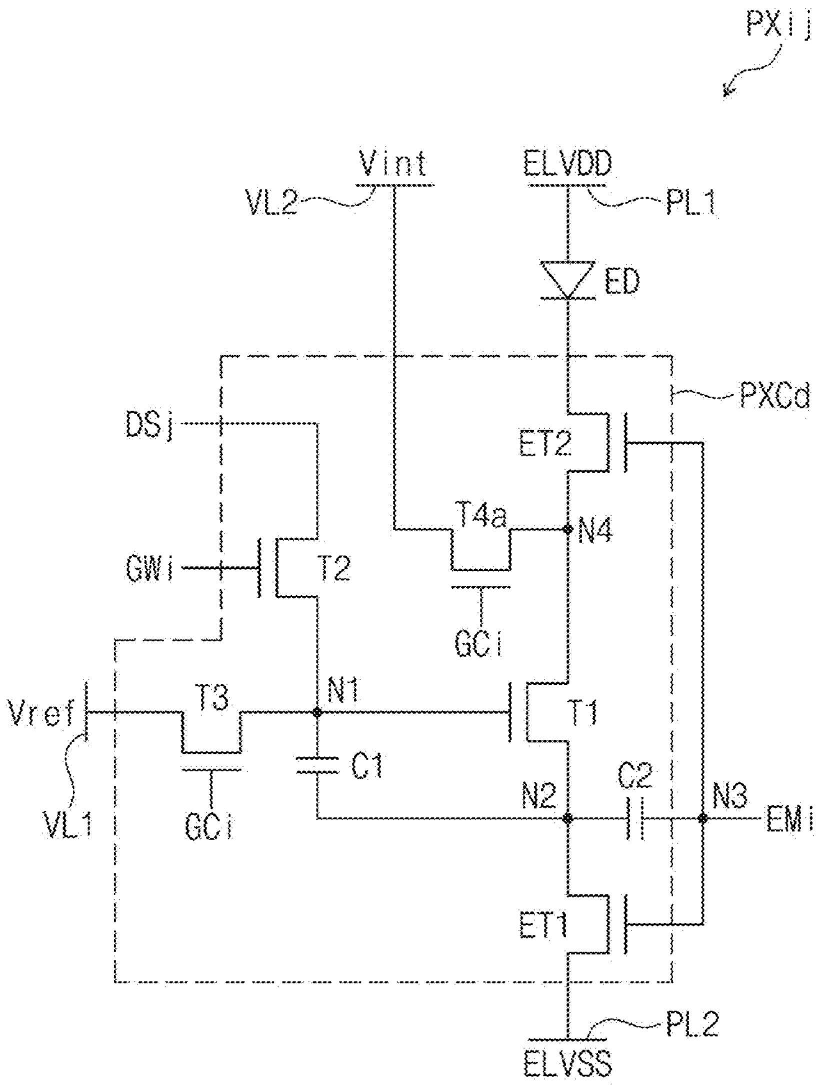
FIG. 16 is a circuit diagram of a pixel, according to some embodiments of the present disclosure.

FIG. 16 is a circuit diagram of a pixel PXij, according to some embodiments of the present disclosure. Although FIG. 16 illustrates various components in a pixel according to some embodiments, embodiments according to the present disclosure are not limited thereto, and according to various embodiments, the pixel may include additional components or fewer components without departing from the spirit and scope of embodiments according to the present disclosure.

However, the same reference numerals are given to the same components as those shown in FIG. 10 among the components shown in FIG. 16, and thus some repetitive detailed description thereof may be omitted.

Referring to FIG. 16, the pixel PXij may include a pixel circuit PXCd (or a pixel driving circuit) and the light emitting element ED electrically connected to the pixel circuit PXCd. According to some embodiments, the pixel circuit PXCd may include six transistors (referred to as "first to fourth transistors T1 to T4*a* and first and second emission control transistors ET1 and ET2"), and two capacitors (referred to as "the first capacitor C1 and the second capacitor C2"). According to some embodiments of the present disclosure, one of the six transistors of the pixel circuit PXCd may be omitted, or an additional transistor may be further included in the pixel circuit PXCd.

According to some embodiments, the first to fourth transistors T1 to T4*a*, the first and second emission control transistors ET1 and ET2 may each be an N-type transistor having an oxide semiconductor as a semiconductor layer.

The fourth transistor T4*a* is connected between the initialization voltage line VL2 and the fourth node N4 to receive the i-th compensation scan signal GCi. The fourth transistor T4*a* may include a first electrode connected to the initialization voltage line VL2, a second electrode connected to the first electrode of the first transistor T1 (i.e., the fourth node N4), and a gate electrode connected to the i-th compensation scan line GCLi. The fourth transistor T4*a* may be turned on in response to the i-th compensation scan signal GCi received through the i-th compensation scan line GCLi to deliver the initialization voltage Vint applied to the initialization voltage line VL2 to the fourth node N4. According to some embodiments of the present disclosure, the initialization voltage Vint may have different voltage levels depending on the color of the pixel PXij. In other words, initialization voltages having different voltage levels may be applied to each red, green, and blue pixel.

As shown in FIGS. 1 to 16, the number of scan driving circuits GWD and GCD and the number of emission control circuits EMD, which are included in the first and second gate driving circuits 300 and 350, may be relatively reduced by reducing the number of scan signals and the number of emission control signals applied to the pixels PX to 2 and 1, respectively. As a result, the circuit configuration provided to the non-display area NDA of the display panel DP may be simplified, and the width of the non-display area NDA may be relatively reduced.

Figure 17:
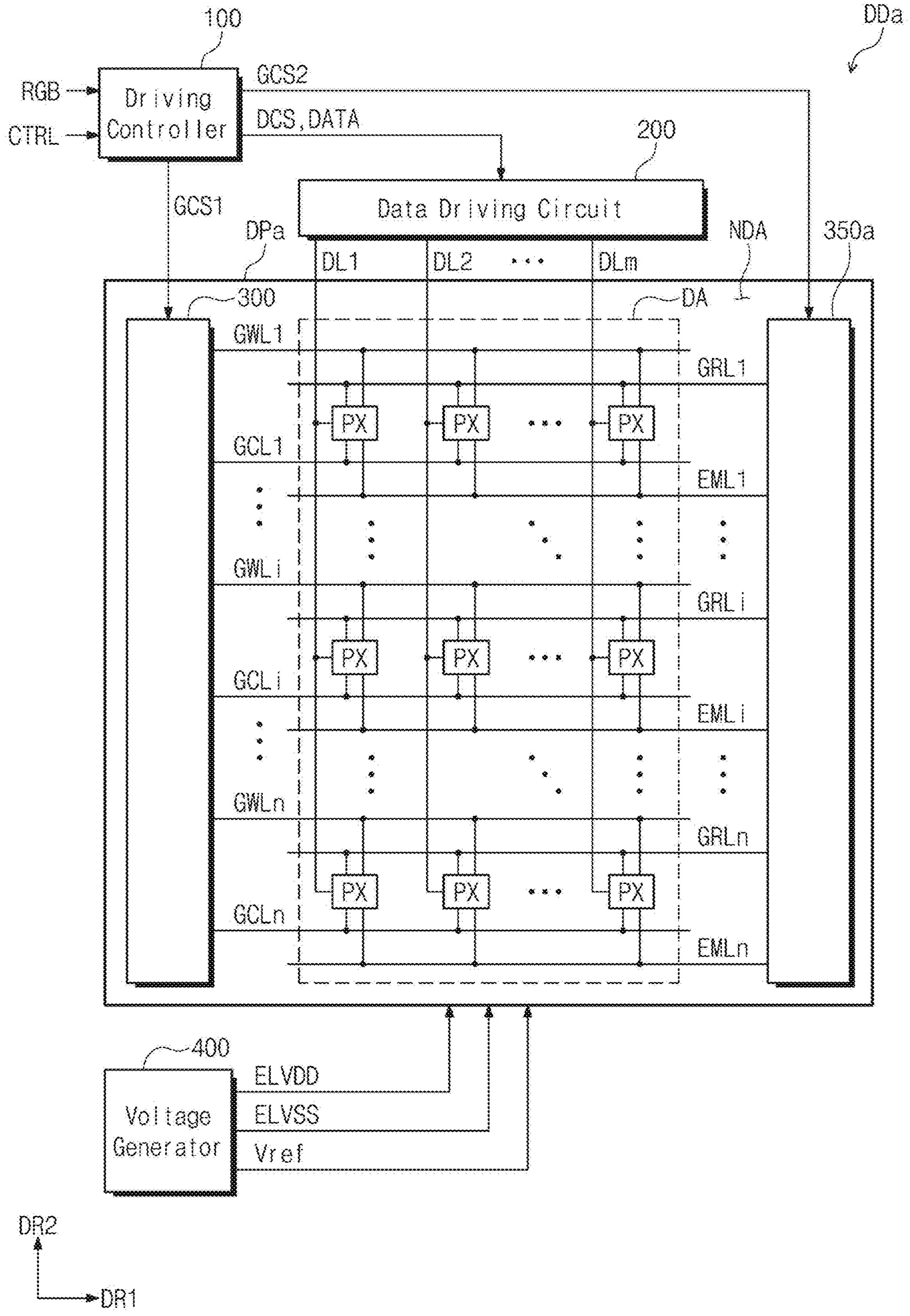
FIG. 17 is a block diagram of a display device, according to some embodiments of the present disclosure.
Figure 18:
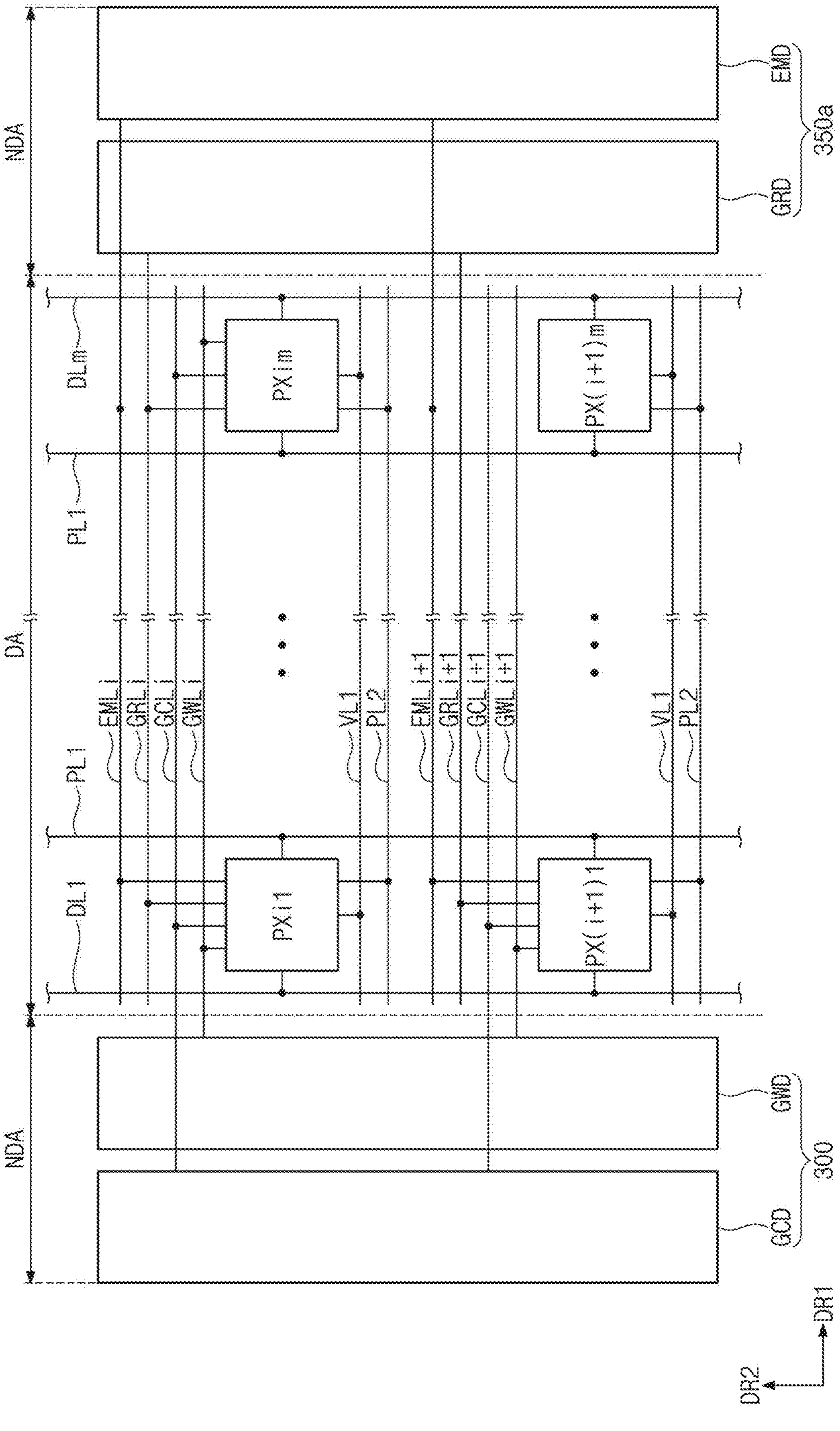
FIG. 18 is a block diagram of first and second gate driving circuits shown in FIG. 17.

FIG. 17 is a block diagram of a display device DDa, according to some embodiments of the present disclosure. FIG. 18 is a block diagram of first and second gate driving circuits shown in FIG. 17. However, components, which are equal to the components illustrated in FIGS. 1 and 2, from among components illustrated in FIGS. 17 and 18 are marked by the same reference signs, and thus, some repetitive detailed description thereof may be omitted to avoid redundancy.

Referring to FIG. 17 and FIG. 18, a display panel DPa may include the write scan lines GWL1 to GWLn, the compensation scan lines GCL1 to GCLn, reference scan lines GRL1 to GRLn, and the emission control lines EML1 to EMLn. The write scan lines GWL1 to GWLn may be referred to as "first scan lines", and the compensation scan lines GCL1 to GCLn may be referred to as "second scan lines". The reference scan lines GRL1 to GRLn may be referred to as "third scan lines", and the emission control lines EML1 to EMLn may be referred to as "first emission control lines".

According to some embodiments of the present disclosure, the first gate driving circuit 300 may be connected to the write scan lines GWL1 to GWLn and the compensation scan lines GCL1 to GCLn. The first gate driving circuit 300 receives the first gate control signal GCS1 from the driving controller 100. The first gate driving circuit 300 may respectively output write scan signals and compensation scan signals to the write scan lines GWL1 to GWLn and the compensation scan lines GCL1 to GCLn in response to the first gate control signal GCS1. The write scan signals may be referred to as "first scan signals", and the compensation scan signals may be referred to as "second scan signals".

According to some embodiments of the present disclosure, a second gate driving circuit 350*a* may be connected to the reference scan lines GRL1 to GRLn and the emission control lines EML1 to EMLn. The second gate driving circuit 350*a* may respectively output reference scan signals and emission control signals to the reference scan lines GRL1 to GRLn and the emission control lines EML1 to EMLn in response to the second gate control signal GCS2 from the driving controller 100. The reference scan signals may be referred to as "third scan signals".

Referring to FIG. 18, the first gate driving circuit 300 may include the first scan driving circuit GWD and the second scan driving circuit GCD. The second gate driving circuit 350*a* may include a third scan driving circuit GRD and the emission control circuit EMD. The placement order of the third scan driving circuit GRD and the emission control circuit EMD in the first direction DR1, which is illustrated in FIG. 18, is only an example and is not particularly limited thereto.

In FIG. 18, the first scan driving circuit GWD is connected to the i-th write scan line GWLi and the (i+1)-th write scan line GWLi+1, and the second scan driving circuit GCD is connected to the i-th compensation scan line GCLi and the (i+1)-th compensation scan line GCLi+1. The third scan driving circuit GRD is connected to the i-th reference scan line GRLi and the (i+1)-th reference scan line GRLi+1. The emission control circuit EMD is connected to the i-th emission control line EMLi and the (i+1)-th emission control line EMLi+1.

FIG. 18 illustrates a structure in which the third scan driving circuit GRD is included in the second gate driving circuit 350*a*, but the present disclosure is not limited thereto. The positions of the first to third scan driving circuits GWD, GCD, and GRD may be interchanged.

Moreover, pixels PXi1, PX(i+1)1, PXim, and PX(i+1)m connected to the first data line DL1 and the m-th data line DLm are illustrated in FIG. 18. Each of the pixels PXi1, PX(i+1)1, PXim, and PX(i+1)m may be electrically connected to three scan lines, one emission control line, and one data line. For example, the i-th row of pixels may be connected to the i-th write and compensation scan lines GWLi and GCLi, the i-th reference scan line GRLi, and the i-th emission control line EMLi. The first column of pixels may be connected to the first data line DL1. However, embodiments according to the present disclosure are not limited thereto. Each of the pixels PXi1, PX(i+1)1, PXim, and PX(i+1)m may be connected to scan lines of which the number is greater than three.

Figure 19:
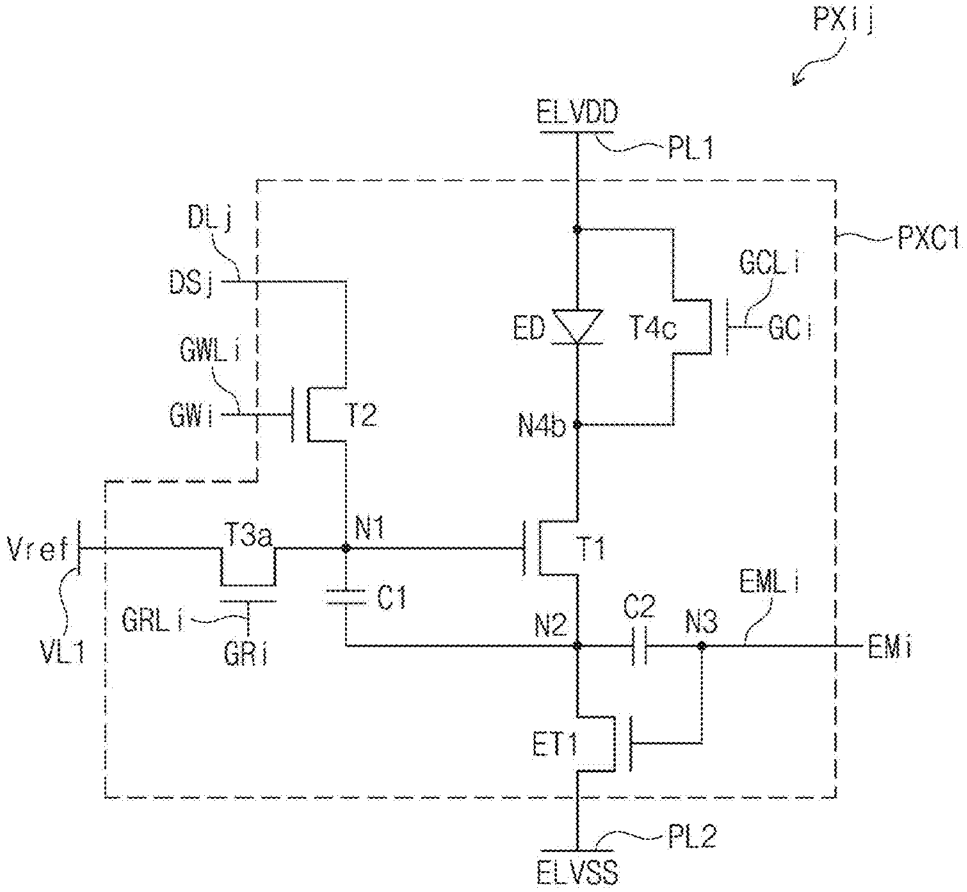
FIG. 19 is a circuit diagram of a pixel, according to some embodiments of the present disclosure.
Figure 20:
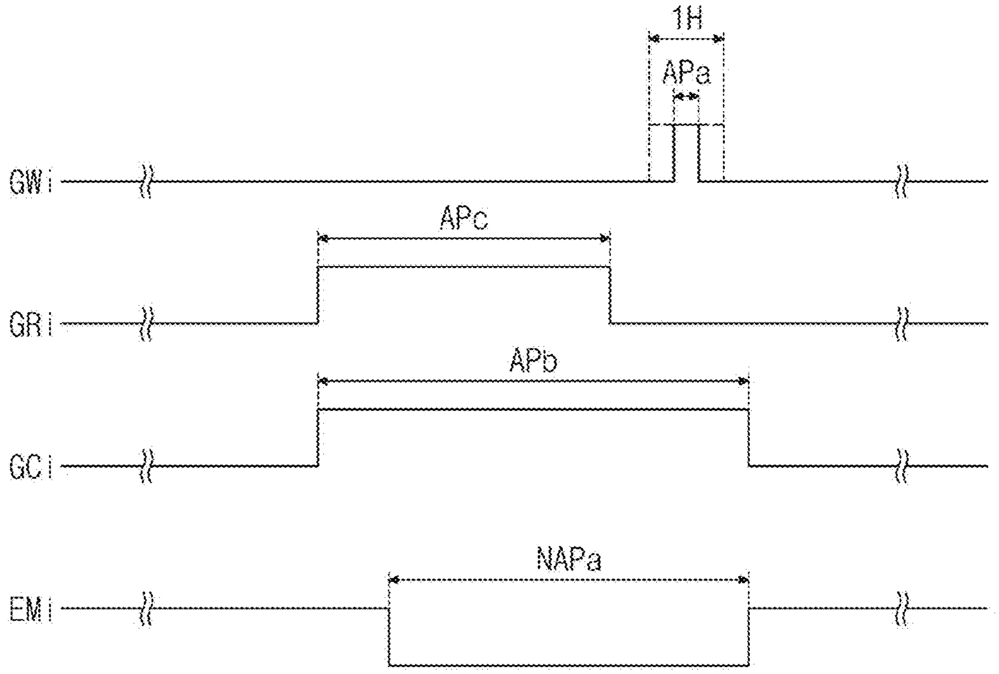
FIG. 20 is a waveform diagram illustrating signals applied to a pixel shown in FIG. 19.

FIG. 19 is a circuit diagram of a pixel, according to some embodiments of the present disclosure. FIG. 20 is a waveform diagram illustrating signals applied to a pixel shown in FIG. 19.

FIG. 19 representatively shows the pixel PXij connected to the i-th write scan line GWLi among the write scan lines GWL1 to GWLn (see FIG. 17) and the j-th data line DLj among the plurality of data lines DL1 to DLm (see FIG. 17). The pixel PXij is connected to the i-th compensation scan line GCLi among the compensation scan lines GCL1 to GCLn (see FIG. 17), and the pixel PXij is connected to the i-th reference scan line GRLi among the reference scan lines GRL1 to GRLn (see FIG. 17). The pixel PXij is connected to the i-th emission control line EMLi among the emission control lines EML1 to EMLn (see FIG. 17).

The pixel PXij may include a pixel circuit PXC1 (or a pixel driving circuit) and the light emitting element ED electrically connected to the pixel circuit PXC1. According to some embodiments, the pixel circuit PXC1 may include five transistors (referred to as "first to fourth transistors T1, T2, T3a, and T4c and the first emission control transistor ET1") and two capacitors (hereinafter, referred to as the "first capacitor C1" and the "second capacitor C2"). According to some embodiments of the present disclosure, one of the five transistors of the pixel circuit PXC1 may be omitted, or an additional transistor may be further included in the pixel circuit PXC1.

The i-th write scan line GWLi may deliver the i-th write scan signal GWi to the pixel PXij. The i-th compensation scan line GCLi may deliver the i-th compensation scan signal GCi to the pixel PXij. The i-th reference scan line GRLi may deliver an i-th reference scan signal GRi to the pixel PXij. The i-th emission control line EMLi may provide the i-th emission control signal EMi to the pixel PXij. The j-th data line DLj may provide the j-th data signal DSj to the pixel PXij.

According to some embodiments, each of the first to fourth transistors T1, T2, T3a, and T4c and the first emission control transistor ET1 may be an N-type transistor having an oxide semiconductor as a semiconductor layer.

The light emitting element ED may include an anode and a cathode. The anode of the light emitting element ED may be connected to the first power line PL1, and the cathode of the light emitting element ED may be connected to the pixel circuit PXC1. The light emitting element ED may emit light so as to correspond to the amount of current flowing in the first transistor T1 of the pixel circuit PXC1.

The third transistor T3a is connected between the reference voltage line VL1 and the first node N1 to receive the i-th reference scan signal GRi. The third transistor T3a may be referred to as a "compensation transistor". The third transistor T3a may include a first electrode connected to the reference voltage line VL1, a second electrode connected to the first node N1, and a gate electrode connected to the i-th reference scan line GRLi. The third transistor T3a may be turned on in response to the i-th reference scan signal GRi received through the i-th reference scan line GRLi to deliver the reference voltage Vref to the first node N1. The first node N1 may be defined as a node to which the gate electrode of the first transistor T1, the second electrode of the second transistor T2, and the second electrode of the third transistor T3a are connected.

The fourth transistor T4c is connected between the first power line PL1 and a fourth node N4b to receive the i-th compensation scan signal GCi. The fourth transistor T4c may include a first electrode connected to the first power line PL1, a second electrode connected to the first electrode of the first transistor T1 (i.e., the fourth node N4b), and a gate electrode connected to the i-th compensation scan line GCLi. The fourth transistor T4c may be turned on in response to the i-th compensation scan signal GCi received through the i-th compensation scan line GCLi to deliver the first driving voltage ELVDD to the fourth node N4b.

The fourth node N4b may be defined as a node to which the first electrode of the first transistor T1, the second electrode of the fourth transistor T4c, and the cathode of the light emitting element ED are connected.

According to some embodiments, the third and fourth transistors T3a and T4c may receive different scan signals (i.e., the i-th reference scan signal GRi and the i-th compensation scan signal GCi).

Referring to FIG. 20, each of the i-th write scan signal GWi, the i-th compensation scan signal GCi, the i-th reference scan signal GRi, and the i-th emission control signal EMi may have an active level (or a high level) during some periods (i.e., an active period), and may have an inactive level (or a low level) during the remaining periods (i.e., an inactive period). When the above-described five transistors T1, T2, T3a, T4c, and ET1 are N-type transistors, the active level of each of the i-th write scan signal GWi, the i-th compensation scan signal GCi, the i-th reference scan signal GRi, and the i-th emission control signal EMi may be the high level. Alternatively, when the five transistors T1, T2, T3a, T4c, and ET1 are P-type transistors, the active level of each of the i-th write scan signal GWi, the i-th compensation scan signal GCi, the i-th reference scan signal GRi, and the i-th emission control signal EMi may be the low level.

An inactive period NAPa of the i-th emission control signal EMi may overlap an active period APa of the i-th write scan signal GWi, an active period APb of the i-th compensation scan signal GCi and an active period APc of the i-th reference scan signal GRi. According to some embodiments of the present disclosure, the active period APc of the i-th reference scan signal GRi may not overlap the active period APa of the i-th write scan signal GWi. The active period APb of the i-th compensation scan signal GCi may overlap the active period APc of the i-th reference scan signal GRi and the active period APa of the i-th write scan signal GWi. Moreover, the active period APa of the i-th write scan signal GWi may have duration smaller than or equal to the duration of the horizontal scan period 1H, and the active period APb of the i-th compensation scan signal GCi may have duration greater than the duration of the horizontal scan period 1H. The active period APc of the i-th reference scan signal GRi may have duration greater than the duration of the active period APa of the i-th write scan signal GWi and smaller than the duration of the active period APb of the i-th compensation scan signal GCi.

Figure 21A:
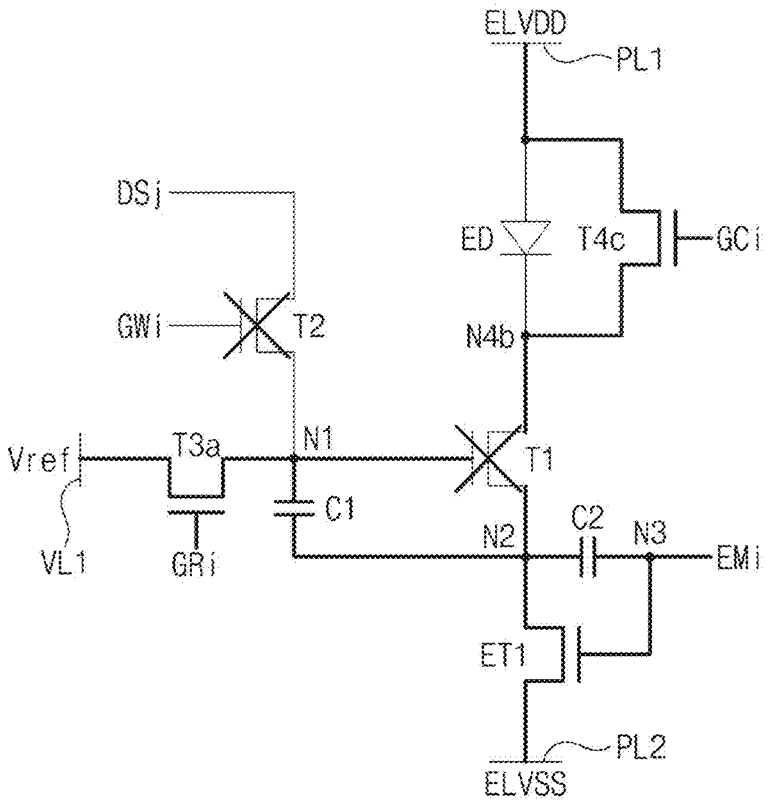
FIGS. 21A and 21B are drawings for describing an operation of a pixel during an initialization period, according to some embodiments of the present disclosure.
Figure 21B:
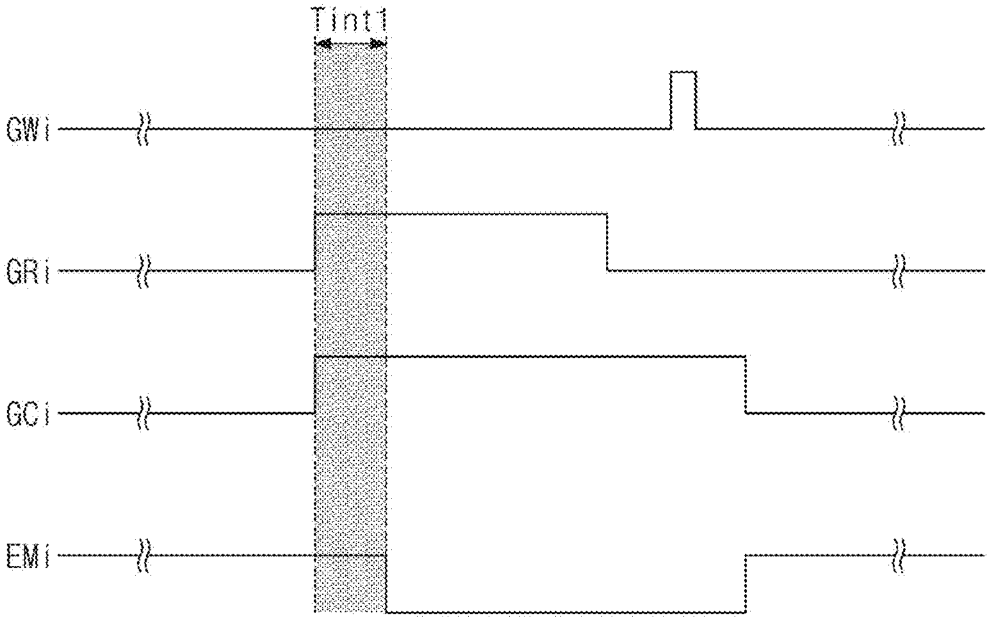

FIGS. 21A and 21B are drawings for describing an operation of the pixel PXij during an initialization period Tint1, according to some embodiments of the present disclosure.

Referring to FIGS. 21A and 21B, during the initialization period Tint1, each of the i-th compensation scan signal GCi, the i-th reference scan signal GRi, and the i-th emission control signal EMi may have an active level (e.g., a high level), and the i-th write scan signal GWi may have an inactive level (e.g., a low level).

During the initialization period Tint1, the third transistor T3a is turned on in response to the i-th reference scan signal GRi, and the fourth transistor T4c is turned on in response to the i-th compensation scan signal GCi. Accordingly, during the initialization period Tint1, the first node N1 is initialized to the reference voltage Vref, and the fourth node N4b is initialized to the first driving voltage ELVDD.

During the initialization period Tint1, the first emission control transistor ET1 is turned on in response to the i-th emission control signal EMi. Accordingly, during the initialization period Tint1, the second node N2 may be initialized to the second driving voltage ELVSS.

As the first node N1 and the second node N2 are initialized simultaneously (or concurrently) during the initialization period Tint1, the first capacitor C1 may be initialized to a difference value between the reference voltage Vref and the second driving voltage ELVSS. The second capacitor C2 may be initialized to a difference value between the second driving voltage ELVSS and a high level voltage (e.g., about 14 V) of the i-th emission control signal EMi. The initialization period Tint1 may be defined as a period, during which the gate electrode and the second electrode (i.e., the source) of the first transistor T1 are initialized, and may be defined as a period during which the cathode of the light emitting element ED is initialized.

Because a potential difference (i.e., the gate-source voltage "Vgs" of the first transistor T1) between the first and second nodes N1 and N2 is smaller than a threshold voltage "Vth" of the first transistor T1 during the initialization period Tint1, the first transistor T1 may be turned off.

The initialization period Tint1 may be terminated at a time point at which the i-th emission control signal EMi is inactive.

Figure 22A:
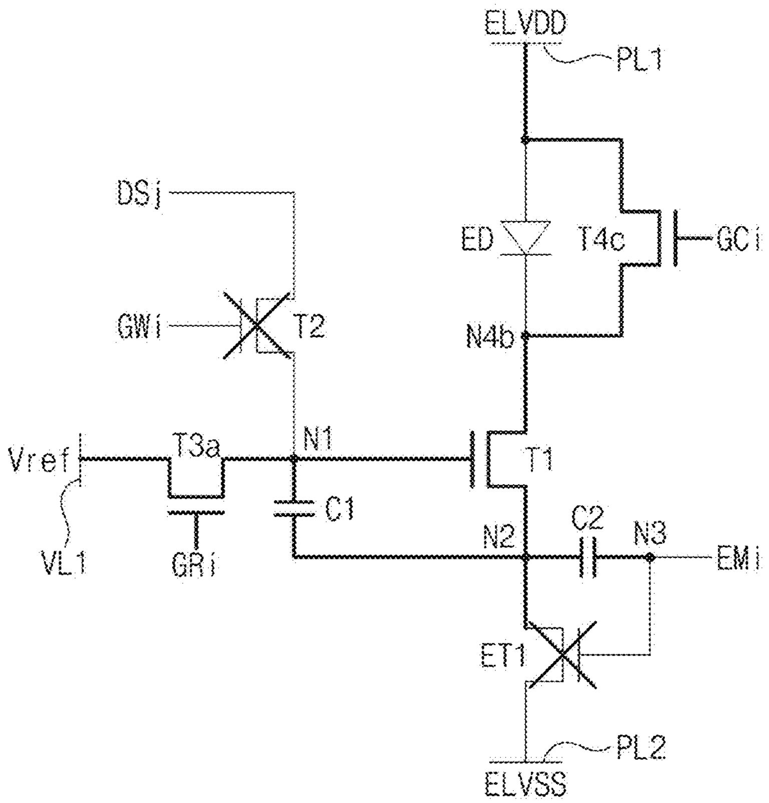
FIGS. 22A and 22B are drawings for describing an operation of a pixel during a compensation period, according to some embodiments of the present disclosure.
Figure 22B:
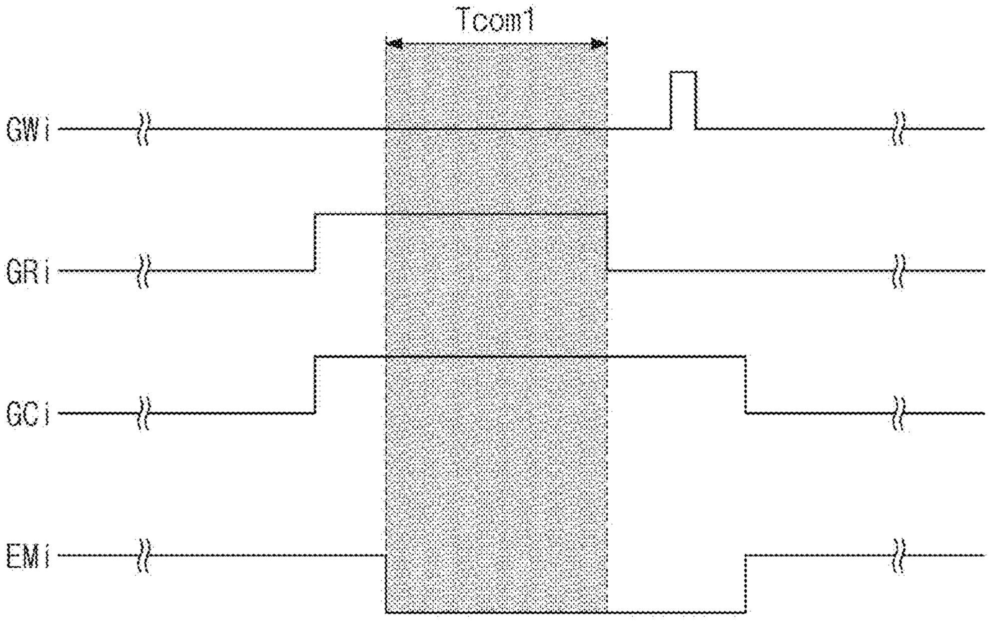

FIGS. 22A and 22B are drawings for describing an operation of a pixel during a compensation period, according to some embodiments of the present disclosure.

Referring to FIGS. 22A and 22B, when the initialization period Tint1 (see FIG. 21B) is terminated, a compensation period Tcom1 occurs. In other words, the compensation period Tcom1 lags behind the initialization period Tint1.

During the compensation period Tcom1, the i-th compensation scan signal GCi and the i-th reference scan signal GRi may have active levels (e.g., high levels), and the i-th write scan signal GWi and the i-th emission control signal EMi may have inactive levels (e.g., low levels). The compensation period Tcom1 may start at a time point at which the i-th emission control signal EMi is inactive.

During the compensation period Tcom1, the third transistor T3*a* may be maintained to be turned on in response to the i-th reference scan signal GRi, and the fourth transistor T4*c* may be maintained to be turned on in response to the i-th compensation scan signal GCi. Accordingly, during the compensation period Tcom1, the reference voltage Vref may be applied to the first node N1, and the first driving voltage ELVDD may be applied to the fourth node N4*b*.

During the compensation period Tcom1, the first emission control transistor ET1 may be turned off in response to the i-th emission control signal EMi. Accordingly, at the start time point of the compensation period Tcom1, potential "Vs" of the second node N2 may change from the second driving voltage ELVSS to "Vref−Vth". During the compensation period Tcom1, a voltage level of the i-th emission control signal EMi is lowered to a low level (e.g., about −4 V). As the voltage level of the i-th emission control signal EMi is lowered to a low level, the potential "Vs" of the second node N2 may be lowered by the second capacitor C2 to be smaller than "Vref−Vth". When the potential "Vs" of the second node N2 decreases in a situation where potential "Vg" of the first node N1 is maintained at the reference voltage Vref, the gate-source voltage "Vgs" becomes greater than the threshold voltage "Vth".

When the gate-source voltage "Vgs" becomes greater than the threshold voltage "Vth", the first transistor T1 may be turned on, and the threshold voltage "Vth" of the first transistor T1 may be compensated by the coupling of the first capacitor C1.

The compensation period Tcom1 may be terminated at a time point at which the i-th reference scan signal GRi is inactive.

Figure 23A:
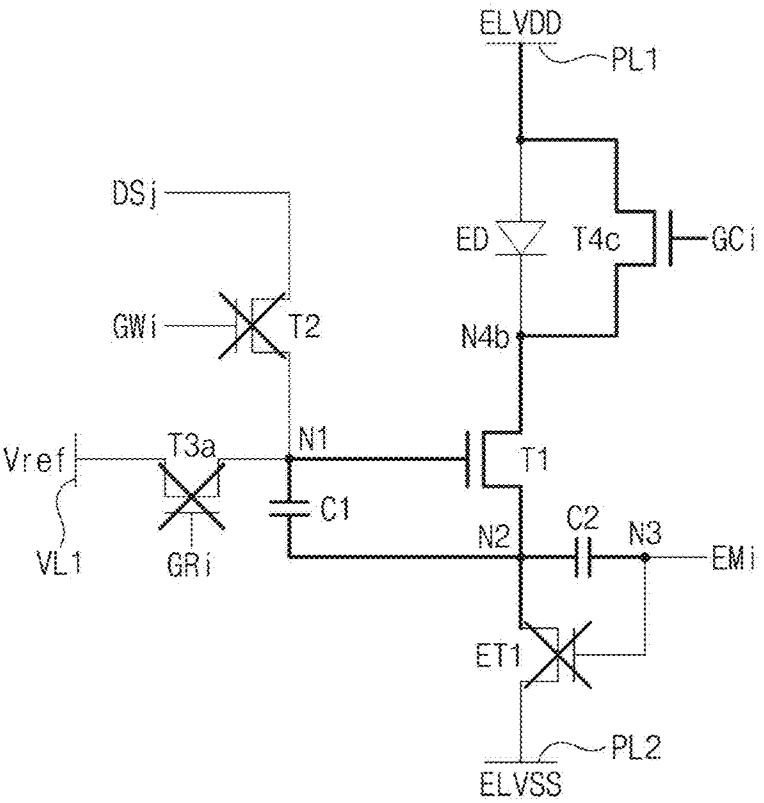
FIGS. 23A and 23B are drawings for describing an operation of a pixel during an interval period, according to some embodiments of the present disclosure.
Figure 23B:
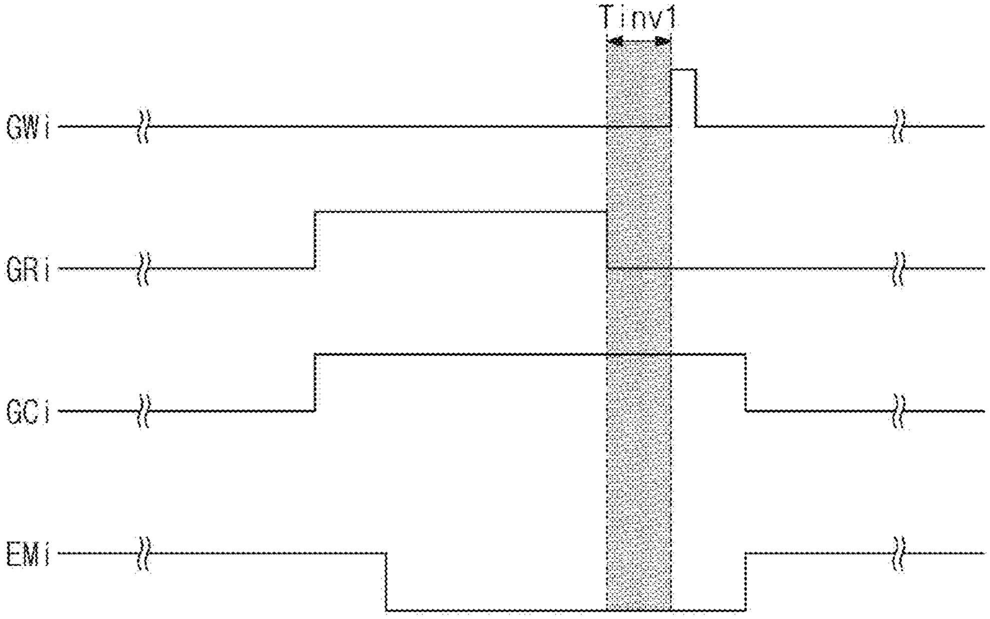

FIGS. 23A and 23B are drawings for describing an operation of a pixel during an interval period, according to some embodiments of the present disclosure.

Referring to FIGS. 23A and 23B, an interval period Tinv1 may be present after the compensation period Tcom1 (see FIG. 22B).

During the interval period Tinv1, the i-th reference scan signal GRi, the i-th write scan signal GWi, and the i-th emission control signal EMi may have inactive levels (e.g., low levels), and the i-th compensation scan signal GCi may have an active level (e.g., a high level). Accordingly, during the interval period Tinv1, except for the first and fourth transistors T1 and T4*c*, the second and third transistors T2 and T3*a* and the first emission control transistor ET1 may be turned off.

During the interval period Tinv1, the fourth transistor T4*c* may be turned on in response to the i-th compensation scan signal GCi. Accordingly, the first driving voltage ELVDD may be applied to the fourth node N4*b* even during the interval period Tinv1.

The interval period Tinv1 may start at a time point, at which the i-th reference scan signal GRi becomes inactive, and end at a time point at which the i-th write scan signal GWi becomes active.

Figure 24A:
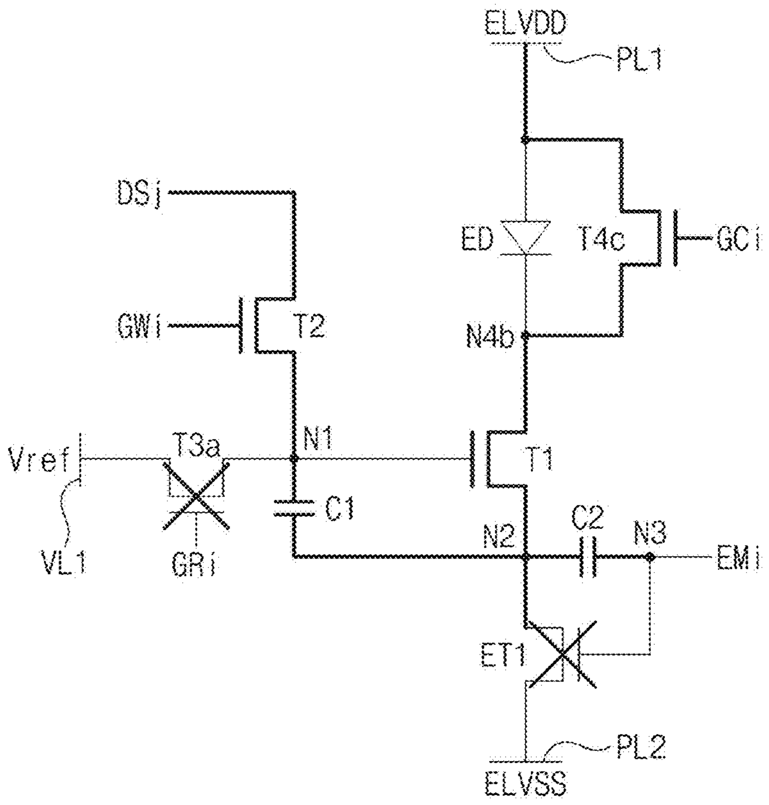
FIGS. 24A and 24B are drawings for describing an operation of a pixel during a data write period, according to some embodiments of the present disclosure.
Figure 24B:
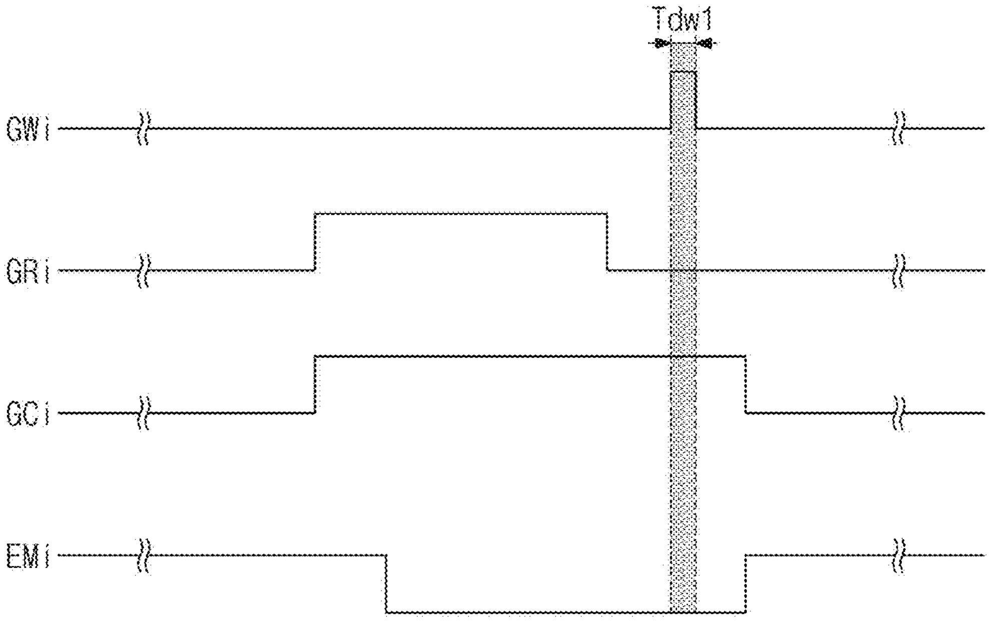

FIGS. 24A and 24B are drawings for describing an operation of a pixel during a data write period, according to some embodiments of the present disclosure.

Referring to FIGS. 24A and 24B, when the interval period Tinv1 (see FIG. 23*b*) ends, a data write period Tdw1 occurs. That is, the data write period Tdw1 lags behind the compensation period Tcom1 and the interval period Tinv1.

FIG. 23B illustrates that the interval period Tinv1 is present between the compensation period Tcom1 and the data write period Tdw1, but the present disclosure is not limited thereto. For example, the interval period Tinv1 may be omitted between the compensation period Tcom1 and the data write period Tdw1, and the data write period Tdw1 may occur immediately after the compensation period Tcom1.

During the data write period Tdw1, the i-th write scan signal GWi and the i-th compensation scan signal GCi may have active levels (e.g., high levels), and the i-th reference scan signal GRi and the i-th emission control signal EMi may have inactive levels (e.g., low levels). The data write period Tdw1 may start at a time point at which the i-th write scan signal GWi is active.

During the data write period Tdw1, the second transistor T2 may be turned on in response to the i-th write scan signal GWi. Accordingly, during the data write period Tdw1, the j-th data signal DSj may be applied to the first node N1. Accordingly, the potential "Vg" of the first node N1 is converted from the reference voltage Vref to the data voltage Vdata corresponding to the j-th data signal DSj.

When the potential "Vg" of the first node N1 is converted from the reference voltage Vref to the data voltage Vdata, the potential "Vs" of the second node N2 is changed by the coupling of the first capacitor C1. In detail, the potential "Vs" of the second node N2 satisfies Equation 1 below.

$$Vs = Vref - Vth + \frac{C1}{C1 + C2}(Vdata - Vref) \qquad \text{Equation 1}$$

A component for the threshold voltage "Vth" of the first transistor T1 as well as the data voltage Vdata may be included in the potential "Vs" of the second node N2 by the coupling of the first capacitor C1 and the second capacitor C2.

The threshold voltages "Vth" of the first transistors T1 may be different from each other for each of the pixels PX (see FIG. 17). Regardless of the deviation between the threshold voltages "Vth" of the first transistors T1, the pixel PXij shown in FIG. 19 may supply a current proportional to the data voltage Vdata to the light emitting element ED.

During the data write period Tdw1, the fourth transistor T4*c* may maintain the turn-on state in response to the i-th compensation scan signal GCi. Accordingly, even during the data write period Tdw1, the first driving voltage ELVDD is applied to the fourth node N4*b*, and thus the cathode of the light emitting element ED and the first electrode of the first transistor T1 may stably maintain the initialization state.

The data write period Tdw1 may be terminated at a time point at which the i-th write scan signal GWi is inactive.

Figure 25A:
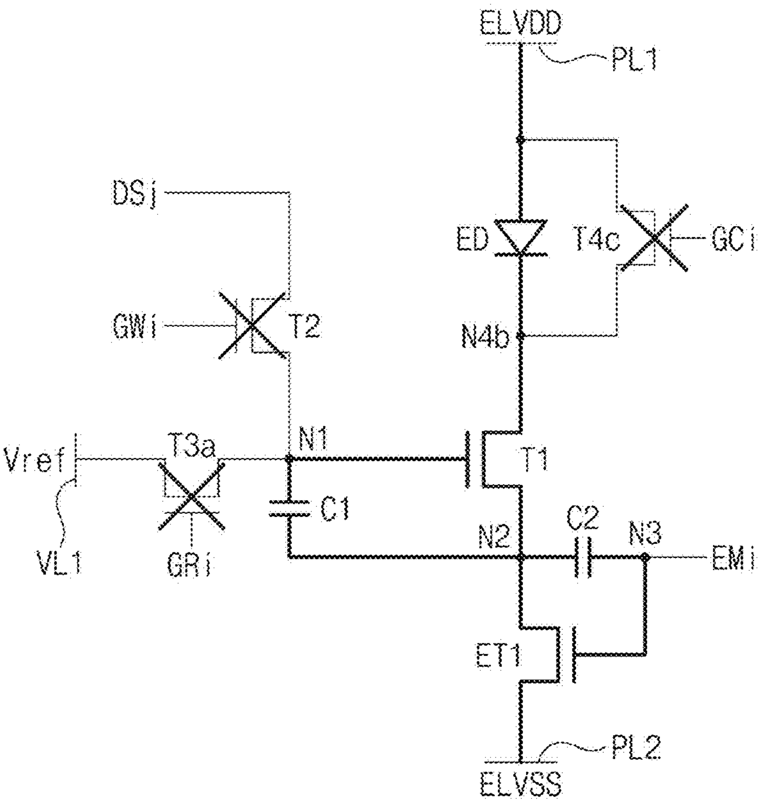
FIGS. 25A and 25B are drawings for describing an operation of a pixel during an emission period, according to some embodiments of the present disclosure.
Figure 25B:
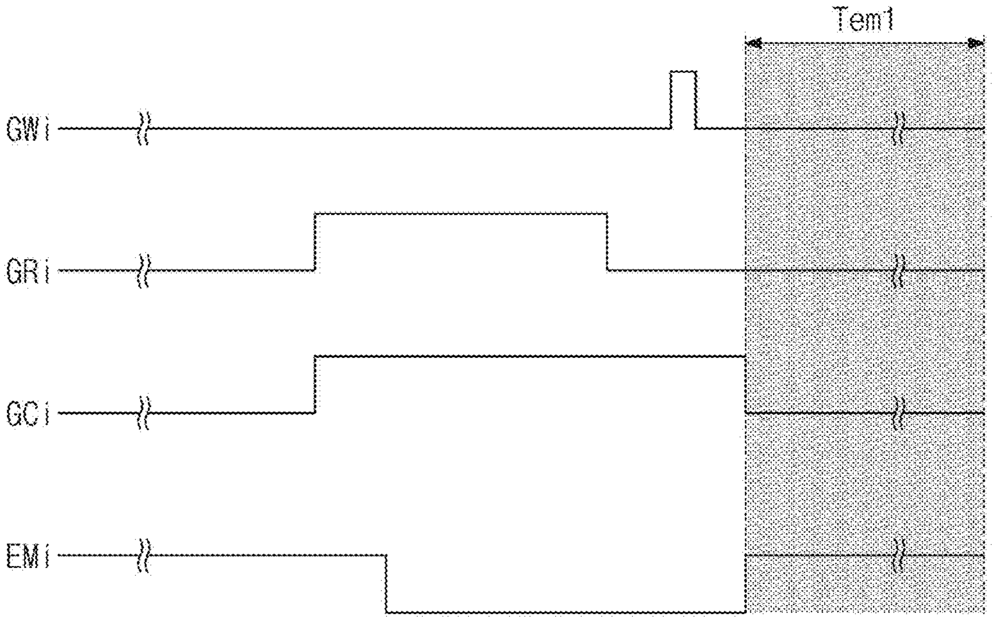

FIGS. 25A and 25B are drawings for describing an operation of a pixel during an emission period, according to some embodiments of the present disclosure.

Referring to FIGS. 25A and 25B, when the data write period Tdw1 (see FIG. 24B) is terminated, an emission period Tem1 occurs. In other words, the emission period Tem1 lags behind the data write period Tdw1.

During the emission period Tem1, the i-th compensation scan signal GCi, the i-th write scan signal GWi, and the i-th reference scan signal GRi may have inactive levels (e.g., low levels), and the i-th emission control signal EMi may have an active level (e.g., a high level). The emission period Tem1 may start at a time point at which the i-th emission control signal EMi is active.

During the emission period Tem1, the first emission control transistor ET1 may be turned on in response to the i-th emission control signal EMi. Moreover, during the emission period Tem1, the first transistor T1 may maintain the turn-on state by the gate-source voltage "Vgs" of the first transistor T1 corresponding to a difference voltage stored in the first capacitor C1. The gate-source voltage "Vgs" of the first transistor T1 may satisfy Equation 2 below.

$$Vgs = Vth + \frac{C2}{C1 + C2}(Vdata) - \frac{C2}{C1 + C2}(Vref) \qquad \text{Equation 2}$$

Accordingly, during the emission period Tem1, the first transistor T1 may be electrically connected to the second power line PL2 through the first emission control transistor ET1 turned on, and thus a driving current may flow between the first power line PL1 and the second power line PL2.

According to some embodiments of the present disclosure, the threshold voltage "Vth" of the first transistor T1 may not affect the current flowing through the light emitting element ED. The threshold voltage of the first transistor T1 included in each of the pixels PX (see FIG. 17) may be different depending on characteristics of the first transistor T1. However, regardless of the characteristics of the first transistor T1 included in each of the pixels PX (see FIG. 17), the current flowing through the light emitting element ED during the subsequent emission period Tem1 may be constant. Accordingly, the overall display quality of the display device DDa (see FIG. 17) may be relatively improved.

Figure 26:
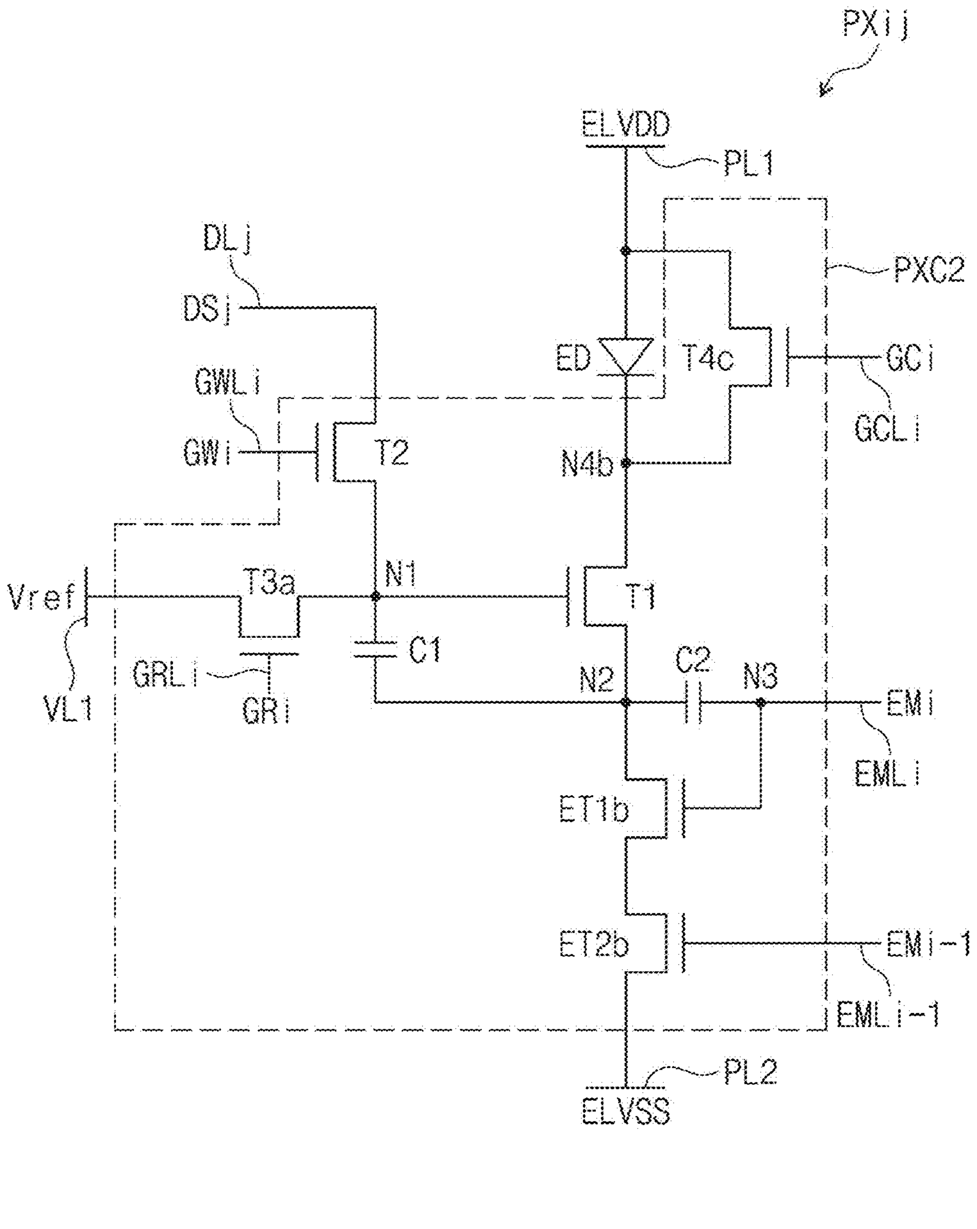
FIG. 26 is a circuit diagram of a pixel, according to some embodiments of the present disclosure.

FIG. 26 is a circuit diagram of a pixel, according to some embodiments of the present disclosure. Although FIG. 26 illustrates various components in a pixel according to some embodiments, embodiments according to the present disclosure are not limited thereto, and according to various embodiments, the pixel may include additional components or fewer components without departing from the spirit and scope of embodiments according to the present disclosure.

Figure 27:
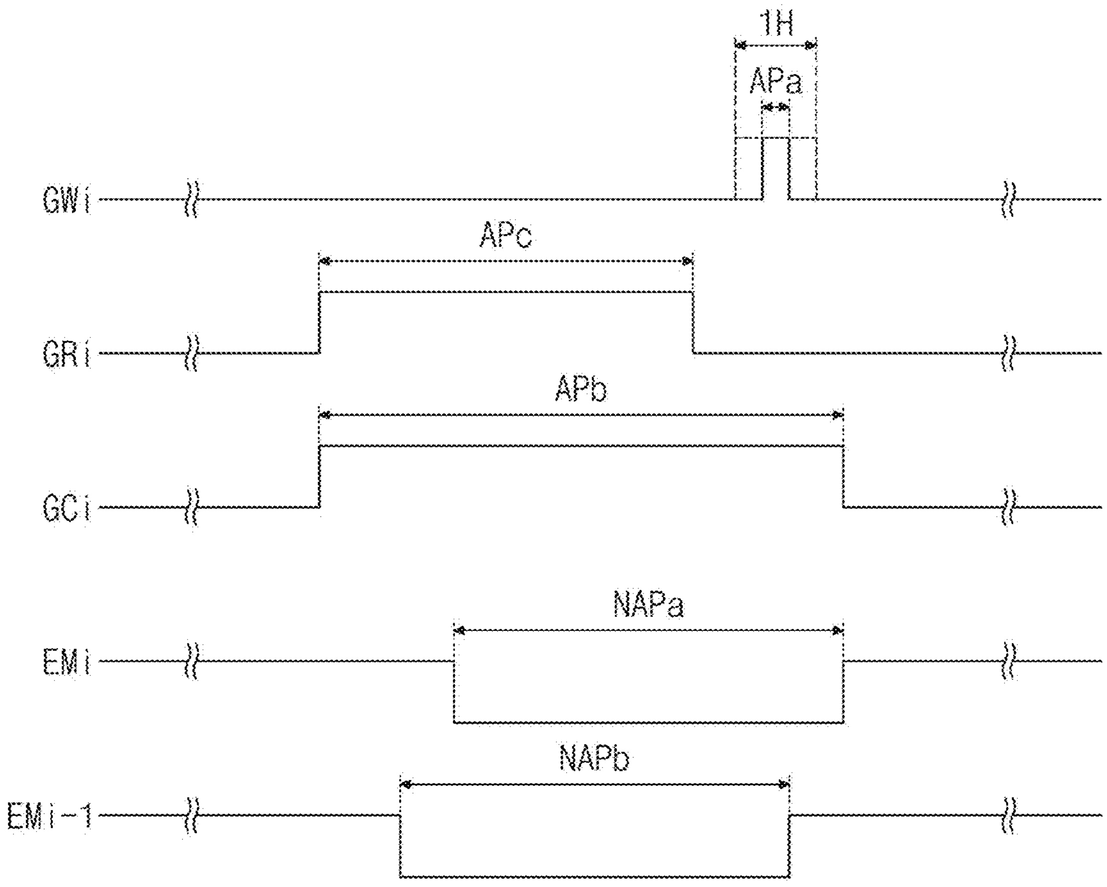
FIG. 27 is a waveform diagram illustrating signals applied to a pixel shown in FIG. 26.

FIG. 27 is a waveform diagram illustrating signals applied to a pixel shown in FIG. 26. However, the same reference numerals are given to the same components as those shown in FIG. 19 among the components shown in FIG. 26, and some repetitive detailed description thereof may be omitted.

Referring to FIG. 26, the pixel PXij may include a pixel circuit PXC2 (or a pixel driving circuit) and the light emitting element ED electrically connected to the pixel circuit PXC2. According to some embodiments, the pixel circuit PXC2 may include six transistors (referred to as "first to fourth transistors T1, T2, T3*a*, and T4*c* and first and second emission control transistors ET1*b* and ET2*b*"), and two capacitors (referred to as "the first capacitor C1 and the second capacitor C2"). According to some embodiments of the present disclosure, one of the six transistors of the pixel circuit PXC2 may be omitted, or an additional transistor may be further included in the pixel circuit PXC2.

According to some embodiments, the first to fourth transistors T1, T2, T3*a*, and T4*c*, the first and second emission control transistors ET1*b* and ET2*b* may each be an N-type transistor having an oxide semiconductor as a semiconductor layer.

The first emission control transistor ET1*b* may be connected between the first transistor T1 and the second emission control transistor ET2*b* to receive the i-th emission control signal EMi (or referred to as a "first emission control signal"). The first emission control transistor ET1*b* may include a first electrode connected to the second electrode of the first transistor T1, a second electrode connected to the second emission control transistor ET2*b*, and a gate electrode connected to the i-th emission control line EMLi. The first emission control transistor ET1*b* may be turned on in response to the i-th emission control signal EMi received through the i-th emission control line EMLi so as to electrically connect the second emission control transistor ET2*b* to the second electrode of the first transistor T1. The gate electrode of the first emission control transistor ET1*b* may be connected to the i-th emission control line EMLi through the third node N3.

The second emission control transistor ET2*b* may be connected between the first emission control transistor ET1*b* and the second power line PL2 to receive the (i−1)-th emission control signal EMi−1 (or referred to as a "second emission control signal"). The second emission control transistor ET2*b* may include a first electrode connected to the second electrode of the first emission control transistor ET1*b*, a second electrode connected to the second power line PL2, and a gate electrode connected to the (i−1)-th emission control line EMLi−1. The second emission control transistor ET2*b* may be turned on in response to the (i−1)-th emission control signal EMi−1 received through the (i−1)-th emission control line EMLi−1 so as to electrically connect the second power line PL2 to the second electrode of the first emission control transistor ET1*b*.

Referring to FIG. 27, each of the i-th write scan signal GWi, the i-th compensation scan signal GCi, the i-th reference scan signal GRi, the i-th emission control signal EMi, and the (i−1)-th emission control signal EMi−1 may have an active level (or a high level) during some periods (i.e., active periods) and may have an inactive level (or a low level) during the remaining periods (i.e., inactive periods). When the above-described six transistors T1, T2, T3*a*, T4*c*, ET1*b*, and ET2*b* are N-type transistors, the active level of each of the i-th write scan signal GWi, the i-th compensation scan signal GCi, the i-th reference scan signal GRi, the i-th emission control signal EMi, and the (i−1)-th emission control signal EMi−1 may be a high level. Alternatively, when the above-described six transistors T1, T2, T3*a*, T4*c*, ET1*b*, and ET2*b* are P-type transistors, the active level of each of the i-th write scan signal GWi, the i-th compensation scan signal GCi, the i-th reference scan signal GRi, the i-th emission control signal EMi, and the (i−1)-th emission control signal EMi−1 may be a low level.

The (i−1)-th emission control signal EMi−1 may be a signal deactivated before the i-th emission control signal EMi. Accordingly, the start time point of an inactive period NAPb of the (i−1)-th emission control signal EMi−1 precedes the start time point of the inactive period NAPa of the i-th emission control signal EMi. The inactive period NAPa of the i-th emission control signal EMi and the inactive period NAPb of the (i−1)-th emission control signal EMi−1 may overlap the active period APa of the i-th write scan signal GWi, the active period APb of the i-th compensation scan signal GCi and the active period APc of the i-th reference scan signal GRi.

Figure 28A:
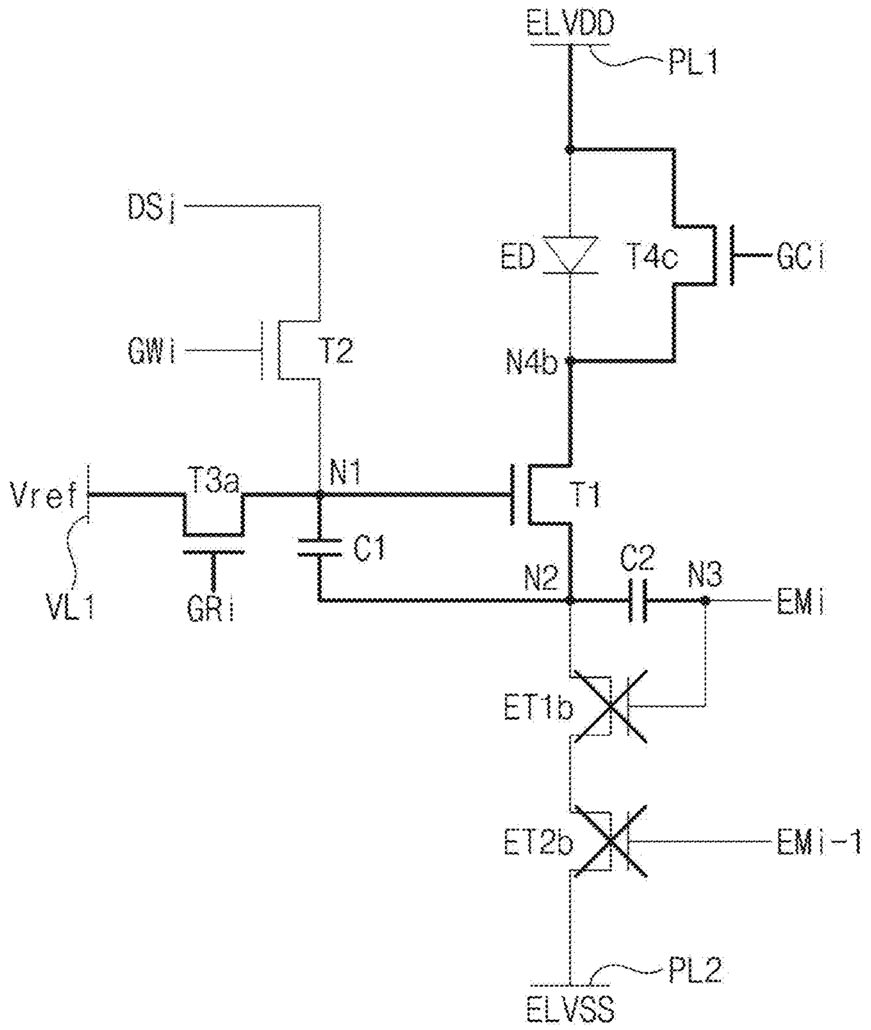
FIGS. 28A and 28B are drawings for describing an operation of a pixel during a compensation period, according to some embodiments of the present disclosure.
Figure 28B:
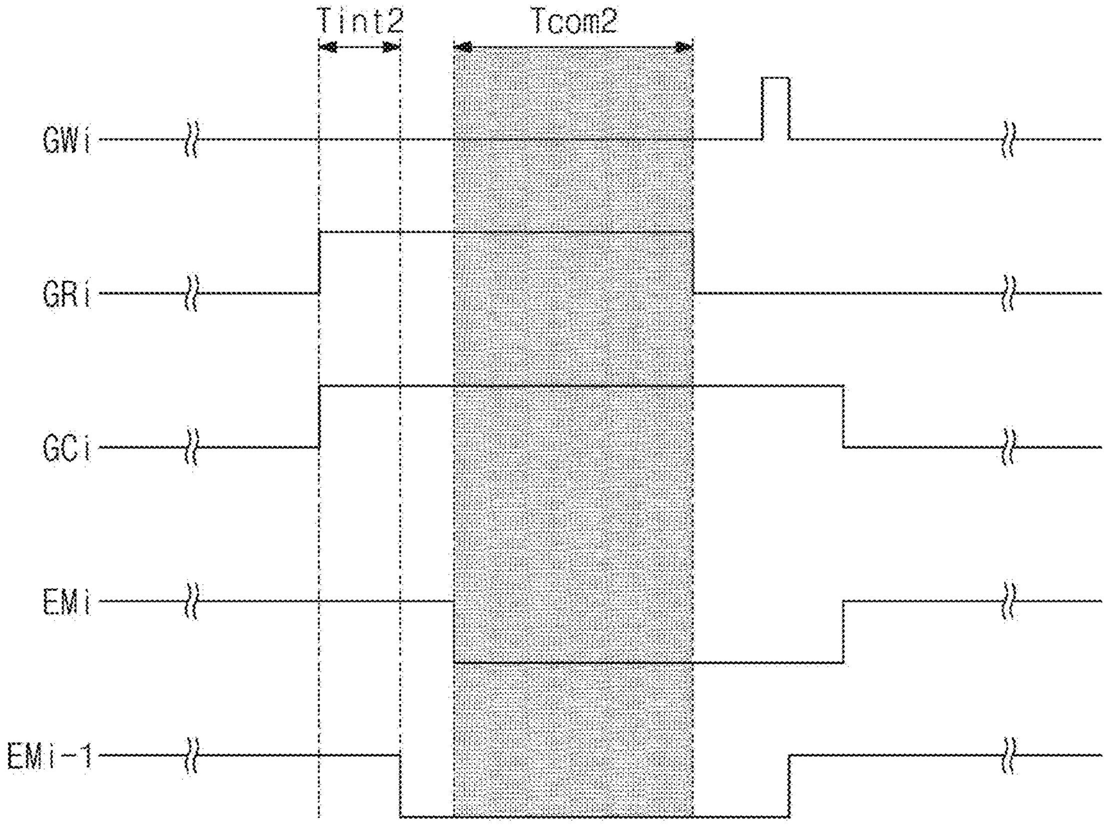

FIGS. 28A and 28B are drawings for describing an operation of a pixel during a compensation period, according to some embodiments of the present disclosure.

Referring to FIGS. 28A and 28B, during an initialization period Tint2, each of the i-th compensation scan signal GCi, the i-th reference scan signal GRi, the (i−1)-th emission control signal EMi−1, and the i-th emission control signal EMi may have an active level (e.g., a high level), and the i-th write scan signal GWi may have an inactive level (e.g., a low level).

During the initialization period Tint2, the third transistor T3*a* is turned on in response to the i-th reference scan signal GRi, and the fourth transistor T4*c* is turned on in response to the i-th compensation scan signal GCi. Accordingly, during the initialization period Tint2, the first node N1 is initialized to the reference voltage Vref, and the fourth node N4*b* is initialized to the first driving voltage ELVDD.

During the initialization period Tint2, the first and second emission control transistors ET1*b* and ET2*b* are turned on in response to the i-th emission control signal EMi and the (i−1)-th emission control signal EMi−1, respectively. Accordingly, during the initialization period Tint2, the second node N2 may be initialized to the second driving voltage ELVSS.

As the first node N1 and the second node N2 are initialized simultaneously (or concurrently) during the initialization period Tint2, the first capacitor C1 may be initialized to a difference value between the reference voltage Vref and the second driving voltage ELVSS. The second capacitor C2 may be initialized to a difference value between the second driving voltage ELVSS and a high level voltage (e.g., about 14 V) of the i-th emission control signal EMi. The initialization period Tint2 may be defined as a period, during which the gate electrode and the second electrode (i.e., the source) of the first transistor T1 are initialized, and may be defined as a period during which the cathode of the light emitting element ED is initialized.

Because a potential difference (i.e., the gate-source voltage "Vgs" of the first transistor T1) between the first and second nodes N1 and N2 is smaller than a threshold voltage "Vth" of the first transistor T1 during the initialization period Tint2, the first transistor T1 may be turned off.

The initialization period Tint2 may be terminated at a time point at which the (i−1)-th emission control signal EMi−1 is inactive.

When the initialization period Tint2 is terminated, a compensation period Tcom2 occurs. In other words, the compensation period Tcom2 lags behind the initialization period Tint2.

During the compensation period Tcom2, the i-th compensation scan signal GCi and the i-th reference scan signal GRi may have active levels (e.g., high levels), and the i-th write scan signal GWi, the (i−1)-th emission control signal EMi−1, and the i-th emission control signal EMi may have inactive levels (e.g., low levels). The compensation period Tcom2 may start at a time point at which the i-th emission control signal EMi is inactive.

During the compensation period Tcom2, the third transistor T3*a* may be maintained to be turned on in response to the i-th reference scan signal GRi, and the fourth transistor T4*c* may be maintained to be turned on in response to the i-th compensation scan signal GCi. Accordingly, during the compensation period Tcom2, the reference voltage Vref may be applied to the first node N1, and the first driving voltage ELVDD may be applied to the fourth node N4*b*.

During the compensation period Tcom2, the first emission control transistor ET1*b* may be turned off in response to the i-th emission control signal EMi, and the second emission control transistor ET2*b* may be turned off in response to the (i−1)-th emission control signal EMi−1. Accordingly, at the start time point of the compensation period Tcom2, potential "Vs" of the second node N2 may change from the second driving voltage ELVSS to "Vref−Vth". During the compensation period Tcom2, a voltage level of the i-th emission control signal EMi is lowered to a low level (e.g., about −4 V). As the voltage level of the i-th emission control signal EMi is lowered to a low level, the potential "Vs" of the second node N2 may be lowered by the second capacitor C2 to be smaller than "Vref−Vth". When the potential "Vs" of the second node N2 decreases in a situation where potential "Vg" of the first node N1 is maintained at the reference voltage Vref, the gate-source voltage "Vgs" becomes greater than the threshold voltage "Vth".

When the gate-source voltage "Vgs" becomes greater than the threshold voltage "Vth", the first transistor T1 may be turned on, and the threshold voltage "Vth" of the first transistor T1 may be compensated by the coupling of the first capacitor C1.

The compensation period Tcom2 may be terminated at a time point at which the i-th reference scan signal GRi is inactive.

Figure 29:
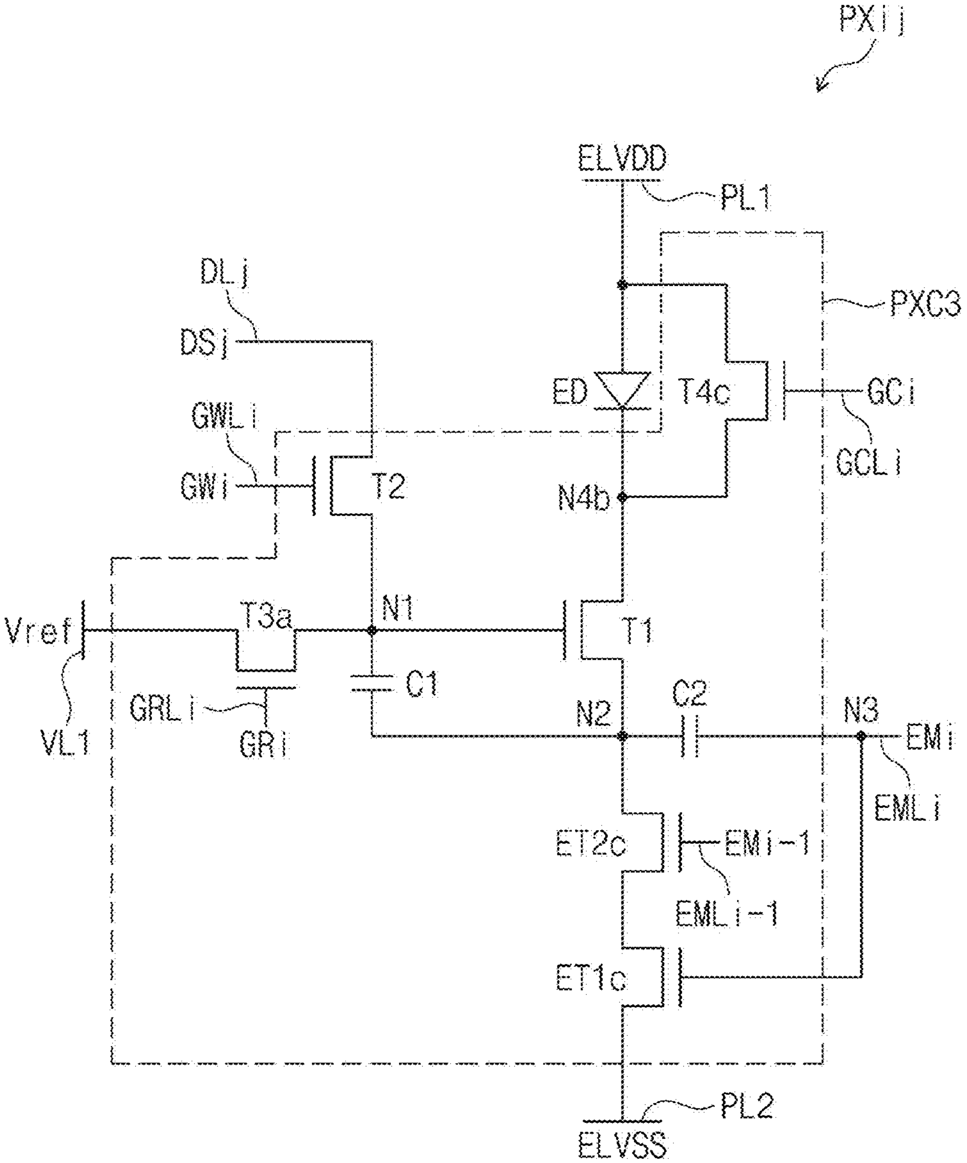
FIG. 29 is a circuit diagram of a pixel, according to some embodiments of the present disclosure.

FIG. 29 is a circuit diagram of a pixel, according to some embodiments of the present disclosure. Although FIG. 29 illustrates various components in a pixel according to some embodiments, embodiments according to the present disclosure are not limited thereto, and according to various embodiments, the pixel may include additional components or fewer components without departing from the spirit and scope of embodiments according to the present disclosure.

Figure 30:
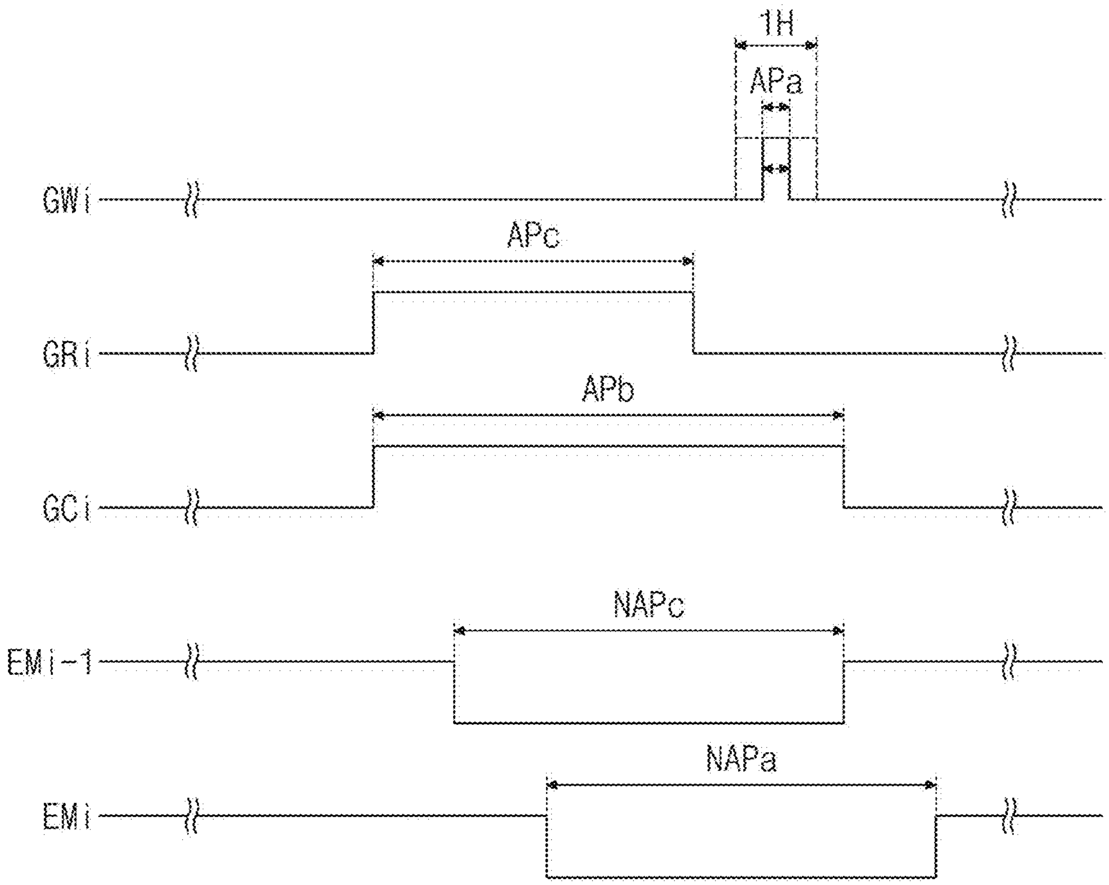
FIG. 30 is a waveform diagram illustrating signals applied to a pixel shown in FIG. 29.

FIG. 30 is a waveform diagram illustrating signals applied to a pixel shown in FIG. 29. However, the same reference numerals are given to the same components as those shown in FIG. 19 among the components shown in FIG. 29, and thus some repetitive detailed description thereof may be omitted.

Referring to FIG. 29, the pixel PXij may include a pixel circuit PXC3 (or a pixel driving circuit) and the light emitting element ED electrically connected to the pixel circuit PXC3. According to some embodiments, the pixel circuit PXC3 may include six transistors (referred to as "first to fourth transistors T1, T2, T3*a*, and T4*c* and first and second emission control transistors ET1*c* and ET2*c*"), and two capacitors (referred to as "the first capacitor C1 and the second capacitor C2").

The first emission control transistor ET1*c* may be connected between the second emission control transistor ET2*c* and the second power line PL2 to receive the i-th emission control signal EMi (or referred to as a "first emission control signal"). The first emission control transistor ET1*c* may include a first electrode connected to the second electrode of the second emission control transistor ET2*c*, a second electrode connected to the second power line PL2, and a gate electrode connected to the i-th emission control line EMLi. The first emission control transistor ET1*c* may be turned on in response to the i-th emission control signal EMi received through the i-th emission control line EMLi so as to electrically connect the second emission control transistor ET2*c* to the second power line PL2. The gate electrode of the first emission control transistor ET1*c* may be connected to the i-th emission control line EMLi through the third node N3.

The second emission control transistor ET2*c* may be connected between the first transistor T1 and the first emission control transistor ET1*c* to receive the (i−1)-th emission control signal EMi−1 (or referred to as a "second emission control signal"). The second emission control transistor ET2*c* may include a first electrode connected to the second electrode of the first transistor T1, a second electrode connected to the first emission control transistor ET1*c*, and a gate electrode connected to the (i−1)-th emission control line EMLi−1. The second emission control transistor ET2*c* may be turned on in response to the (i−1)-th emission control signal EMi−1 received through the (i−1)-th emission control line EMLi−1 so as to electrically connect the first transistor T1 to the first electrode of the first emission control transistor ET1*c*.

Referring to FIG. 30, each of the i-th write scan signal GWi, the i-th compensation scan signal GCi, the i-th reference scan signal GRi, the i-th emission control signal EMi, and the (i−1)-th emission control signal EMi−1 may have an active level (or a high level) during some periods (i.e., active periods) and may have an inactive level (or a low level) during the remaining periods (i.e., inactive periods).

The (i−1)-th emission control signal EMi−1 may be a signal deactivated before the i-th emission control signal EMi. Accordingly, the start time point of an inactive period NAPc of the (i−1)-th emission control signal EMi−1 precedes the start time point of the inactive period NAPa of the i-th emission control signal EMi. The inactive period NAPa of the i-th emission control signal EMi and the inactive period NAPc of the (i−1)-th emission control signal EMi−1 may overlap the active period APa of the i-th write scan signal GWi, the active period APb of the i-th compensation scan signal GCi and the active period APc of the i-th reference scan signal GRi.

Figure 31:
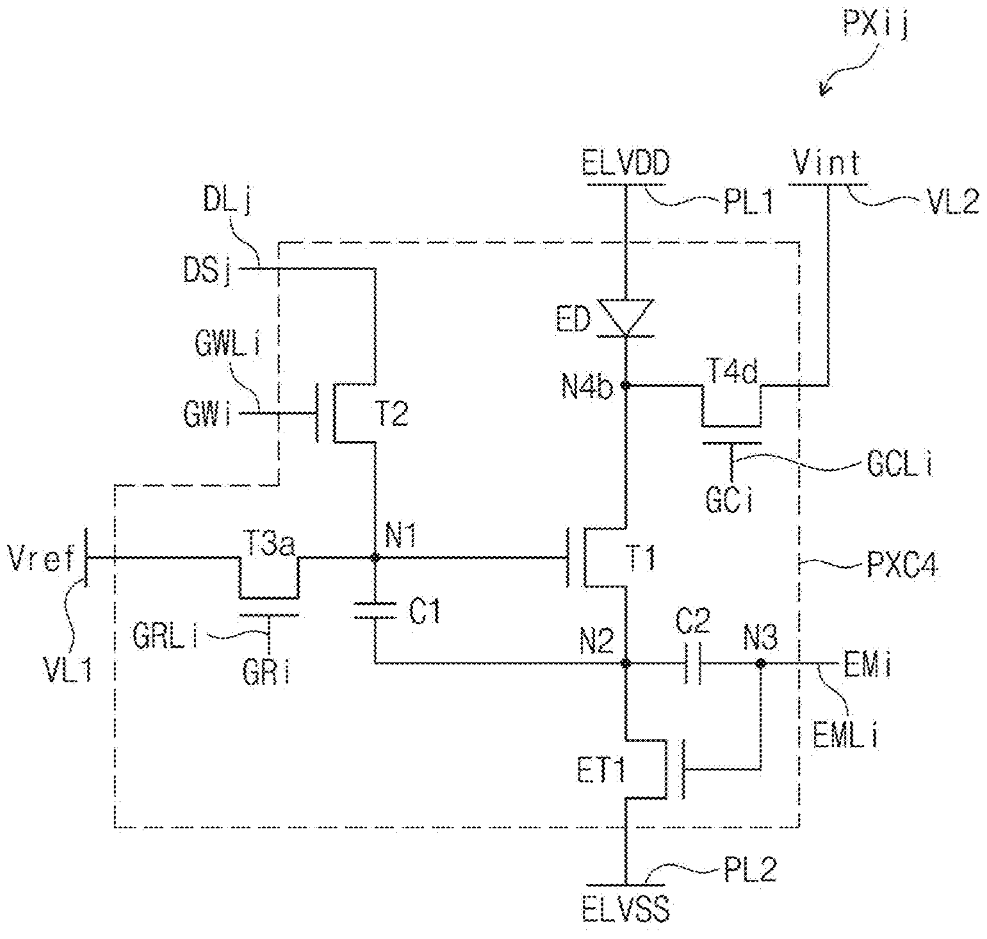
FIG. 31 is a circuit diagram of a pixel, according to some embodiments of the present disclosure.

FIG. 31 is a circuit diagram of a pixel, according to some embodiments of the present disclosure. Although FIG. 31 illustrates various components in a pixel according to some embodiments, embodiments according to the present disclosure are not limited thereto, and according to various embodiments, the pixel may include additional components or fewer components without departing from the spirit and scope of embodiments according to the present disclosure.

However, the same reference numerals are given to the same components as those shown in FIG. 19 among the components shown in FIG. 31, and thus some repetitive detailed description thereof may be omitted.

Referring to FIG. 31, the pixel PXij may include a pixel circuit PXC4 (or a pixel driving circuit) and the light emitting element ED electrically connected to the pixel circuit PXC4. According to some embodiments, the pixel circuit PXC4 may include five transistors (referred to as "first to fourth transistors T1, T2, T3*a*, and T4*d* and the first emission control transistor ET1") and two capacitors (hereinafter, referred to as the "first capacitor C1" and the "second capacitor C2"). According to some embodiments of the present disclosure, one of the five transistors of the pixel circuit PXC4 may be omitted, or an additional transistor may be further included in the pixel circuit PXC4.

The fourth transistor T4*d* is connected between the initialization voltage line VL2 and the fourth node N4*b* to receive the i-th compensation scan signal GCi. The fourth transistor T4*d* may include a first electrode connected to the initialization voltage line VL2, a second electrode connected to the first electrode of the first transistor T1 (i.e., the fourth node N4*b*), and a gate electrode connected to the i-th compensation scan line GCLi. The fourth transistor T4*d* may be turned on in response to the i-th compensation scan signal GCi received through the i-th compensation scan line GCLi to deliver the initialization voltage Vint applied to the initialization voltage line VL2 to the fourth node N4*b*. According to some embodiments of the present disclosure, the initialization voltage Vint may have different voltage levels depending on the color of the pixel PXij. In other words, initialization voltages having different voltage levels may be applied to each red, green, and blue pixel.

As shown in FIGS. 17 to 31, the number of scan driving circuits GWD, GCD, and GRD and the number of emission control circuits EMD, which are included in the first and second gate driving circuits 300 and 350, may be relatively reduced by reducing the number of scan signals and the number of emission control signals applied to the pixels PX to 3 and 1, respectively. As a result, the circuit configuration provided to the non-display area NDA of the display panel DPa may be simplified, and the width of the non-display area NDA may be relatively reduced.

Figure 32:
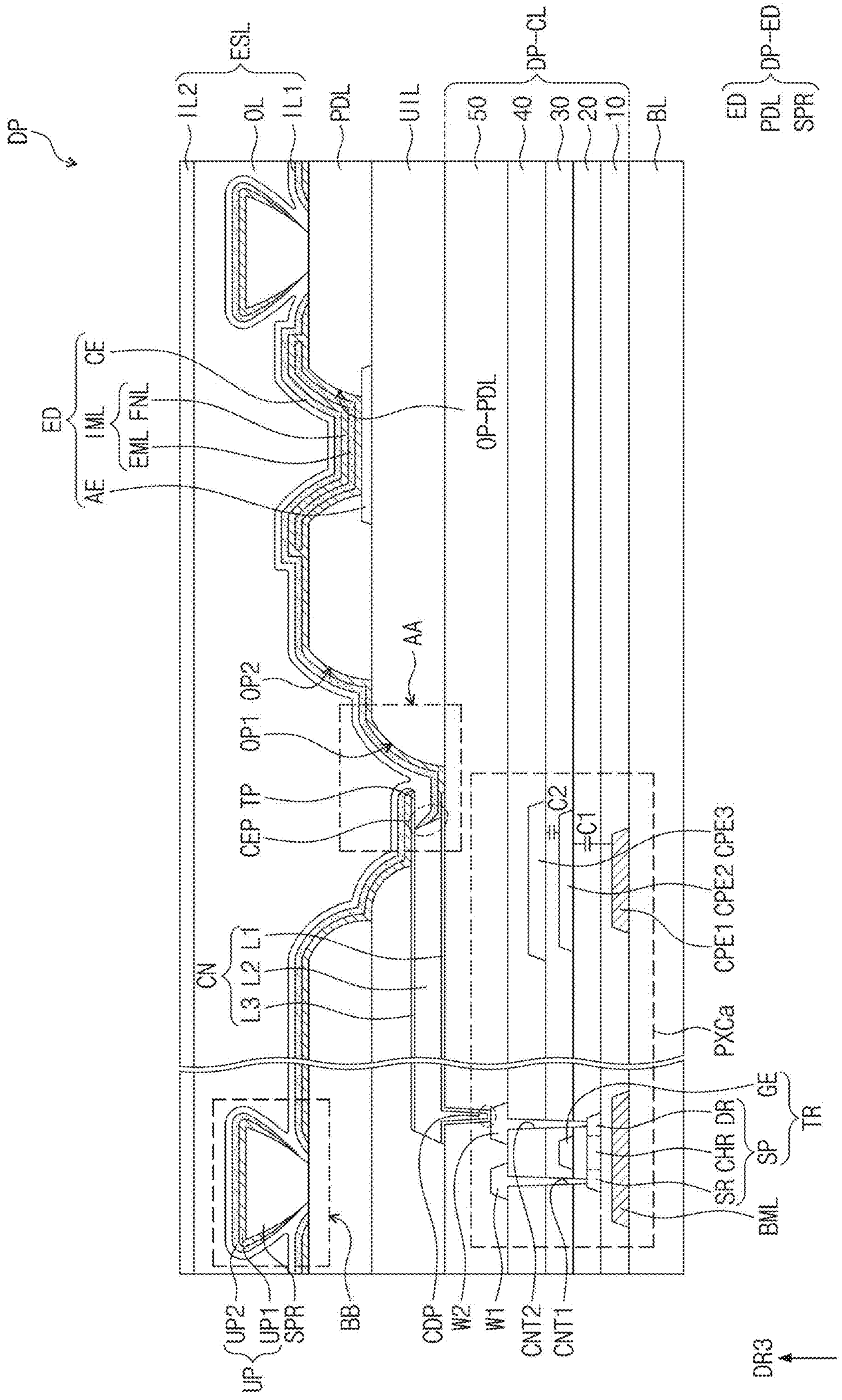
FIG. 32 is a cross-sectional view of a display panel, according to some embodiments of the present disclosure.

FIG. 32 is a cross-sectional view of the display panel DP, according to some embodiments of the present disclosure.

Referring to FIG. 32, the display panel DP may include a base layer BL, and a circuit element layer DP-CL, an upper insulating layer UIL, a connection wire CN, a display element layer DP-ED, and an encapsulation layer ESL that are located on the base layer BL. The encapsulation layer ESL may include a first inorganic insulating layer IL1, an organic layer OL and a second inorganic insulating layer IL2 sequentially stacked on the display element layer DP-ED.

FIG. 32 illustrates one transistor TR and two capacitors C1 and C2 of the pixel circuit PXCa. The transistor TR may correspond to a transistor (i.e., a transistor connected to a node (e.g., the fourth node N4 of FIG. 3) corresponding to a cathode CE of the light emitting element ED) connected to the light emitting element ED through the connection wire CN. In detail, the transistor TR may correspond to the second emission control transistor ET2 of FIG. 3 or the first transistor T1 of FIG. 19. Meanwhile, according to some embodiments, other transistors constituting the pixel circuit PXCa may have the same structure as the transistor TR (hereinafter, referred to as a "connection transistor") illustrated in FIG. 32. However, this is illustrative, and the other transistors constituting the pixel circuit PXCa may have a structure different from that of the connection transistor TR and are not limited to an embodiment.

A lower conductive layer BML may be arranged to overlap the connection transistor TR and may be covered by a first insulating layer 10. At least one of an inorganic barrier layer or a buffer layer may be further located between the lower conductive layer BML and the base layer BL.

According to some embodiments, the lower conductive layer BML may be connected to a source of the connection transistor TR through a source electrode pattern W1. In this case, the lower conductive layer BML may be synchronized with the source of the connection transistor TR. However, this is illustrative, and the lower conductive layer BML may be connected to a gate of the connection transistor TR and may be synchronized with the gate. Alternatively, the lower conductive layer BML may be connected to another electrode and may independently receive a constant voltage or a pulse signal. Alternatively, the lower conductive layer BML may be provided in a form isolated from another conductive pattern. The lower conductive layer BML according to some embodiments of the present disclosure may be provided in various forms and is not limited to an embodiment.

The connection transistor TR may be located on the first insulating layer 10. The connection transistor TR may include a semiconductor pattern SP and a gate electrode GE. The semiconductor pattern SP may be located on the first insulating layer 10. The semiconductor pattern SP may include a source region SR, a drain region DR, and a channel region CHR distinguished from one another depending on the degree of conductivity.

The display panel DP according to some embodiments may further include the source electrode pattern W1 and a drain electrode pattern W2 that are connected to the source region SR and the drain region DR, respectively. For example, each of the source electrode pattern W1 and the drain electrode pattern W2 may be integrally formed with one of lines constituting a pixel driver and is not limited to an embodiment.

A second insulating layer 20 may commonly overlap a plurality of pixels and may cover the semiconductor pattern SP. The gate electrode GE may be located on the second insulating layer 20. The gate electrode GE may correspond to the gate of the connection transistor TR.

A third insulating layer 30 may be located on the gate electrode GE, and a fourth insulating layer 40 may be located on the third insulating layer 30. A first capacitor electrode CPE1, a second capacitor electrode CPE2, and a third capacitor electrode CPE3 may be included in a plurality of conductive patterns.

The first capacitor electrode CPE1 and the second capacitor electrode CPE2 constitute the first capacitor C1. The first capacitor electrode CPE1 and the second capacitor electrode CPE2 may be spaced apart from each other with the first insulating layer 10 and the second insulating layer 20 therebetween.

According to some embodiments of the present disclosure, the first capacitor electrode CPE1 and the lower conductive layer BML may have a one-body shape. In addition, the second capacitor electrode CPE2 and the gate electrode GE may have a one-body shape.

The third capacitor electrode CPE3 may be located on the third insulating layer 30. The third capacitor electrode CPE3 may be spaced apart from the second capacitor electrode CPE2 with the third insulating layer 30 therebetween and may overlap the second capacitor electrode CPE2 when viewed from above the plane (e.g., in a plan view). The third capacitor electrode CPE3, together with the second capacitor electrode CPE2, may constitute the second capacitor C2.

The fourth insulating layer 40 may be located on the third insulating layer 30 and/or the third capacitor electrode CPE3. The source electrode pattern W1 and the drain electrode pattern W2 may be located on the fourth insulating layer 40. The source electrode pattern W1 may be connected to the source region SR of the connection transistor TR through a first contact hole CNT1, and the source electrode pattern W1 and the source region SR of the semiconductor pattern SP may function as the source of the connection transistor TR. The drain electrode pattern W2 may be connected to the drain region DR of the connection transistor TR through a second contact hole CNT2, and the drain electrode pattern W2 and the drain region DR of the semiconductor pattern SP may function as the drain of the connection transistor TR. A fifth insulating layer 50 may be located on the source electrode pattern W1 and the drain electrode pattern W2.

The connection wire CN may be located on the fifth insulating layer 50. The connection wire CN may electrically connect the pixel circuit PXCa and the light emitting element ED. In other words, the connection wire CN may electrically connect the connection transistor TR and the light emitting element ED. The connection wire CN may be a connection node that connects the pixel circuit PXCa and the light emitting element ED. That is, the connection wire CN may correspond to the fourth node N4 illustrated in FIG. 3 or may correspond to the fourth node N4*b* illustrated in FIG. 19. In the meantime, this is illustrative, and as long as the connection wire CN is capable of being connected to the light emitting element ED, the connection wire CN may be defined as a connection node with various elements among elements constituting the pixel circuit PXCa depending on the design of the pixel circuit PXCa and is not limited to an embodiment.

The upper insulating layer UIL may be located on the connection wire CN. The upper insulating layer UIL may be located on the fifth insulating layer 50 and may cover the connection wire CN. The upper insulating layer UIL may be an organic layer. For example, the upper insulating layer UIL may include a general purpose polymer, such as benzocyclobutene (BCB), polyimide, hexamethyldisiloxane (HMDSO), Polymethylmethacrylate (PMMA), or Polystyrene (PS), a polymer derivative having a phenolic group, an acryl-based polymer, an imide-based polymer, an aryl ether-based polymer, an amide-based polymer, a fluorine-based polymer, a p-xylene-based polymer, a vynyl alcohol-based polymer, or a blend thereof.

The upper insulating layer UIL may include an opening for exposing at least part of the connection wire CN. The connection wire CN may be electrically connected with the light emitting element ED through the portion exposed from the upper insulating layer UIL. That is, the connection wire CN may electrically connect the connection transistor TR and the light emitting element ED. Detailed description thereabout will be given below. Meanwhile, in the display panel DP according to some embodiments of the present disclosure, the upper insulating layer UIL may be omitted, or a plurality of upper insulating layers UIL may be provided. However, embodiments according to the present disclosure are not limited to an embodiment.

The display element layer DP-ED may be located on the upper insulating layer UIL. The display element layer DP-ED may include a pixel defining layer PDL, the light emitting element ED, and a separator SPR. The light emitting element ED may include an anode AE, an intermediate layer IML, and the cathode CE.

According to some embodiments, the anode AE may be located on the upper insulating layer UIL. The anode AE may be a transflective electrode, a transmissive electrode, or a reflective electrode. According to some embodiments of the present disclosure, the anode AE may include a reflective layer formed of silver (Ag), magnesium (Mg), aluminum (Al), platinum (Pt), palladium (Pd), gold (Au), nickel (Ni), neodymium (Nd), iridium (Ir), chromium (Cr), or a compound thereof and a transparent or translucent electrode layer formed on the reflective layer. The transparent or translucent electrode layer may include at least one or more selected from the group consisting of indium tin oxide (ITO), indium zinc oxide (IZO), indium gallium zinc oxide (IGZO), zinc oxide (ZnO), or indium oxide ($In_2O_3$) and aluminum-doped zinc oxide (AZO). For example, the anode AE may include a stacked structure of ITO/Ag/ITO. The anode AE may be connected to the first power line PL1 (see FIG. 3) to receive the first driving voltage ELVDD (see FIG. 3).

A light emitting opening OP-PDL for exposing at least part of the anode AE may be defined in the pixel defining layer PDL. A plurality of light emitting openings OP-PDL may be provided. The plurality of light emitting openings OP-PDL may be arranged to correspond to light emitting elements ED, respectively. All components of the light emitting element ED may be located in the light emitting opening OP-PDL to overlap one another, and the light emitting opening OP-PDL may be a region where light emitted by the light emitting element ED is displayed.

The intermediate layer IML may be interposed between the anode AE and the cathode CE. The intermediate layer IML may include a light emitting layer EML and a functional layer FNL. The light emitting element ED may include the intermediate layer IML having various structures and is not limited to an embodiment. For example, the functional layer FNL may include a plurality of layers, or may include two or more layers spaced apart from each other with the light emitting layer EML therebetween. Alternatively, according to some embodiments, the functional layer FNL may be omitted. Although FIG. 32 illustrates aspects of embodiments in which the light emitting layer EML and the functional layer FNL have different shapes from each other, the present disclosure is not limited thereto, and the light emitting layer EML and the functional layer FNL may be arranged in the same shape when viewed from above the plane (e.g., in a plan view).

The functional layer FNL may be interposed between the anode AE and the cathode CE. In detail, the functional layer FNL may be interposed between the anode AE and the light emitting layer EML, or may be interposed between the cathode CE and the light emitting layer EML. Alternatively, the functional layer FNL may be interposed between the anode AE and the light emitting layer EML and between the cathode CE and the light emitting layer EML. According to some embodiments, the light emitting layer EML is illustrated as being inserted into the functional layer FNL. However, this is illustrative, and the functional layer FNL may include a layer interposed between the light emitting layer EML and the anode AE and/or a layer interposed between the light emitting layer EML and the cathode CE and is not limited to an embodiment. The functional layer FNL may include a hole control layer and an electron control layer. At least part of the hole control layer may be interposed between the anode AE and the light emitting layer EML, and at least part of the electron control layer may be interposed between the light emitting layer EML and the cathode CE.

The cathode CE may be located on the intermediate layer IML. As described above, the cathode CE may be connected to the connection wire CN and may be electrically connected to the pixel circuit PXCa. That is, the cathode CE may be electrically connected to the connection transistor TR through the connection wire CN.

As described above, the connection wire CN may include a driving connection unit CDP and a light emitting connection unit CEP. The driving connection unit CDP may be a part of the connection wire CN connected to the pixel circuit PXCa and may be a part connected to the connection transistor TR. According to some embodiments, the driving connection unit CDP may penetrate the fifth insulating layer 50 and may be electrically connected to the drain region DR of the semiconductor pattern SP through the drain electrode pattern W2. The light emitting connection unit CEP may be a part of the connection wire CN connected to the light emitting element ED. The light emitting connection unit CEP may be a part, which is defined in a region exposed from the upper insulating layer UIL and to which the cathode CE is connected. A tip portion TP may be defined in the light emitting connection unit CEP.

Figure 33A:
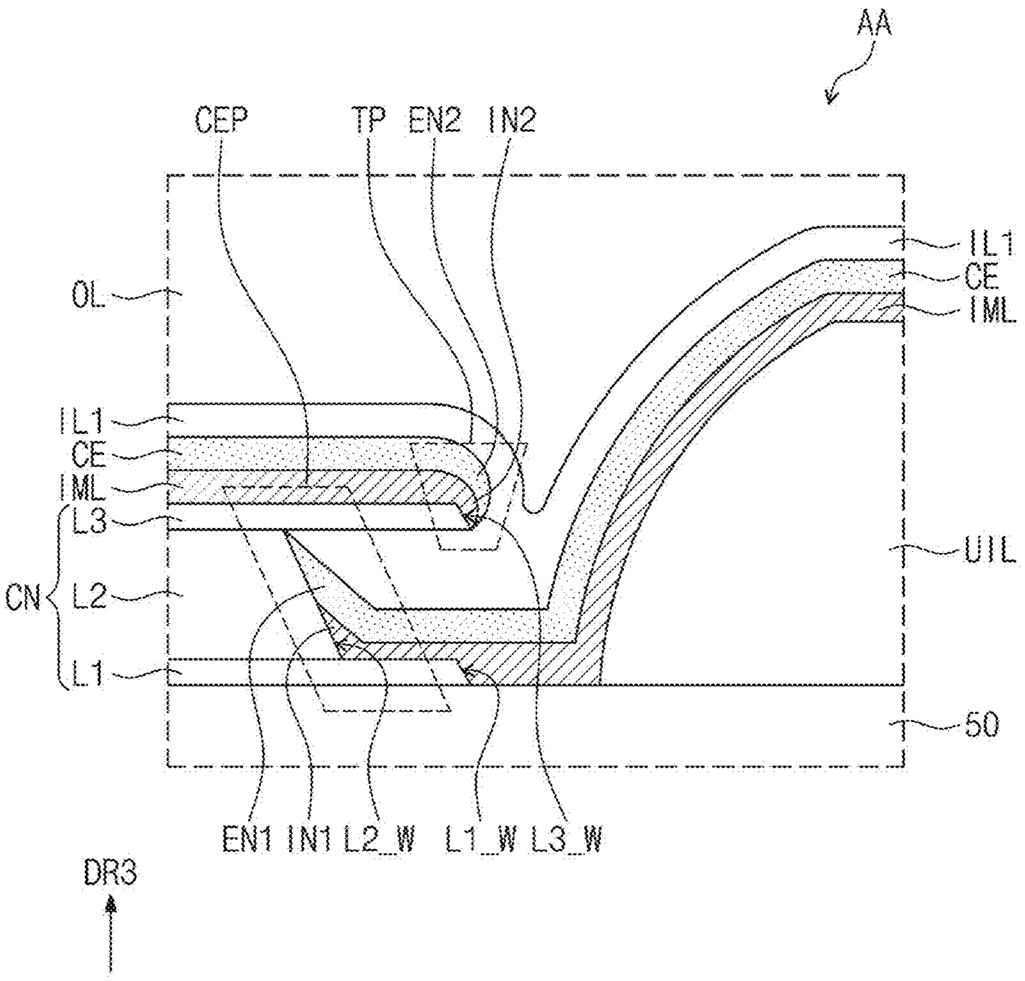
FIG. 33A is an enlarged cross-sectional view of a display panel, which is obtained by enlarging region AA of FIG. 32, according to some embodiments of the present disclosure.

The light emitting connection unit CEP of the connection wire CN will be described below in more detail with reference to FIGS. 32 and 33A. As illustrated in FIGS. 32 and 33A, the connection wire CN may have a three-layer structure. In detail, the connection wire CN may include a first layer L1, a second layer L2, and a third layer L3 sequentially stacked in the third direction DR3. The second layer L2 may include a material different from that of the first layer L1. Moreover, the second layer L2 may include a material different from that of the third layer L3. The second layer L2 may have a greater thickness than the first layer L1. Furthermore, the second layer L2 may have a greater thickness than the third layer L3. The second layer L2 may include a highly conductive material. According to some embodiments, the second layer L2 may include aluminum (Al).

In the meantime, the first layer L1 may include a material having a lower etch rate than the second layer L2. In other words, the second layer L2 may be formed of materials having a high etch selectivity with respect to the first layer L1. According to some embodiments, the first layer L1 may include titanium (Ti), and the second layer L2 may include aluminum (Al). In this case, a side surface L1_W of the first layer L1 may be defined outward from a side surface L2_W of the second layer L2. That is, the light emitting connection unit CEP of the connection wire CN may have a shape in which the side surface L1_W of the first layer L1 protrudes outward from the side surface L2_W of the second layer L2. That is, the light emitting connection unit CEP of the connection wire CN may have a shape in which the side surface L2_W of the second layer L2 is recessed inward from the side surface L1_W of the first layer L1.

Besides, the third layer L3 may include a material having a lower etch rate than the second layer L2. That is, the second layer L2 may be formed of materials with high etch selectivity with respect to the third layer L3. According to some embodiments, the third layer L3 may include titanium (Ti), and the second layer L2 may include aluminum (Al). In this case, a side surface L3_W of the third layer L3 may be defined outward from the side surface L2_W of the second layer L2. That is, the light emitting connection unit CEP of the connection wire CN may have a shape in which the side surface L3_W of the third layer L3 protrudes outward from the side surface L2_W of the second layer L2. That is, the light emitting connection unit CEP of the connection wire CN may have an undercut shape or an overhang structure, and the tip portion TP of the light emitting connection unit CEP may be defined by the portion of the third layer L3 that protrudes relative to the second layer L2.

The upper insulating layer UIL and the pixel defining layer PDL may expose at least part of the tip portion TP and at least part of the side surface L2_W of the second layer L2. In particular, a first opening OP1 for exposing one side of the connection wire CN may be defined in the upper insulating layer UIL, and a second opening OP2 overlapping the first opening OP1 may be defined in the pixel defining layer PDL. The planar area of the second opening OP2 may be greater than the planar area of the first opening OP1. However, the present disclosure is not limited thereto, and as long as at least part of the tip portion TP and at least part of the side surface L2_W of the second layer L2 are capable of being exposed, the planar area of the second opening OP2 may be smaller than or equal to the planar area of the first opening OP1.

The intermediate layer IML may be located on the pixel defining layer PDL. The intermediate layer IML may also be located on a partial region of the upper insulating layer UIL exposed by the second opening OP2 of the pixel defining layer PDL. Moreover, the intermediate layer IML may also be located on a partial region of the connection wire CN exposed by the first opening OP1 of the upper insulating layer UIL. As illustrated in FIG. 33A, the intermediate layer IML may include one end IN1 arranged along the upper surface of the fifth insulating layer 50 and an opposite end IN2 arranged along the upper surfaces of the connection wire CN (including the upper surface of the tip portion TP). That is, when viewed on the cross-section, the intermediate layer IML may have a shape that is partially disconnected with respect to the tip portion TP in the region where the light emitting connection unit CEP is defined. However, when viewed from above the plane (e.g., in a plan view), the intermediate layer IML may have a one-body shape that is connected as a whole within a region (see FIG. 35A) defined as a closed line by the separator SPR.

The cathode CE may be located on the intermediate layer IML. The cathode CE may also be located on a partial region of the upper insulating layer UIL exposed by the second opening OP2 of the pixel defining layer PDL. Furthermore, the cathode CE may also be located on a partial region of the connection wire CN exposed by the first opening OP1 of the upper insulating layer UIL. As illustrated in FIG. 33A, the cathode CE may include one end EN1 arranged along the upper surface of the fifth insulating layer 50 and an opposite end EN2 arranged along the upper surfaces of the connection wire CN (including the upper surface of the tip portion TP). That is, when viewed on the cross-section, the cathode CE may have a shape that is partially disconnected with respect to the tip portion TP in the region where the light emitting connection unit CEP is defined. However, when viewed from above the plane (e.g., in a plan view), the cathode CE may have a one-body shape that is connected as a whole within the region (see FIG. 35A) defined as a closed curve by the separator SPR.

In the meantime, the one end EN1 of the cathode CE may be arranged along the side surface L2_W of the second layer L2 and may make contact with the side surface L2_W of the second layer L2. In detail, through a difference in deposition angle between the cathode CE and the intermediate layer IML, the cathode CE may be formed to make contact with the side surface L2_W of the second layer L2 exposed from the intermediate layer IML by the tip portion TP. That is, the cathode CE may be connected to the connection wire CN without a separate patterning process for the intermediate layer IML, and thus the light emitting element ED may be electrically connected to the pixel circuit PXCa through the connection wire CN.

According to some embodiments, although the opposite end IN2 of the intermediate layer IML and the opposite end EN2 of the cathode CE are illustrated as covering the side surface L3_W of the third layer L3, this is illustrative, and at least part of the side surface L3_W of the third layer L3 may be exposed from the opposite end IN2 of the intermediate layer IML and/or the opposite end EN2 of the cathode CE.

The display panel DP according to some embodiments may include the separator SPR. The separator SPR may be located on the pixel defining layer PDL. According to some embodiments, the cathode CE and the intermediate layer IML may be commonly formed for the plurality of pixels by deposition through an open mask. In this case, the cathode CE and the intermediate layer IML may be divided by the separator SPR. As described above, the separator SPR may have a closed-line shape for each of light emitting parts, and thus the cathode CE and the intermediate layer IML may have a divided shape for each light emitting part. That is, the cathode CE and the intermediate layer IML may be electrically independent of each adjacent pixel.

Figure 33B:
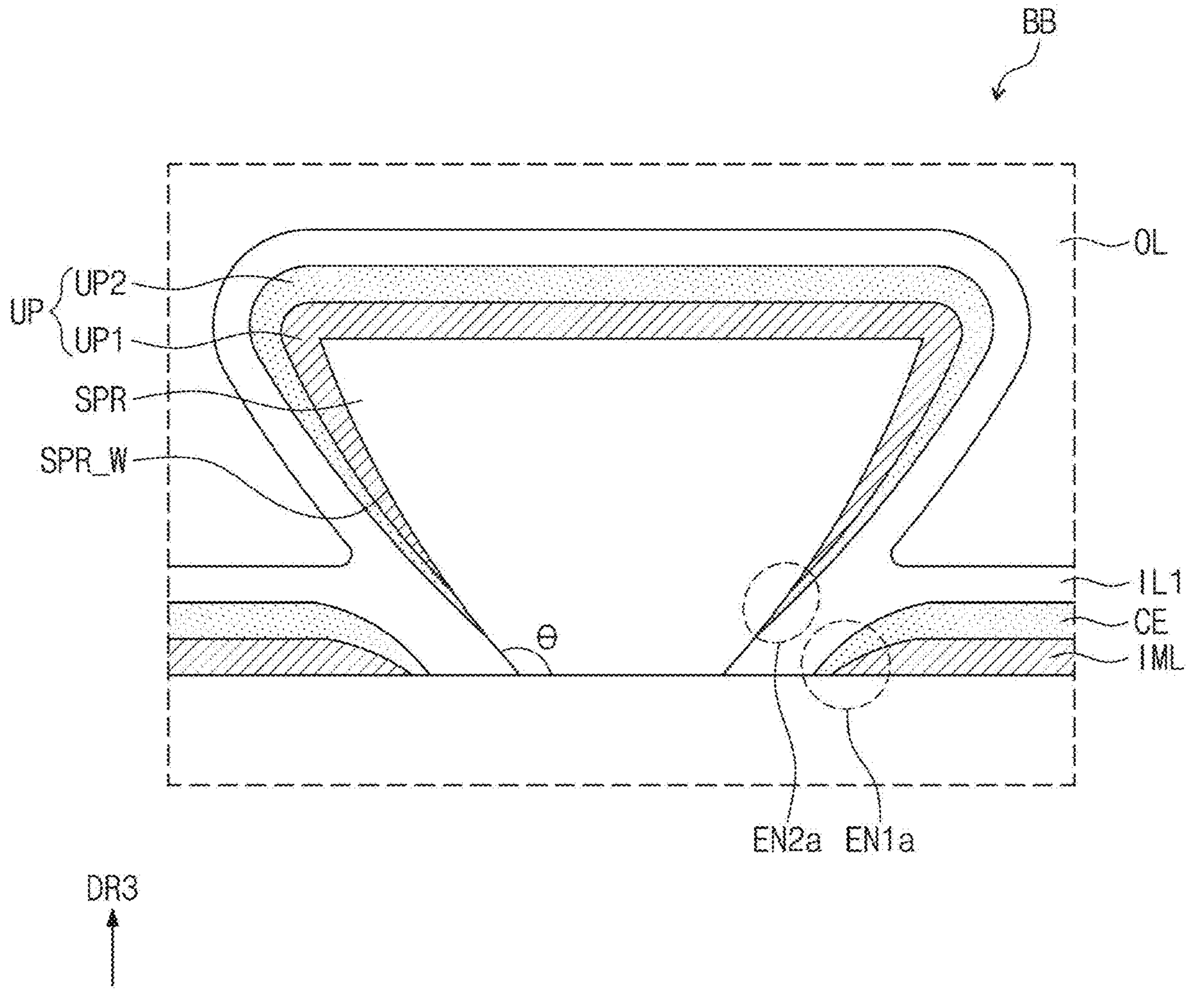
FIG. 33B is an enlarged cross-sectional view of a display panel, which is obtained by enlarging region BB of FIG. 32, according to some embodiments of the present disclosure.

The separator SPR will be described below in more detail with reference to FIGS. 32 and 33B. As illustrated in FIG. 33B, the separator SPR may have an inverted tapered shape. That is, an angle θ (hereinafter, referred to as a "taper angle") formed by a side surface SPR_W of the separator SPR with respect to the upper surface of the pixel defining layer PDL may be an obtuse angle. However, this is illustrative, and the taper angle may be diversely set as long as the separator SPR is capable of electrically disconnecting the cathode CE for each pixel. In addition, the separator SPR may have the same structure as the tip portion TP and is not limited to an embodiment.

According to some embodiments, the separator SPR may include an insulating material. In particular, the separator SPR may include an organic insulating material. Alternatively, the separator SPR may include an inorganic insulating material. In another case, the separator SPR may be composed of multiple layers of an organic insulating material and an inorganic insulating material. According to some embodiments, the separator SPR may include a conductive material. That is, the type of material of the separator SPR is not particularly limited as long as the cathode CE is capable of being electrically disconnected for each pixel.

A dummy layer UP may be located on the separator SPR. The dummy layer UP may include a first dummy layer UP1 located on the separator SPR and a second dummy layer UP2 located on the first dummy layer UP1. The first dummy layer UP1 may be formed through the same process as that of the intermediate layer IML and may include the same material as the intermediate layer IML. The second dummy layer UP2 may be formed through the same process as that of the cathode CE and may include the same material as the cathode CE. That is, the first dummy layer UP1 and the second dummy layer UP2 may be simultaneously (or concurrently) formed in a process of forming the intermediate layer IML and the cathode CE. According to some embodiments, the display panel DP may not include the dummy layer UP.

As illustrated in FIG. 33B, according to some embodiments, the cathode CE may include a first end portion EN1*a*, and the second dummy layer UP2 may include a second end portion EN2*a*. The first end portion EN1*a* may be spaced apart from the separator SPR and may be located on the pixel defining layer PDL, and the second end portion EN2*a* may be separated from the first end portion EN1*a* and may be located on the side surface SPR_W of the separator SPR.

However, although the first end portion EN1*a* is illustrated as being spaced apart from the side surface SPR_W of the separator SPR at a certain interval in FIG. 33B, the present disclosure is not limited thereto, and the first end portion EN1*a* may make contact with the side surface SPR_W of the separator SPR as long as the first end portion EN1*a* is electrically disconnected from the second end portion EN2*a*. Moreover, when a portion formed along the side surface SPR_W of the separator SPR is thin such that electrical resistance is high even though the first end portion EN1*a* and the second end portion EN2*a* are connected without being distinguished from each other, the cathode CE may be considered as being divided by the separator SPR when the cathode CE is electrically disconnected between adjacent pixels.

According to some embodiments of the present disclosure, even though there is no separate patterning process for the cathode CE or the intermediate layer IML, the cathode CE or the intermediate layer IML may be divided for each pixel by preventing or reducing instances of the cathode CE or the intermediate layer IML being formed on the side surface SPR_W of the separator SPR or by making the cathode CE or the intermediate layer IML thin. In addition, as long as the cathode CE or the intermediate layer IML is capable of being electrically disconnected between adjacent pixels, the shape of the separator SPR may be modified in various ways and is not limited to an embodiment.

Figure 34:
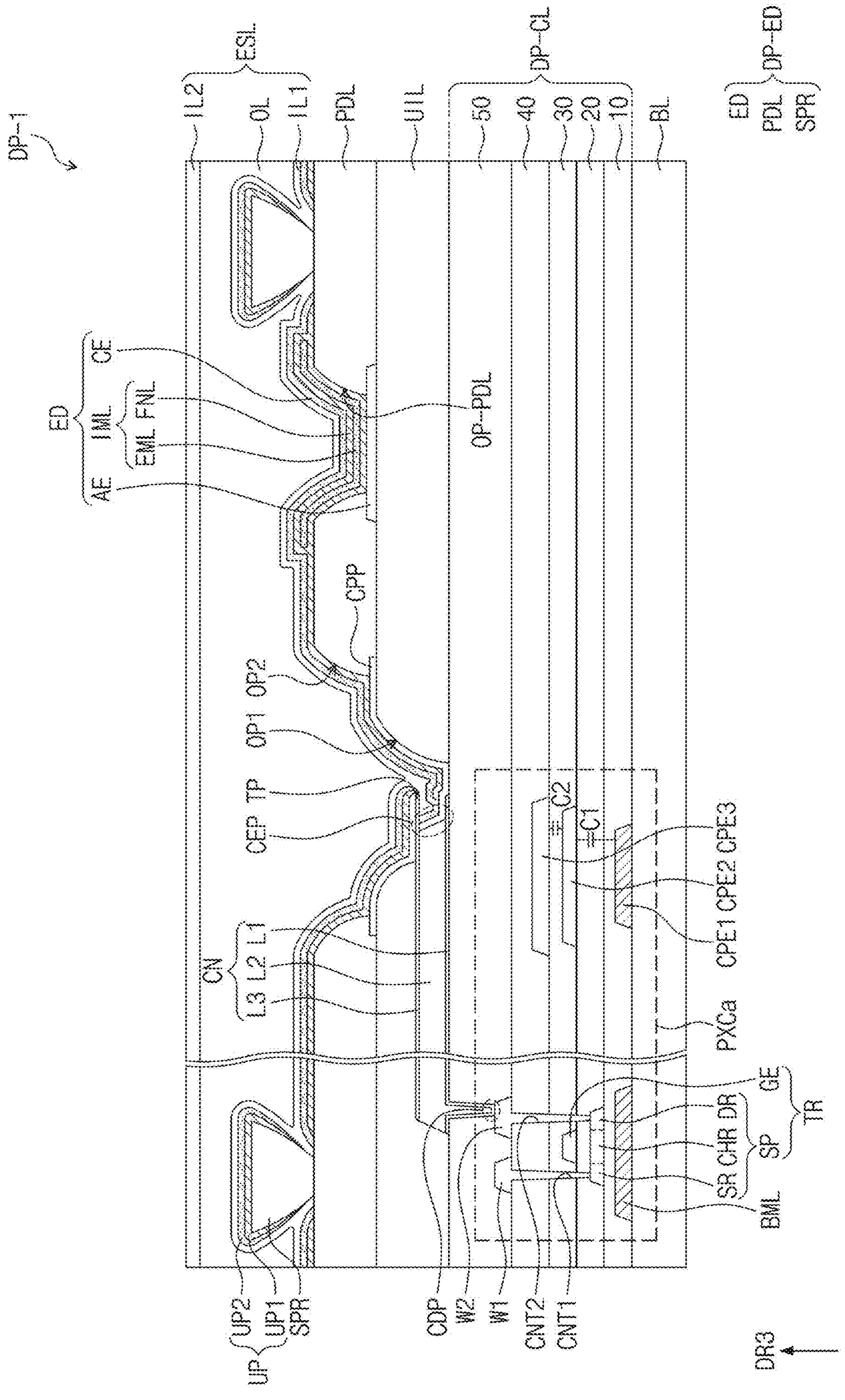
FIG. 34 is a sectional view of a display panel, according to some embodiments of the present disclosure.

FIG. 34 is a cross-sectional view of a display panel, according to some embodiments of the present disclosure. For ease of description, a cross-sectional view of a region corresponding to FIG. 32 is illustrated in FIG. 34. Hereinafter, components identical to the components described above with reference to FIG. 32 will be assigned with identical reference numerals, and some repetitive detailed description thereof may be omitted.

When compared to the display panel DP illustrated in FIG. 32, a display panel DP-1 illustrated in FIG. 34 may further include a capping pattern CPP. The capping pattern CPP may be located on the upper insulating layer UIL. Moreover, the capping pattern CPP may also be located on a partial region of the connection wire CN exposed by the first opening OP1 of the upper insulating layer UIL. The capping pattern CPP may be arranged to overlap the connection wire CN. Specifically, the capping pattern CPP may be arranged to overlap the light emitting connection unit CEP and/or the tip portion TP.

Furthermore, when viewed on the cross-section illustrated in FIG. 34, the capping pattern CPP may have a shape that is partially disconnected with respect to the tip portion TP in the region where the light emitting connection unit CEP is defined. However, when viewed from above the plane (e.g., in a plan view), the capping pattern CPP may have a one-body shape that is connected as a whole within the region (see FIG. 35A) defined as a closed line by the separator SPR. In the meantime, one end portion of the partially disconnected capping pattern CPP may make contact with a side surface of the second layer L2 of the connection wire CN, and another end portion of the capping pattern CPP may be located on the third layer L3 of the connection wire CN and may cover the tip portion TP.

The capping pattern CPP may include a conductive material. Accordingly, the cathode CE may be electrically connected to the connection wire CN through the capping pattern CPP. That is, the capping pattern CPP may make contact with the side surface of the second layer L2 of the connection wire CN. Afterward, the cathode CE may make contact with the capping pattern CPP and may be electrically connected to the connection wire CN. The capping pattern CPP may be arranged outward from the second layer L2 of the connection wire CN, and the cathode CE may be electrically connected with the second layer L2 only by making a connection with the capping pattern CPP instead of the side surface of the second layer L2. Accordingly, the connection between the connection wire CN and the cathode CE may be easily performed.

Also, the capping pattern CPP may include a material having a lower reactivity than the second layer L2 of the connection wire CN. For example, the capping pattern CPP may include copper (Cu), silver (Ag), or transparent conductive oxide. The side surface of the second layer L2 of the connection wire CN may be protected by the capping pattern CPP having a lower reactivity than the second layer L2 of the connection wire CN, and thus oxidation of the material included in the second layer L2 may be prevented or reduced. Moreover, a phenomenon that a silver (Ag) component included in the anode AE may be relatively reduced during an etching process of patterning the anode AE and remains as particles that cause defects may be prevented or reduced.

According to some embodiments, the capping pattern CPP may be formed through the same process as that of the anode AE and may include the same material as the anode AE. However, this is illustrative, and the capping pattern CPP may be formed through a process different from that of the anode AE and may include a material different from that of the anode AE. Embodiments according to the present disclosure are not limited to an embodiment.

Figure 35A:
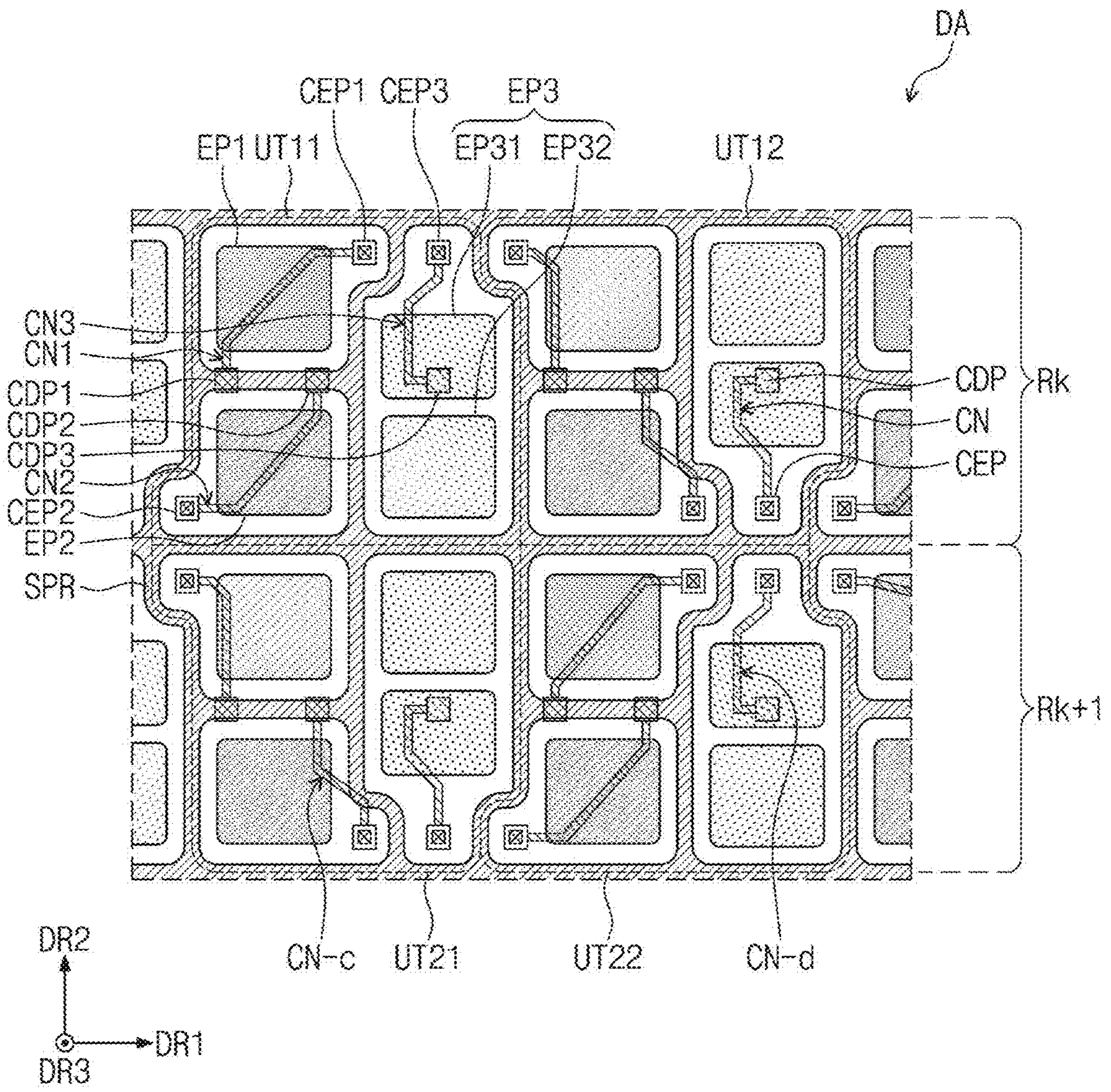
FIGS. 35A to 35C are enlarged plan views of partial regions of a display panel, according to some embodiments of the present disclosure.
Figure 35B:
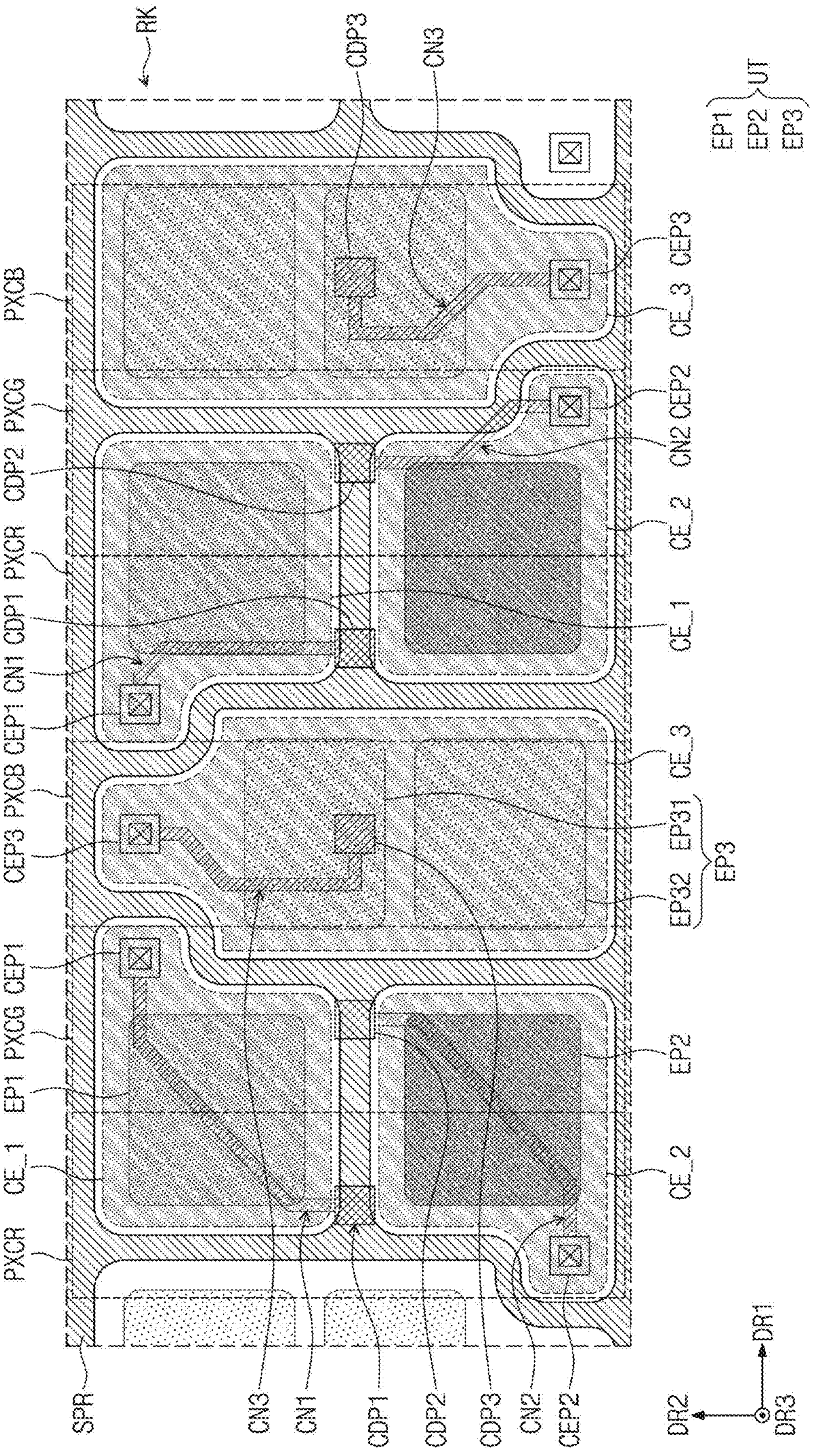
Figure 35C:
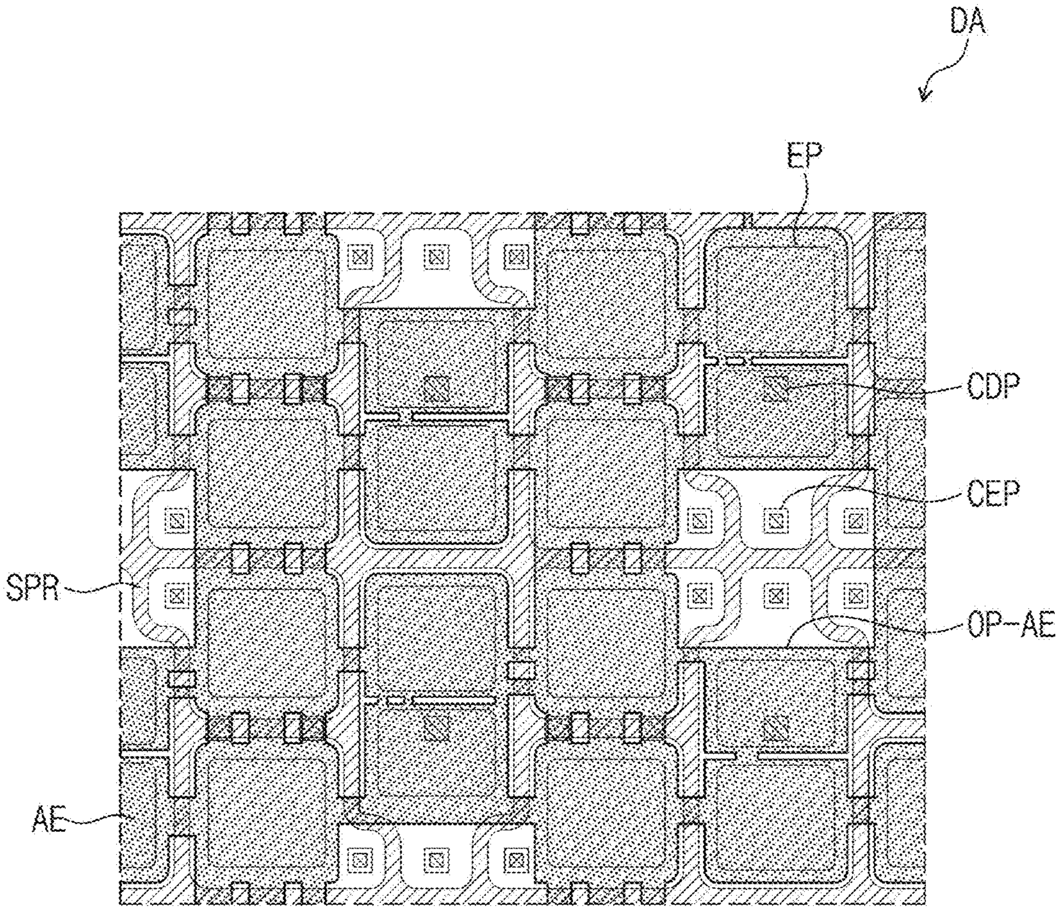

FIGS. 35A to 35C are enlarged plan views of partial regions of a display panel, according to some embodiments of the present disclosure. FIGS. 35A to 35C may correspond to enlarged plan views of the display panels DP and DP-1 according to some embodiments as described above with reference to FIGS. 32 to 34. FIG. 35A illustrates a region where a total of four light emitting units are arranged in two rows and two columns, and FIG. 35B illustrates an enlarged view of a partial region illustrated in FIG. 35A. In FIG. 35C, some of the components illustrated in FIG. 35A are omitted or emphasized. Hereinafter, the present disclosure will be described with reference to FIGS. 35A to 35C.

In FIG. 35A, light emitting units UT11, UT12, UT21, and UT22 arranged in two rows and two columns are illustrated. Light emitting parts in a first row Rk include light emitting parts that constitute the light emitting unit UT11 in the first row and the first column and the light emitting unit UT12 in the first row and the second column. Light emitting parts in a second row Rk+1 include light emitting parts that constitute the light emitting unit UT21 in the second row and the first column and the light emitting unit UT22 in the second row and the second column. In FIG. 35B, the light emitting parts in the first row Rk are illustrated. Among the components of the display panel, the separator SPR and a plurality of light emitting parts EP1, EP2, and EP3, connection wires CN1, CN2, and CN3, the anode AE, and the cathode CE, which are located in regions partitioned by the separator SPR are illustrated in FIGS. 35A to 35C.

As described above, each of the light emitting parts EP1, EP2, and EP3 may correspond to the light emitting opening OP-PDL (see FIG. 32). That is, each of the light emitting parts EP1, EP2, and EP3 may be a region where light is emitted by a light emitting element and may correspond to a unit constituting an image displayed on the display panel DP (see FIG. 32). In more detail, each of the light emitting parts EP1, EP2, and EP3 may correspond to a region defined by the light emitting opening OP-PDL (see FIG. 32), particularly, a region defined by the lower portion of the light emitting opening OP-PDL.

The light emitting parts EP1, EP2, and EP3 may include the first light emitting part EP1, the second light emitting part EP2, and the third light emitting part EP3. The first light emitting part EP1, the second light emitting part EP2, and the third light emitting part EP3 may emit light of a first color, light of a second color, and light of a third color, respectively. The light of the first color, the light of the second color, and the light of the third color may be light of different colors. For example, the first light emitting part EP1 may emit red light; the second light emitting part EP2 may emit green light; and, the third light emitting part EP3 may emit blue light. However, a combination of colors is not limited thereto. Furthermore, at least two or more of the light emitting parts EP1, EP2, and EP3 may emit light of the same color. For example, the first to third light emitting parts EP1, EP2, and EP3 may all emit blue light or white light.

Among the light emitting parts EP1, EP2, and EP3, the third light emitting part EP3 emitting the light of the third color may include two sub-light emitting parts EP31 and EP32 spaced apart from each other in the second direction DR2. However, this is illustrative. Likewise to the other light emitting parts EP1 and EP2, the third light emitting part EP3 may be provided as one pattern having a one-body shape, and at least one of the other light emitting parts EP1 and EP2 may include sub-light emitting parts spaced apart from each other. Embodiments according to the present disclosure are not limited to an embodiment.

The light emitting parts in the first row Rk may include the light emitting parts EP1, EP2, and EP3 that constitute the light emitting unit UT11 in the first row and the first column and the light emitting unit UT12 in the first row and the second column. The light emitting parts in the second row Rk+1 may include the light emitting parts EP1, EP2, and EP3 that constitute the light emitting unit UT21 in the second row and the first column and the light emitting unit UT22 in the second row and the second column. Some of the light emitting parts in the first row Rk and some of the light emitting parts in the second row Rk+1 may have symmetrical shapes. For example, the first light emitting part EP1 and the second light emitting part EP2 of the light emitting unit UT21 in the second row and the first column and the first light emitting part EP1 and the second light emitting part EP2 of the light emitting unit UT11 in the first row and the first column may have line symmetry and arrangement with respect to an axis parallel to the first direction DR1. The third light emitting part EP3 of the light emitting unit UT21 in the second row and the first column and the third light emitting part EP3 of the light emitting unit UT11 in the first row and the first column may have line symmetry arrangement with respect to an axis parallel to the first direction DR1. However, this is illustrative, and the present disclosure is not limited thereto.

Hereinafter, the light emitting unit UT11 in the first row and the first column will be described. In FIG. 35B, a plurality of cathodes CE_1, CE_2, and CE_3, a plurality of pixel drivers PXCR, PXCG, and PXCB, and a plurality of connection wires CN1, CN2, and CN3 are illustrated for ease of description. The cathodes CE_1, CE_2, and CE_3 may be separated from one another by the separator SPR and may be electrically disconnected from one another. According to some embodiments, one light emitting unit UT may include the three light emitting parts EP1, EP2, and EP3. Accordingly, the light emitting unit UT may include the three cathodes CE_1, CE_2, and CE_3 (hereinafter, referred to as "first to third cathodes"), the three pixel drivers PXCR, PXCG, and PXCB, and the three connection wires CN1, CN2, and CN3. However, this is illustrative, and the number and arrangement of light emitting units UT may be designed in various ways and are not limited to an embodiment.

The first to third pixel drivers PXCR, PXCG, and PXCB are electrically connected to light emitting elements constituting the first to third light emitting parts EP1, EP2, and EP3, respectively. The expression "connected" used herein includes not only physical direct contact but also electrical connection.

Also, the regions where the pixel drivers PXCR, PXCG, and PXCB are defined on the plane as illustrated in FIG. 35B may correspond to a unit in which transistors and capacitors constituting the pixel circuit PXCa (see FIG. 3) for driving a light emitting element of a pixel are repeatedly arranged.

The first to third pixel drivers PXCR, PXCG, and PXCB may be sequentially arranged in the first direction DR1. In the meantime, the placement positions of the first to third pixel drivers PXCR, PXCG, and PXCB may be independently designed irrespective of the positions or shapes of the first to third light emitting parts EP1, EP2, and EP3.

For example, the first to third pixel drivers PXCR, PXCG, and PXCB may be located at positions different from the positions at which the regions partitioned and defined by the separator SPR, that is, the first to third cathodes CE_1, CE_2, and CE_3 are located, or may be designed to have shapes and areas different from those of the first to third cathodes CE_1, CE_2, and CE_3. Alternatively, the first to third pixel drivers PXCR, PXCG, and PXCB may be arranged to overlap positions, at which the first to third light emitting parts EP1, EP2, and EP3 are present, and may be designed in shapes similar to the shapes of the regions (e.g., the first to third cathodes CE_1, CE_2, and CE_3) partitioned and defined by the separator SPR.

According to some embodiments, the first to third pixel drivers PXCR, PXCG, and PXCB are illustrated in a rectangular shape, the first to third light emitting parts EP1, EP2, and EP3 have smaller areas than the first to third pixel drivers PXCR, PXCG, and PXCB and are arranged in a form different form that of the first to third pixel drivers PXCR, PXCG, and PXCB. The first to third cathodes CE_1, CE_2, and CE_3 are located at positions overlapping the first to third light emitting parts EP1, EP2, and EP3 and illustrated in an irregular shape.

Accordingly, as illustrated in FIG. 35B, the first pixel driver PXCR may be located at a position that partially overlaps the first light emitting part EP1, the second light emitting part EP2, and another adjacent light emitting unit. The second pixel driver PXCG may be located at a position that overlaps the first light emitting part EP1, the second light emitting part EP2, and the third light emitting part EP3. The third pixel driver PXCB may be located at a position that overlaps the third light emitting part EP3. Meanwhile, this is illustrative, and the positions of the first to third pixel drivers PXCR, PXCG, and PXCB may be designed in various forms and arrangements independently of the light emitting parts EP1, EP2, and EP3 and are not limited to an embodiment.

The plurality of connection wires CN may be provided. The connection wires CN may be placed spaced apart from each other. The one connection wire CN may electrically connect one pixel driver of the pixel drivers PXCR, PXCG, and PXCB and a light emitting element corresponding to the one pixel driver. In detail, the connection wire CN may correspond to a node (refer to the fourth node N4 in FIG. 3)

where the light emitting element ED (see FIG. 32) is connected to the pixel circuit PXCa (see FIG. 3).

The connection wire CN may include a first connection unit (or the light emitting connection unit CEP) and a second connection unit (or the driving connection unit CDP). The light emitting connection unit CEP may be provided on one side of the connection wire CN, and the driving connection unit CDP may be provided on an opposite side of the connection wire CN.

The driving connection unit CDP may be a part of the connection wire CN connected to the pixel circuit PXCa. According to some embodiments, the driving connection unit CDP may be connected to one electrode of a transistor constituting the pixel circuit PXCa. In detail, the driving connection unit CDP may be connected to the first electrode of the second emission control transistor ET2 illustrated in FIG. 3. Accordingly, the position of the driving connection unit CDP may correspond to the position of a transistor (refer to the connection transistor TR of FIG. 32) of the pixel circuit PXCa that is physically connected to the connection wire CN. The light emitting connection unit CEP may be a part of the connection wire CN connected to the light emitting element ED. According to some embodiments, the light emitting connection unit CEP may be connected to the cathode CE (see FIG. 32) of the light emitting element ED.

The light emitting unit UT may include the first to third connection wires CN1, CN2, and CN3. The first connection wire CN1 may connect the light emitting element that forms the first light emitting part EP1 and the first pixel driver PXCR; the second connection wire CN2 may connect the light emitting element that forms the second light emitting part EP2 and the second pixel driver PXCG; and, the third connection wire CN3 may connect the light emitting element that forms the third light emitting part EP3 and the third pixel driver PXCB.

In detail, the first to third connection wires CN1, CN2, and CN3 may connect the first to third cathodes CE_1, CE_2, and CE_3 and the first to third pixel drivers PXCR, PXCG, and PXCB, respectively. The first connection wire CN1 may include a first driving connection unit CDP1 connected to the first pixel driver PXCR and a first light emitting connection unit CEP1 connected to the first cathode CE_1. The second connection wire CN2 may include a second driving connection unit CDP2 connected to the second pixel driver PXCG and a second light emitting connection unit CEP2 connected to the second cathode CE_2. The third connection wire CN3 may include a third driving connection unit CDP3 connected to the third pixel driver PXCB and a third light emitting connection unit CEP3 connected to the third cathode CE_3.

The first to third driving connection units CDP1, CDP2, and CDP3 may be aligned in the first direction DR1. As described above, the first to third driving connection units CDP1, CDP2, and CDP3 may correspond to the positions of connection transistors constituting the first to third pixel drivers PXCR, PXCG, and PXCB, respectively. In one pixel, the connection transistor TR may be a transistor that includes, as one electrode, a connection node to which the pixel circuit PXCa and the light emitting element ED are connected and may correspond to, for example, the second emission control transistor ET2 of FIG. 3. According to some embodiments of the present disclosure, the shapes, positions, or arrangements of pixel drivers of all pixels may be simply configured and designed irrespective of the shapes, sizes, or emission colors of light emitting parts.

According to some embodiments, the first to third light emitting connection units CEP1, CEP2, and CEP3 may be located at positions not overlapping the light emitting parts EP1, EP2, and EP3 when viewed from above the plane (e.g., in a plan view). As will be described below, each of the light emitting connection units CEP1, CEP2, and CEP3 of the connection wire CN may be a part to which the light emitting element ED (see FIG. 32) is connected and in which the tip portion TP (see FIG. 32) is defined and therefore may be provided at a position not overlapping the light emitting opening OP-PDL (see FIG. 32). That is, the light emitting connection units CEP1, CEP2, and CEP3 may be connected to the cathodes CE_1, CE_2, and CE_3 at positions spaced apart from the light emitting parts EP1, EP2, and EP3. The cathodes CE_1, CE_2, and CE_3 may include partial regions protruding from the light emitting parts EP1, EP2, and EP3 when viewed from above the plane (e.g., in a plan view) to connect to the connection wires CN1, CN2, and CN3 at the positions where the light emitting connection units CEP1, CEP2, and CEP3 are located.

For example, the first cathode CE_1 may include, at a position not overlapping the first light emitting part EP1, a protrusion protruding from the first light emitting part EP1 to connect with the first connection wire CN1 at the position where the first light emitting connection unit CEP1 is located, and the first light emitting connection unit CEP1 may be provided on the protrusion.

Besides, the first driving connection unit CDP1 where the first pixel driver PXCR, particularly, the first connection wire CN1 is connected to the connection transistor TR (see FIG. 32) may be defined at a position not overlapping the first light emitting part EP1 when viewed from above the plane (e.g., in a plan view). According to some embodiments, the first connection wire CN1 may be located on the first light emitting part EP1, and thus the first cathode CE_1 and the first pixel driver PXCR spaced apart from each other may be easily connected.

In the meantime, the third driving connection unit CDP3 where the third pixel driver PXCB, particularly, the third connection wire CN3 is connected to the connection transistor TR may be defined at a position not overlapping the third light emitting connection unit CEP3 and may be located at a position overlapping the third light emitting part EP3 when viewed from above the plane (e.g., in a plan view). According to some embodiments, the third cathode CE_3 and the third pixel driver PXCB may be connected through the third connection wire CN3. Accordingly, in the design of the third pixel driver PXCB, restrictions according to the position or shape of the third light emitting part EP3 may be relatively reduced, and thus the degree of freedom in design may be relatively improved.

Returning to FIG. 35A, the light emitting parts in the second row Rk+1 may include light emitting parts having line symmetry and arrangement with the light emitting units UT11 and UT12 in the first row with respect to an axis parallel to the first direction DR1. In this case, due to the shapes and arrangement of the light emitting units UT11 and UT12 in the first row Rk, the light emitting units UT21 and UT22 in the second row Rk+1 may be include light emitting parts having a form in which the light emitting units UT11 and UT12 in the first row Rk are shifted in the first direction DR1 or the second direction DR2. That is, the light emitting unit UT21 in the second row and the first column may be composed of light emitting parts having the same shape as the light emitting unit UT12 in the first row and the second column. The light emitting unit UT22 at the second row and the second column may be composed of light emitting parts having the same shape as the light emitting unit UT11 in the first row and the first column.

Accordingly, connection wires CN-c located in the light emitting unit UT21 in the second row and the first column may have the same shape and arrangement as the connection wires CN1, CN2, and CN3 located in the light emitting unit UT12 in the first row and the second column. Likewise, connection wires CN-d located in the light emitting unit UT22 in the second row and the second column may have the same shape and arrangement as the connection wires CN1, CN2, and CN3 located in the light emitting unit UT11 in the first row and the first column.

Meanwhile, referring to FIG. 35C, the anode AE of the light emitting element according to some embodiments of the present disclosure may be commonly provided for the plurality of light emitting parts EP1, EP2, and EP3. That is, the anode AE may be formed as one integrated layer in the entire display area DA. Accordingly, the layer of the anode AE may be arranged to overlap the separator SPR. Alternatively, the anodes AE of the light emitting elements ED may be formed as independent conductive patterns spaced apart from one another and may be electrically connected to one another through other conductive layers. Accordingly, the patterns of the anodes AE may be arranged so as not to overlap the separator SPR.

As described above, the first driving voltage ELVDD (see FIG. 3) may be applied to the anode AE, and a common voltage may be provided to all of the light emitting parts. The anode AE may be connected to the first power line PL1 (see FIG. 3), which provides the first driving voltage ELVDD (see FIG. 3), in the non-display area NDA or may be connected to the first power line PL1 (see FIG. 3) in the display area DA and is not limited to an embodiment. In the former case, the first power line PL1 (see FIG. 3) may be located in the non-display area NDA (see FIG. 1), and the anode AE may have a shape that extends to the non-display area NDA (see FIG. 1).

In the cross-sectional views of FIGS. 32 and 34, the anode AE is illustrated as overlapping the light emitting opening OP-PDL and not overlapping the separator SPR. However, as illustrated in FIG. 35C, the anodes AE of the light emitting elements ED may have a one-body shape and may have a mesh or grid shape in which openings are defined in a partial region. That is, as long as the same first driving voltage ELVDD (see FIG. 3) is capable of being applied to the anode AE of each of the plurality of light emitting elements ED, the shape of the anode AE may be provided in various ways and is not limited to an embodiment.

In the meantime, a plurality of openings OP-AE may be defined in the anode AE according to some embodiments. The openings OP-AE may penetrate the layer of the anode AE. The openings OP-AE in the layer of the anode AE may be located at positions not overlapping the light emitting parts EP and may be defined at positions overlapping the separator SPR generally. The openings OP-AE may facilitate releasing gas generated from an organic layer located under the anode AE, for example, the upper insulating layer UIL (see FIG. 32) as described above. Accordingly, the gas of the organic layer located under the light emitting element ED may be sufficiently discharged in a process of manufacturing the display panel DP, and gas discharged from the organic layer after the manufacture of the display panel DP may be relatively reduced. Thus, the speed at which the light emitting element ED is degraded may be decreased.

According to some embodiments, the connection wire may be included between the light emitting element ED and the pixel driver. Accordingly, the light emitting element ED may be easily connected to the pixel driver even though only the shape of the cathode CE is changed without a change in the arrangement or shapes of the light emitting parts. Thus, the degree of freedom in design regarding the arrangement of the pixel driver may be relatively improved, and the area or resolution of the light emitting part of the display panel DP may be easily increased.

Figure 36:
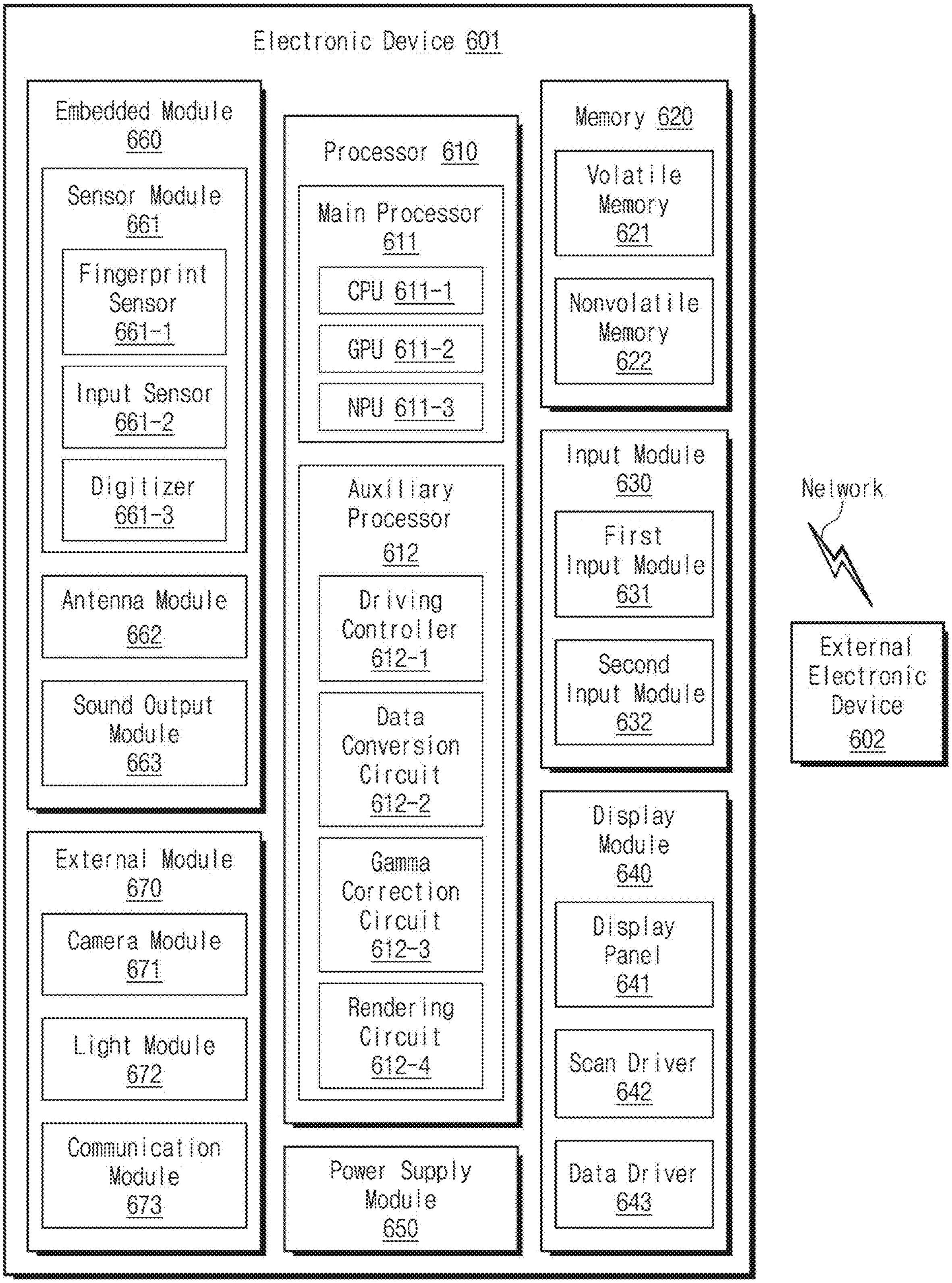
FIG. 36 is a block diagram of an electronic device, according to some embodiments of the present disclosure.

FIG. 36 is a block diagram of an electronic device, according to some embodiments of the present disclosure.

Referring to FIG. 36, an electronic device 601 outputs various pieces of information through a display module 640 within an operating system. When a processor 610 executes an application stored in a memory 620, a display module 640 provides application information to a user through a display panel 641.

The processor 610 obtains an external input through an input module 630 or a sensor module 661 and executes an application corresponding to the external input. For example, when the user selects a camera icon displayed on the display panel 641, the processor 610 obtains a user input through an input sensor 661-2 and activates a camera module 671. The processor 610 delivers image data corresponding to a captured image obtained through the camera module 671 to the display module 640. The display module 640 may display an image corresponding to the captured image through the display panel 641.

For another example, when personal information is authenticated on the display module 640, a fingerprint sensor 661-1 obtains entered fingerprint information as input data. The processor 610 compares input data obtained through the fingerprint sensor 661-1 with authentication data stored in the memory 620 and executes an application based on the comparison result. The display module 640 may display information, which is executed depending on the logic of the application, through the display panel 641.

For another example, when a music streaming icon displayed on the display module 640 is selected, the processor 610 obtains a user input through the input sensor 661-2 and activates the music streaming application stored in the memory 620. When a music play command is input by the music streaming application, the processor 610 provides sound information corresponding to the music play command to the user by activating a sound output module 663.

The operation of the electronic device 601 has been briefly described above. Hereinafter, a configuration of the electronic device 601 will be described in detail. Some of components of the electronic device 601, which will be described below, may be integrated and provided as one configuration, or the one configuration may be provided to be separated into two or more configurations.

Referring to FIG. 36, the electronic device 601 may communicate with an external electronic device 602 through a network (e.g., a short-range wireless communication network or a long-range wireless communication network). According to some embodiments, the electronic device 601 may include the processor 610, the memory 620, the input module 630, the display module 640, a power supply module 650, an embedded module 660, and an external module 670. According to some embodiments, in the electronic device 601, at least one of the above-described components may be omitted, or one or more other components may be added. According to some embodiments, some (e.g., the sensor module 661, an antenna module 662, or the sound output module 663) of the components described above may be integrated into another component (e.g., the display module 640).

The processor 610 may execute software to control at least another component (e.g., hardware or software component) of the electronic device 601 connected to the processor 610, and may process and calculate various types of data. According to some embodiments, as at least part of data processing or calculation, the processor 610 may store instructions or data received from other components (e.g., the input module 630, the sensor module 661 or a communication module 673) into a volatile memory 621, and may process instructions or data stored in the volatile memory 621. The result data may be stored in a nonvolatile memory 622.

The processor 610 may include a main processor 611 and an auxiliary processor 612. The main processor 611 may include one or more of a central processing unit (CPU) 611-1 or an application processor (AP). The main processor 611 may further include one or more of a graphic processing unit (GPU) 611-2, a communication processor (CP), and an image signal processor (ISP). The main processor 611 may further include a neural processing unit (NPU) 611-3. The NPU 611-3 may be a processor that is specialized in processing an artificial intelligence model. The artificial intelligence model may be generated through machine learning. The artificial intelligence model may include a plurality of artificial neural network layers. The artificial neural network may be one of a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more of the networks, but may not be limited to the above-described example. In addition to a hardware structure, additionally or alternatively, the artificial intelligence model may include a software structure. At least two of the processing units and the processors that are described above may be implemented as one integrated component (e.g., a single chip) or may be implemented as independent components (e.g., a plurality of chips).

The auxiliary processor 612 may include a driving controller 612-1. The driving controller 612-1 may include an interface converting circuit and a timing control circuit. The driving controller 612-1 receives an image signal from the main processor 611, converts the data format of the image signal so as to be suitable for the interface specifications with the display module 640, and outputs image data. The driving controller 612-1 may output various control signals required to drive the display module 640. The configuration of the driving controller 612-1 is the same or substantially similar to the driving controller 100 shown in FIG. 1, and thus some repetitive detailed description thereof may be omitted to avoid redundancy.

The auxiliary processor 612 may further include a data converting circuit 612-2, a gamma correcting circuit 612-3, and a rendering circuit 612-4. The data converting circuit 612-2 may receive the image data from the driving controller 612-1 and may compensates for the image data such that an image is displayed at a desired luminance according to characteristics of the electronic device 601 or setting of the user or may convert the image data to relatively reduce power consumption or compensate for afterimages. The gamma correcting circuit 612-3 may convert the image data, a gamma reference voltage, or the like such that the image displayed on the electronic device 601 has desired gamma characteristics. The rendering circuit 612-4 may receive the image data from the driving controller 612-1 and may render the image data in consideration of a pixel arrangement of the display panel 641 applied to the electronic device 601. At least one of the data converting circuit 612-2, the gamma correcting circuit 612-3, or the rendering circuit 612-4 may be integrated into another component (e.g., the main processor 611 or the driving controller 612-1). At least one of the data converting circuit 612-2, the gamma correcting circuit 612-3, or the rendering circuit 612-4 may be integrated into a data driver 643.

The memory 620 may store various pieces of data, which are used by at least one component (e.g., the processor 610 or the sensor module 661) of the electronic device 601 and input data or output data for commands related thereto. The memory 620 may include one or more of the volatile memory 621 and the nonvolatile memory 622.

The input module 630 may receive, from the outside (e.g., the user or an external electronic device 602) of the electronic device 601, commands or data to be used in components (e.g., the processor 610, the sensor module 661, or the sound output module 663) of the electronic device 601.

The input module 630 may include a first input module 631, through which the commands or data are input from the user, and a second input module 632 through which the commands or data are input from the external electronic device 602. The first input module 631 may include a microphone, a mouse, a keyboard, a key (e.g., a button), or a pen (e.g., a passive pen or an active pen). The second input module 632 may support a designated protocol capable of being connected to the external electronic device 602 by wire or wirelessly. According to some embodiments, the second input module 632 may include a high definition multimedia interface (HDMI), a universal serial bus (USB) interface, a secure digital (SD) card interface, or an audio interface. The second input module 632 may include a connector that may be physically connected to the external electronic device 602, for example, an HDMI connector, a USB connector, an SD card connector, or an audio connector (e.g., a headphone connector).

The display module 640 provides visual information to the user. The display module 640 may include the display panel 641, a scan driver 642, and the data driver 643. The display module 640 may further include a window, a chassis, a bracket, or the like for protecting the display panel 641. The display module 640 may further include a light emitting driver, a voltage generator, and the like. The voltage generator may output various voltages (e.g., the first and second driving voltages ELVDD and ELVSS (see FIG. 1)) required to drive the display panel 641. The configuration of the display panel 641, the scan driver 642, the data driver 643, and the voltage generator is the same or substantially similar to the configuration of the display panel DP, the first and second gate driving circuits 300 and 350, the data driving circuit 200, and the voltage generator 400 shown in FIG. 1, and thus some repetitive detailed description thereof may be omitted to avoid redundancy.

The power supply module 650 supplies power to the components of the electronic device 601. The power supply module 650 may include a battery that charges a power voltage. The battery may include a non-rechargeable primary cell, a rechargeable secondary cell, a fuel cell, or the like. The power supply module 650 may include a power management integrated circuit (PMIC). The PMIC supplies optimized power to the above-described modules and modules which will be described below. The power supply module 650 may include a wireless power transmission/reception member electrically connected to the battery. The wireless power transmission/reception member may include a plurality of coil-shaped antenna radiators.

The electronic device 601 may further include the embedded module 660 and the external module 670. The embedded module 660 may include the sensor module 661, the antenna module 662, and the sound output module 663. The external module 670 may include the camera module 671, a light module 672, and the communication module 673.

The sensor module 661 may detect an input from the user's body or an input from a pen among the first input module 631, and may generate an electrical signal or data value corresponding to the input. The sensor module 661 may include at least one of the fingerprint sensor 661-1, the input sensor 661-2, or a digitizer 661-3.

The fingerprint sensor 661-1 may generate a data value corresponding to a fingerprint of the user. The fingerprint sensor 661-1 may include one of an optical-type fingerprint sensor, or a capacitance-type fingerprint sensor.

The input sensor 661-2 may generate a data value corresponding to coordinate information of an input by a body of the user or an input by a pen. The input sensor 661-2 generates the change in capacitance due to the input as the data value. The input sensor 661-2 may sense an input by a passive pen or may transmit or receive data to or from an active pen.

The input sensor 661-2 may also measure a biometric signal such as blood pressure, moisture, or body fat. For example, when the user touches a part of the body to a sensor layer or sensing panel and does not move during a specific period, the input sensor 661-2 may detect the biometric signal and may output information desired by the user to the display module 640 based on a changes in electric fields caused by the part of the body.

The digitizer 661-3 may generate the data value corresponding to coordinate information of an input by the pen. The digitizer 661-3 generates an electromagnetic change amount due to the input as the data value. The digitizer 661-3 may sense input by the passive pen or transmit or receive data to or from the active pen.

At least one of the fingerprint sensor 661-1, the input sensor 661-2, or the digitizer 661-3 may be implemented as a sensor layer formed on the display panel 641 through a subsequent process. The fingerprint sensor 661-1, the input sensor 661-2, and the digitizer 661-3 may be placed on the upper side of the display panel 641, and one (e.g., the digitizer 661-3) of the fingerprint sensor 661-1, the input sensor 661-2, and the digitizer 661-3 may be placed on the lower side of the display panel 641.

Two or more of the fingerprint sensor 661-1, the input sensor 661-2, and the digitizer 661-3 may be formed to be integrated into one sensing panel through the same process. When being integrated into one sensing panel, the sensing panel may be placed between the display panel 641 and a window placed on the upper side of the display panel 641. According to some embodiments, the sensing panel may be placed on a window, and the location of the sensing panel is not particularly limited thereto.

At least one of the fingerprint sensor 661-1, the input sensor 661-2, or the digitizer 661-3 may be built into the display panel 641. That is, at least one of the fingerprint sensor 661-1, the input sensor 661-2, or the digitizer 661-3 may be simultaneously (or concurrently) formed through a process of forming elements (e.g., a light emitting element, a transistor, or the like) included in the display panel 641.

Besides, the sensor module 661 may generate an electrical signal or a data value corresponding to the internal state or external state of the electronic device 601. For example, the sensor module 661 may further include a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The antenna module 662 may include one or more antennas to transmit or receive the signal or power to or from an external source. According to some embodiments, the communication module 673 may transmit or receive the signal to or from the external electronic device through the antenna suitable for a communication method. An antenna pattern of the antenna module 662 may be integrated into the input sensor 661-2 or one component (e.g., the display panel 641) of the display module 640.

The audio output module 663 may be a device for outputting an audio signal to the outside of the electronic device 601 and, for example, may include a speaker used for general purposes, such as multimedia playback or recording playback, and a receiver used only for receiving a call. According to some embodiments, the receiver may be implemented separately from the speaker or may be integrated with the speaker. A sound output pattern of the sound output module 663 may be integrated into the display module 640.

The camera module 671 may shoot a still image or a video image. According to some embodiments, the camera module 671 may include one or more lenses, an image sensor, or an image signal processor. The camera module 671 may further include an infrared camera capable of measuring the presence or absence of the user, a position of the user, a gaze of the user, or the like.

The light module 672 may provide light. The light module 672 may include a light emitting diode or a xenon lamp. The light module 672 may operate in conjunction with the camera module 671 or may operate independently from the camera module 671.

The communication module 673 may support establishing a wired or wireless communication channel between the electronic device 601 and the external electronic device 602 and performing communication through the established communication channel. The communication module 673 may include one or all of wireless communication modules such as a cellular communication module, a short-range wireless communication module, or a global navigation satellite system (GNSS) communication module, or wired communication modules such as a local area network (LAN) communication module or a power line communication module. The communication module 673 may communicate with the external electronic device 602 through a short-range communication network such as Bluetooth, WiFi direct, or infrared data association (IrDA) or a long-range communication network such as a cellular network, Internet, or a computer network (e.g., the LAN or a wide area network (WAN)). The above-mentioned various communication modules 673 may be implemented into one chip or may be respectively implemented into separate chips.

The input module 630, the sensor module 661, the camera module 671, and the like may be utilized to control an operation of the display panel (or display module) 640 in conjunction with the processor 610.

The processor 610 outputs commands or data to the display module 640, the sound output module 663, the camera module 671, or the light module 672 based on input data received from the input module 630. For example, the processor 610 may generate image data in response to input data applied through a mouse, an active pen, or the like to output the generated image data to the display module 640 or may generate command data in response to the input data to output the generated command data to the camera module 671 or the light module 672. When no input data is received from the input module 630 during a specific period, the processor 610 may switch an operation mode of the electronic device 601 to a low-power mode or a sleep mode to relatively reduce power consumed in the electronic device 601.

The processor 610 outputs commands or data to the display module 640, the sound output module 663, the camera module 671, or the light module 672 based on sensing data received from the sensor module 661. For example, the processor 610 may compare authentication data authorized by the fingerprint sensor 661-1 with the authentication data stored in the memory 620, and then may execute an application depending on the comparison result. The processor 610 may execute commands or may output corresponding image data to the display module 640 based on sensing data sensed by the input sensor 661-2 or the digitizer 661-3. When the sensor module 661 includes a temperature sensor, the processor 610 receives temperature data regarding the measured temperature from the sensor module 661 and may further perform luminance correction on image data based on the temperature data.

The processor 610 may receive measurement data regarding the presence or absence of the user, the user's location, and the user's gaze from the camera module 671. The processor 610 may further perform luminance correction on the image data based on the measurement data. For example, the processor 610 that determines the presence or absence of the user through an input from the camera module 671 may output image data, of which the luminance is corrected, to the display module 640 through the data converting circuit 612-2 or the gamma correcting circuit 612-3.

Some of the components may be connected to each other through communication methods between peripheral devices, for example, a bus, a general purpose input/output (GPIO), a serial peripheral interface (SPI), a mobile industry processor interface (MIPI), or an ultra-path interconnect (UPI) link and may exchange a signal (e.g., commands or data) between each other. The processor 610 may communicate with the display module 640 through a mutually promised interface, and for example, may use any one of the above-described communication methods, and the present disclosure is not limited to the above-described communication methods.

The electronic device 601 according to various embodiments disclosed in the specification may be implemented with various types of devices. The electronic device 601 may include, for example, at least one of a portable communication device (e.g., a smart phone), a computer device, a portable multimedia device, a portable medical device, a camera, a wearable device, or a home appliance. The electronic device 601 according to some embodiments of the present disclosure may not be limited to the above-described devices.

Although aspects of some embodiments of the present disclosure have been described for illustrative purposes, those skilled in the art will appreciate that various modifications, and substitutions are possible, without departing from the scope and spirit of the present disclosure as disclosed in the accompanying claims. Accordingly, the technical scope of the present disclosure is not limited to the detailed description of this specification, but should be defined by the claims.

According to some embodiments of the present disclosure, the number of scan driving circuits and the number of emission control circuits, which are included in a gate driving circuit, may be relatively reduced by relatively reducing the number of scan signals and the number of emission control signals, which are applied to a pixel. As a result, the width of the non-display area of a display panel may be relatively reduced.

Moreover, even when the number of scan signals decreases, a pixel circuit capable of stably performing a compensation operation in a compensation period by using a coupling operation of first and second capacitors may be provided.

While the present disclosure has been described with reference to embodiments thereof, it will be apparent to those of ordinary skill in the art that various changes and modifications may be made thereto without departing from the spirit and scope of embodiments according to the present disclosure as set forth in the following claims, and their equivalents.

What is claimed is:

1. A display device comprising:

a display panel including a pixel, wherein the pixel includes:

a light emitting element including an anode connected to a first power line and a cathode;

a first transistor connected between the cathode and a second power line and configured to operate according to a potential of a first node;

a second transistor connected between the first node and a data line and configured to receive a first scan signal;

a third transistor connected between the first node and a reference voltage line and configured to receive a second scan signal;

a first emission control transistor connected between the first transistor and the second power line, connected to a third node, and configured to receive a first emission control signal;

a first capacitor connected between the first node and a second node, to which the first transistor and the first emission control transistor are connected; and a second capacitor connected between the second node and the third node.

2. The display device of claim 1, wherein during an initialization period, the second scan signal and the first emission control signal have active levels, and wherein during the initialization period, the first scan signal has an inactive level.

3. The display device of claim 2, wherein a compensation period lags behind the initialization period, wherein during the compensation period, the second scan signal has an active level, wherein during the compensation period, the first scan signal and the first emission control signal have inactive levels, wherein a data write period lags behind the compensation period, wherein during the data write period, the first scan signal has an active level, and wherein during the data write period, the second scan signal and the first emission control signal have inactive levels.

4. The display device of claim 3, wherein the pixel further includes:

a second emission control transistor connected between the first transistor and the cathode and configured to receive the first emission control signal.

5. The display device of claim 4, wherein the pixel further includes:

a fourth transistor connected between the first power line and a fourth node, to which the first transistor and the second emission control transistor are connected, and configured to receive the second scan signal.

6. The display device of claim 4, wherein the pixel further includes:

a fourth transistor connected between a fourth node, to which the first transistor and the second emission control transistor are connected, and an initialization voltage line receiving an initialization voltage and configured to receive the second scan signal.

7. The display device of claim 3, wherein the pixel further includes:

a second emission control transistor connected between the first transistor and the cathode and configured to receive a second emission control signal.

8. The display device of claim 7, wherein the pixel further includes:

a fourth transistor connected between the cathode and an initialization voltage line configured to receive an initialization voltage, and configured to receive the second scan signal.

9. The display device of claim 3, wherein the pixel further includes:

a third emission control transistor connected between the first emission control transistor and the second power line and configured to receive a third emission control signal.

10. The display device of claim 3, wherein the pixel further includes:

a fourth transistor connected between the cathode and the first power line and configured to receive a third scan signal.

11. The display device of claim 10, wherein an active period of the third scan signal overlaps an active period of the second scan signal and an active period of the first scan signal, and overlaps an inactive period of the first emission control signal.

12. The display device of claim 10, wherein the pixel further includes:

a second emission control transistor connected between the first emission control transistor and the second power line and configured to receive a second emission control signal.

13. The display device of claim 12, wherein a start time point of an inactive period of the second emission control signal precedes a start time point of an inactive period of the first emission control signal, and wherein an end time point of the inactive period of the second emission control signal precedes an end time point of the inactive period of the first emission control signal.

14. The display device of claim 10, wherein the pixel further includes:

a second emission control transistor connected between the first emission control transistor and the second node and configured to receive a second emission control signal.

15. The display device of claim 3, wherein the pixel further includes:

a fourth transistor connected between the cathode and an initialization voltage line receiving an initialization voltage and configured to receive a third scan signal.

16. The display device of claim 15, wherein an active period of the third scan signal overlaps an active period of the second scan signal and an active period of the first scan signal, and overlaps an inactive period of the first emission control signal.

17. A display device comprising:

a display panel including a pixel, a first scan line, a second scan line, a first emission control line, a first power line, a second power line, a reference voltage line, and a data line;

a first gate driving circuit connected to the first scan line and the second scan line; and a second gate driving circuit connected to the first emission control line, wherein the pixel includes:

a light emitting element including an anode connected to the first power line and a cathode;

a first transistor connected between the cathode and the second power line and configured to operate according to a potential of a first node;

a second transistor connected between the first node and the data line, and configured to receive a first scan signal through the first scan line;

a third transistor connected between the first node and the reference voltage line and configured to receive a second scan signal through the second scan line;

a first emission control transistor connected between the first transistor and the second power line and configured to receive a first emission control signal through the first emission control line;

a first capacitor connected between the first node and a second node, to which the first transistor and the first emission control transistor are connected; and a second capacitor connected between the second node and the first emission control line.

18. The display device of claim 17, wherein the first gate driving circuit includes:

a first scan driving circuit connected to the first scan line; and a second scan driving circuit connected to the second scan line, and wherein the second gate driving circuit includes:

an emission control circuit connected to the first emission control line.

19. The display device of claim 17, wherein the pixel further includes:

a fourth transistor connected between the cathode and the first power line and configured to receive a third scan signal through a third scan line, wherein the first gate driving circuit includes:

a first scan driving circuit connected to the first scan line; and a second scan driving circuit connected to the third scan line, and wherein the second gate driving circuit includes:

an emission control circuit connected to the first emission control line; and a third scan driving circuit connected to the second scan line.

20. An electronic device comprising:

a display panel including a pixel;

a panel driver configured to drive the display panel;

a driving controller configured to control a driving of the panel driver; and a main processor configured to provide an image signal to the driving controller, wherein the pixel includes:

a light emitting element including an anode connected to a first power line and a cathode;

a first transistor connected between the cathode and a second power line and configured to operate according to a potential of a first node;

a second transistor connected between the first node and a data line and configured to receive a first scan signal;

a third transistor connected between the first node and a reference voltage line and configured to receive a second scan signal;

a first emission control transistor connected between the first transistor and the second power line, connected to a third node, and configured to receive a first emission control signal;

a first capacitor connected between the first node and a second node, to which the first transistor and the first emission control transistor are connected; and a second capacitor connected between the second node and the third node.

* * * * *